United States Patent
Grigg

(10) Patent No.: US 11,053,913 B2
(45) Date of Patent: Jul. 6, 2021

(54) VERTICAL AXIS WIND TURBINE WITH CONFIGURABLE AIRFOILS

(71) Applicant: Charles Grigg, Westport, CA (US)

(72) Inventor: Charles Grigg, Westport, CA (US)

(*) Notice: Subject to any disclaimer, the term of this patent is extended or adjusted under 35 U.S.C. 154(b) by 0 days.

(21) Appl. No.: 16/427,022

(22) Filed: May 30, 2019

(65) Prior Publication Data
US 2019/0383263 A1 Dec. 19, 2019

Related U.S. Application Data

(63) Continuation of application No. 15/238,500, filed on Aug. 16, 2016, now Pat. No. 10,436,176.

(60) Provisional application No. 62/282,972, filed on Aug. 17, 2015.

(51) Int. Cl.
*F03D 3/06* (2006.01)
*F03D 3/00* (2006.01)

(52) U.S. Cl.
CPC ............ *F03D 3/068* (2013.01); *F03D 3/005* (2013.01); *F03D 3/067* (2013.01); *F05B 2260/72* (2013.01); *Y02E 10/72* (2013.01); *Y02E 10/74* (2013.01)

(58) Field of Classification Search
CPC .......... F03D 3/068; F03D 3/005; F03D 3/067; F05B 2260/72; Y02E 10/74
See application file for complete search history.

(56) References Cited

U.S. PATENT DOCUMENTS

| | | | | |
|---|---|---|---|---|
| 4,383,801 A | * | 5/1983 | Pryor | F03D 3/068 416/119 |
| 5,181,678 A | * | 1/1993 | Widnall | B64C 3/48 244/219 |
| 7,911,076 B2 | | 3/2011 | Stephens et al. | |
| 7,988,413 B2 | | 8/2011 | Haar | |
| 8,303,250 B2 | * | 11/2012 | Mohammed | F03D 7/0236 416/23 |
| 8,550,786 B2 | | 10/2013 | Janiuk | |
| 8,602,719 B2 | | 12/2013 | Kelly | |
| 8,829,704 B2 | | 9/2014 | Grigg | |
| 9,309,863 B2 | * | 4/2016 | Foss | F03D 7/06 |
| 2010/0172759 A1 | | 7/2010 | Sullivan | |
| 2012/0207600 A1 | * | 8/2012 | Harris | F03D 3/02 416/1 |

(Continued)

OTHER PUBLICATIONS

U.S. Appl. No. 15/238,500, filed Aug. 16, 2016.
(Continued)

*Primary Examiner* — Michael C Zarroli
(74) *Attorney, Agent, or Firm* — Vierra Magen Marcus LLP

(57) ABSTRACT

A vertical axis wind turbine includes: a central axis that extends in a substantially vertical direction; a plurality of configurable airfoils disposed about the central axis, the plurality of configurable airfoils physically coupled to rotate together about the central axis; an angle adjustment mechanism configured to adjust an angle formed between a configurable airfoil and a radius that extends from the central axis as the configurable airfoil rotates about the central axis; and a profile adjustment mechanism that is configured to adjust a profile of the configurable airfoil as the configurable airfoil rotates about the central axis.

17 Claims, 34 Drawing Sheets

(56) References Cited

U.S. PATENT DOCUMENTS

| | | | |
|---|---|---|---|
| 2013/0285382 A1* | 10/2013 | Grigg | F03D 9/25 |
| | | | 290/54 |
| 2015/0192105 A1* | 7/2015 | Chu | F03D 3/061 |
| | | | 416/119 |
| 2017/0045033 A1 | 2/2017 | Margolis | |

OTHER PUBLICATIONS

Office Action dated Sep. 14, 2018, in U.S. Appl. No. 15/238,500.
Response to Office Action filed Feb. 12, 2019, in U.S. Appl. No. 15/238,500.
Notice of Allowance dated Feb. 25, 2019, in U.S. Appl. No. 15/238,500.

\* cited by examiner

Figure 15: in DTOP report Lift and Drag Forces of Airfoil vs. Position

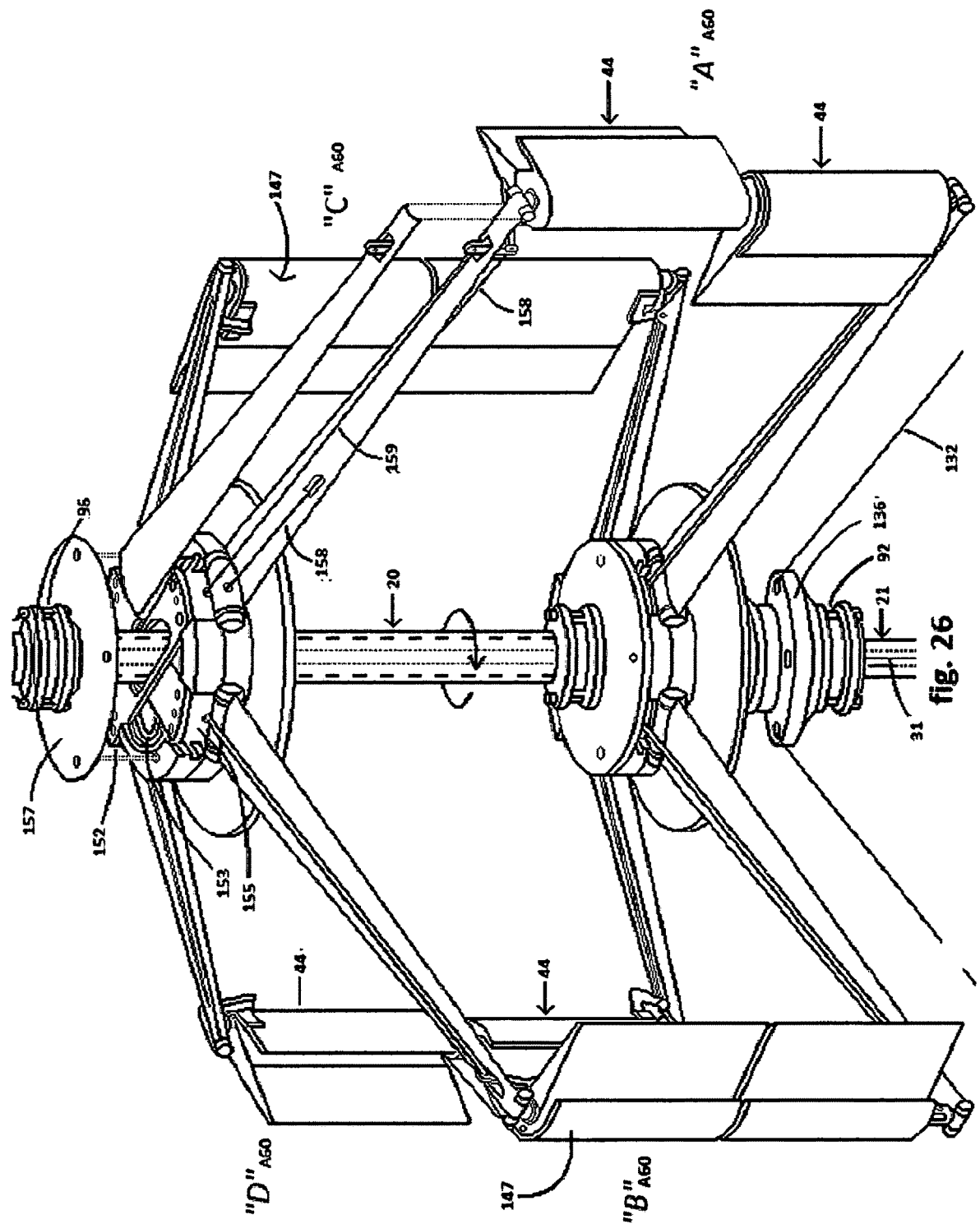

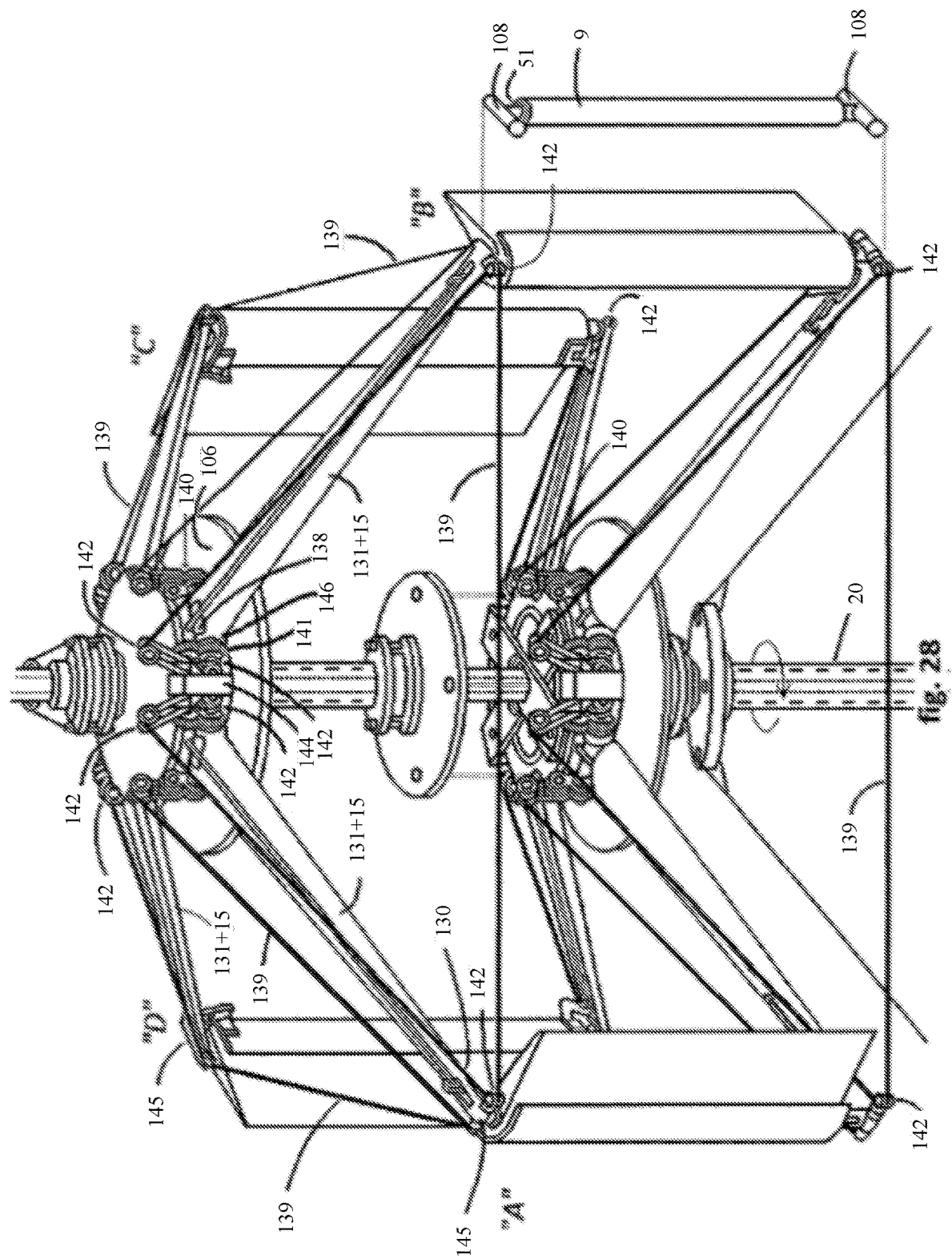

VERTICAL AXIS WIND TURBINE WITH CONFIGURABLE AIRFOILS

CROSS-REFERENCED APPLICATION

This application is a continuation of U.S. Non-Provisional patent application Ser. No. 15/238,500, filed on Aug. 16, 2016, published as US 2017/0051720 on Feb. 23, 2017 and issued as U.S. Pat. No. 10,436,176 on Oct. 8, 2019, which claims the benefit of U.S. Provisional Patent Application No. 62/282,972, filed on Aug. 17, 2015, which are hereby incorporated by reference in their entirety.

BACKGROUND

This application relates to vertical axis wind turbines and methods of operating vertical axis wind turbines.

Wind energy is a fast growing renewable resource that will play a factor in reducing the world's reliance on fossil fuels. The most common wind turbine today is the horizontal axis wind turbine (HAWT). This type of turbine has the highest coefficient of performance currently available, but it is expensive and requires frequent maintenance. This results in considerable down time because the power generator and other electrical equipment is located at the top of the turbine.

Darrieus turbines are a type of vertical axis wind turbine (VA WT) that can become competitive with the HAWT. Benefits of the Darrieus turbine are that it is generally much cheaper than the HAWT. It is also omnidirectional, quiet, and easier to maintain than the HA WT. There is a need for a wind powered turbine that can be maintained at a low cost while producing more power than a traditional Darrieus turbine.

The wind industry is growing on a global and national level. The United States Department of Energy (DOE) aims for 20% of the nation's electricity to be produced from wind by 2030. The DOE also states that "greater use of the nation's abundant wind resources for electric power generation will help the nation reduce emissions of greenhouse gases and other air pollutants, diversify its energy supply, provide cost-competitive electricity to key regions across the country, and reduce water usage for power generation." Wind energy is a fast growing renewable resource that will play a factor in reducing the world's reliance on fossil fuels.

Location is important when deciding where to install wind turbines. Wind availability in an area is defined by seven wind power classes in the United States. Wind farms are only built in areas with class 3 or higher wind speeds because slower speeds do not produce enough electricity to make commercial turbines economically viable. Residential and private use, however, can go as low as class 2 wind speeds because it is a smaller application.

The most common wind turbine today is the horizontal axis wind turbine (HA WT). This type of turbine has the highest coefficient of performance currently available and operates by producing lift. Lift is a force that is perpendicular to the fluid motion on the airfoil. The wind comes from one direction, but the velocity seen from a moving airfoil, or relative velocity, is what will produce lift in a turbine blade. In order for the turbine blade to turn faster than the wind lift force must exceed the drag force. Drag force is parallel to the relative velocity and is present throughout the whole circle of rotation. Lift force, however, is only present when there is a low pressure zone on one side of the airfoil. This means that there are zones in a full revolution where no lift is produced.

HAWTs used in a utility-scale operation range in size from 100 kilowatts to a few megawatts. Wind turbines that produce less than 100 kilowatts are often used for residential applications. FIG. 2 shows a wind farm containing an array of horizontal axis wind turbines. HAWTs may be used predominately in industry, but they are not without flaws.

The main problems with the HA WT are the price and the fact that the power generator and other electrical equipment are located at the middle of the turbine, generally at the top of a tower. This makes maintenance difficult, so the operation and maintenance costs of new turbines are 20-25% of the annual profit. Turbine maintenance can take 1 to 7 days of down time for each repair depending on the part that needs to be replaced. In addition to downtime required for maintenance, the structure that supports the turbine needs to be sturdy enough to hold up the heavy generator equipment as well. For example, a structure of a small turbine that is only eighty feet tall accounts for approximately 30 percent of the total system cost. The total cost for commercial HA WT can range from $4 5 million per unit.

Other issues with the HA WT include vibrations and location. People do not want to live near HA WTs because the turbine blades create vibrations as they sweep across the support column, causing harmonic interference. Zoning laws prohibit the building of HA WTs near residential areas for this reason.

Another type of wind turbine is the vertical axis wind turbine (VA WT). There are several varieties of V AWTs; some operate on drag forces while others operate on lift. All VA WTs rotate about their central axis, so each blade is always the same distance away from the support column. This means that these turbines are quieter than the HA WTs because the support column is equidistant from each turbine blade, which drastically reduces the vibrations caused by the blade passing by the column. The power generator and electronics for VA WTs are located at the base of the turbine, which provide easy access for maintenance. VA WTs are also omnidirectional, which means that the direction the wind is coming from does not matter.

The Darrieus turbine is a V AWT that operates by producing lift. This gives it the ability to compete with the HAWT because they both function by using the same principals. There are three main shapes of Darrieus turbines; the eggbeater shape, the H rotor, and the helical Darrieus. The coefficient of performance for the three types of Darrieus is very similar. Generally, Darrieus turbines are significantly cheaper than HAWTs, which is the primary reason they are considered over the HA WT. Like all VA WTs, they are also omnidirectional, quiet, and easier to maintain than the HA WT.

Two main drawbacks of the Darrieus turbine are that it may require a motor or other system to spin at low speeds and is not as efficient as the HA WT. The cut-in speed of a Darrieus turbine is the speed at which the turbine starts to generate positive power. Up until the cut-in speed the turbine consumes power by operating the motor that spins the turbine.

SUMMARY

An example of a vertical axis wind turbine includes: a central axis that extends in a substantially vertical direction; a plurality of configurable airfoils disposed about the central axis, the plurality of configurable airfoils physically coupled to rotate together about the central axis; an angle adjustment mechanism that is configured to adjust an angle formed between a configurable airfoil and a radius that extends from the central axis to the configurable airfoil as the configurable airfoil rotates about the central axis; and a profile adjustment mechanism that is configured to adjust a profile of the configurable airfoil as the configurable airfoil rotates about the central axis.

The plurality of configurable airfoils may include an even number of configurable airfoils arranged in axial symmetry about the central axis such that each configurable airfoil is balanced with an opposing configurable airfoil located on the opposite side of the central axis. A pair of opposing configurable airfoils on opposing sides of the central axis may be configured for combined operation by at least one of the angle adjustment mechanism or the profile adjustment mechanism such that adjustments of a first configurable airfoil of the pair is opposite to adjustments of a second configurable airfoil of the pair that is on an opposite side of the central axis. A plurality of cables may be connected between the plurality of airfoils. The configurable airfoil may include at least a first portion and a second portion and the profile adjustment mechanism may be configured to adjust the profile of the configurable airfoil by adjusting angular alignment of the first and second portions. A plurality of arms may extend radially about the central axis to support the plurality of configurable airfoils, each of the plurality of arms having a hinged attachment to a hub so that the plurality of arms have variable angle with respect to the central axis. The plurality of arms may form about a ninety degree angle with the central axis in a fully extended position and form an angle of substantially less than ninety degrees with the central axis in a retracted position. A twist or spiraling mechanism may be configured to twist the configurable airfoil.

An example of a method of operating a vertical axis wind turbine that includes configurable airfoils rotating about a central vertical axis includes: adjusting an angle formed between a configurable airfoil and a radius that extends from the central vertical axis to the configurable airfoil as the configurable airfoil rotates about the central axis; and adjusting a profile of the configurable airfoil as the configurable airfoil rotates about the central axis.

The angle between the configurable airfoil and the radius may be adjusted as a function of angular position of the configurable airfoil about the central vertical axis such that the angle cycles through a full cycle for each rotation of the configurable airfoil about the central vertical axis. The angle at a given angular position of the configurable airfoil may be determined from the wind direction such that the configurable airfoil maintains an efficient angle with respect to the wind during rotation about the central axis. The angle may be varied within a range from about eighty seven degrees (87°) to about ninety three degrees (93°). The profile of the configurable airfoil may be adjusted as a function of angular position of the airfoil about the central vertical axis such that the profile cycles through a full cycle for each rotation of the configurable airfoil about the central vertical axis. The profile at a given angular position of the configurable airfoil may be determined from the wind direction so that the configurable airfoil maintains an efficient profile with respect to the wind during rotation about the central axis. The profile may be adjusted to be cambered with a concave surface facing radially outward from the central vertical axis when the configurable airfoil is at a first rotational position and the profile is adjusted to be cambered with a concave surface facing radially inward toward the central vertical axis when the configurable airfoil is at a second rotational position. A self-starting mode may include: adjusting the angle to about zero degrees on a first side of the central vertical axis so that the configurable airfoil is substantially perpendicular to the wind on the first side; and adjusting the angle to about ninety degrees on a second side of the central vertical axis that is opposite the first side so that the configurable airfoil is substantially parallel to the wind on the second side; and subsequently, in response to achieving a threshold angular velocity in the self-starting mode, transitioning to an operating mode in which the angle is maintained at between eighty degrees (80°) and one hundred degrees (100°) throughout rotation about the central vertical axis.

A vertical axis wind turbine may include: a central axis that extends in a substantially vertical direction; a main shaft; an electric generator coupled to the main shaft; a plurality of configurable airfoils disposed about the central axis, the plurality of configurable airfoils arranged to rotate together about the central axis; a plurality of hinged arms connecting the plurality of configurable airfoils to the main shaft in a configurable arrangement that has at least an extended position in which the plurality of hinged arms extend substantially horizontally and a retracted position in which the plurality of hinged arms form an angle of substantially less than ninety degrees with the central axis; an angle adjustment mechanism that is configured to adjust an angle formed between a configurable airfoil and an arm as the configurable airfoil rotates about the central axis; and a profile adjustment mechanism that is configured to adjust a profile of the configurable airfoil as the configurable airfoil rotates about the central axis.

The vertical axis wind turbine may include a plurality of cables connected to ground, the plurality of cables attached below the plurality of hinged arms such that the plurality of hinged arms remain above the plurality of cables in both the extended and retracted positions. Each configurable airfoil may include at least a nose section and a tail section, and an angle formed between the nose section and the tail section may be adjustable by the profile adjustment mechanism. The profile adjustment mechanism may include at least one of: pushrods mechanically and/or magnetically coupled to a camshaft; an electromechanical actuator; cables extending between opposing configurable airfoils; a rack and pinion mechanism; and a bladder and inflation mechanism.

Various aspects, advantages, features and embodiments of the present invention are included in the following description of exemplary examples thereof, which description should be taken in conjunction with the accompanying drawings.

BRIEF DESCRIPTION OF THE DRAWINGS

FIGS. 15A-B may be views of a single foil in two opposite in-flight profile positions.

FIG. 26 shows push and pull cable mechanism with split foil starting mechanism.

FIG. 28 shows an example of a lateral position support mechanism.

DETAILED DESCRIPTION

Vertical Axis Wind Turbine

Figure 1:
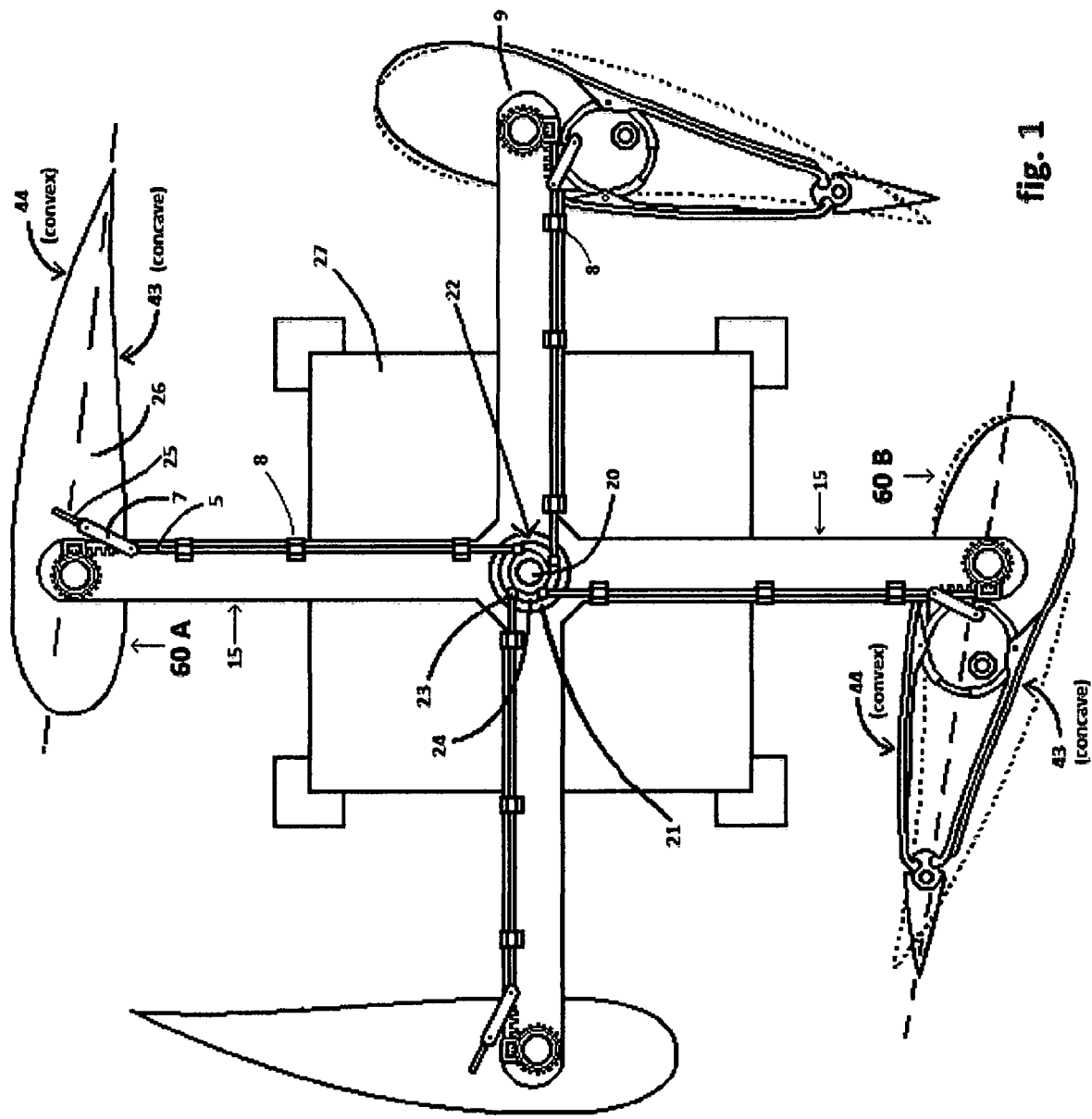
FIG. 1 illustrates a top-down view of a V AWT with configurable airfoils.

FIG. 1 illustrates a top view of a vertical axis wind turbine with a cam system that runs two consolidated mechanisms. An angle adjustment mechanism changes the elongated angle of an airfoil relative to the turbine's circular rotation and the a profile adjustment mechanism modifies the profile of the airfoil, specifically the airfoil's greater and lesser curvature relative to its optimum placement in its circular rotation (i.e. an airfoil may be modified to be symmetric or asymmetric, and when asymmetric may be curved outwards with a concave surface facing away from the central axis of the turbine, or curved inwards with a concave surface facing towards the central axis).

At the center of the turbine is its main shaft 21 and central axis 20 which both extend in a vertical or substantially vertical direction. Surrounding the main shaft is cam body 22. The cam system includes but is not limited to the cam body 22 the cam followers 23 which are connected to the end of the pushrod 5. Pushrods 5 extend down their hub arm 15 of the end assembly and are held in their sliding position by push rod fixture 8. As the turbine rotates the cam followers 23 follow the lob of the cam 24 retracting and extending their corresponding rack gear 6 that is connected at the outer end of the pushrod. This extension engages the rack gear with the airfoil's main gear 9 rotating the airfoil on its axis in this view is seen the profile modification lever 7 with an extension and retraction slot 25 in the end of the airfoil cover 26 of the curvature modification mechanism. The turbine is supported by platform support structure 27.

It can be seen that airfoil 60a is not at right angles with respect to arm 15 but is angled outwards so that as airfoil 60a turn in a counter-clockwise direction, it's leading edge is somewhat angled out away from central axis 20. Also, airfoil 60a has a convex outer surface (on the side away from central axis 20) and has a concave inner surface (on the side facing towards central axis 20). In contrast, airfoil 60b has a convex surface facing central axis 20 and a concave surface facing away from central axis 20. Additional airfoils may have different profiles and may form different angles with their respective arms in examples below. While FIG. 1 shows four arms supporting four airfoils, other numbers of arms and airfoils may be used. An even number of airfoils may be convenient because this may allow combined operation of pairs of opposing airfoils in opposing configurations. However, other examples may use odd numbers of airfoils and/or may not couple opposing airfoils (e.g. each airfoil may be controlled independently).

Figure 2:
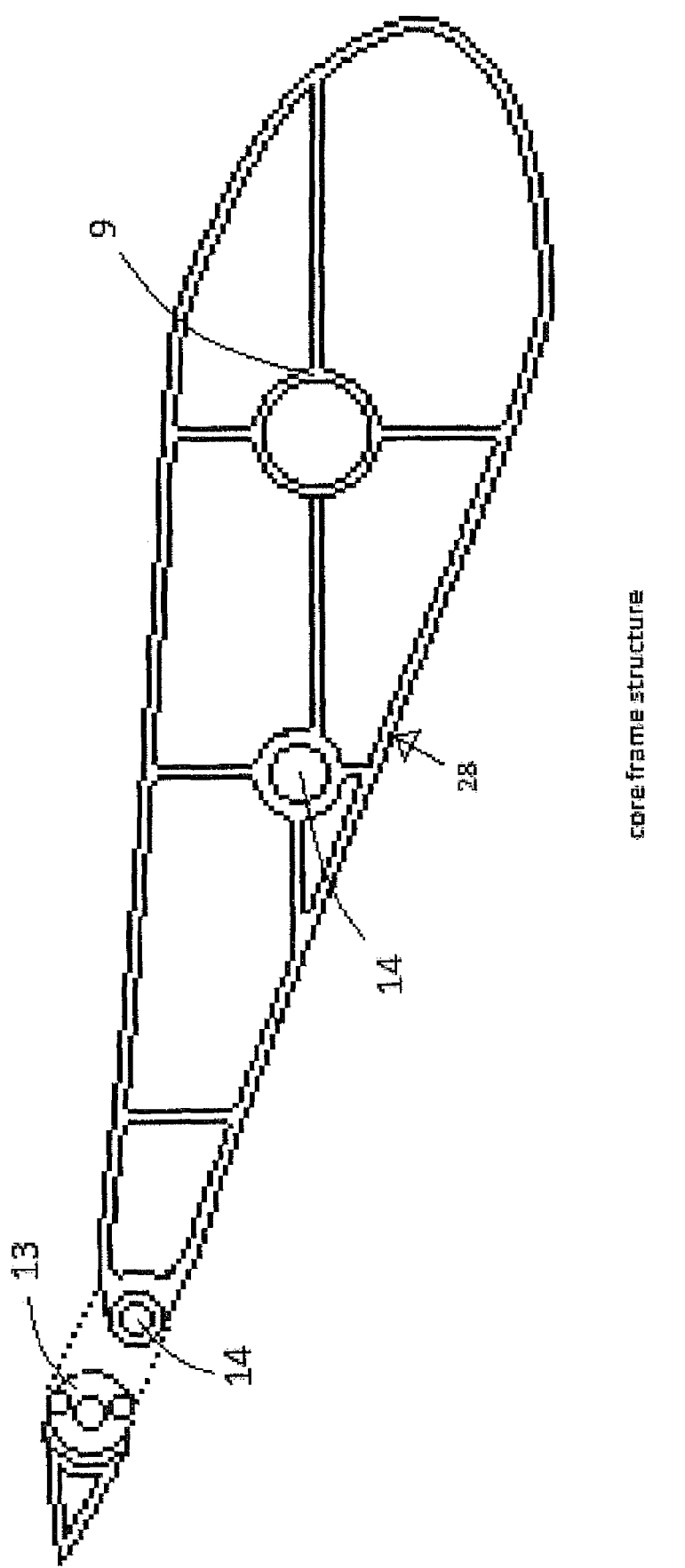
FIG. 2 illustrates a core frame structure of a configurable airfoil.

FIG. 2 shows the core frame structure 28 of an airfoil showing its connection to the angle adjustment mechanism and curvature modification assembly 50. The core frame structure is connected to the airfoil's main shaft 9 and to the eccentric race's 12 pivot axle with bearing 14 and tail eccentric's 13 pivot axle with bearing 14.

Figure 3:
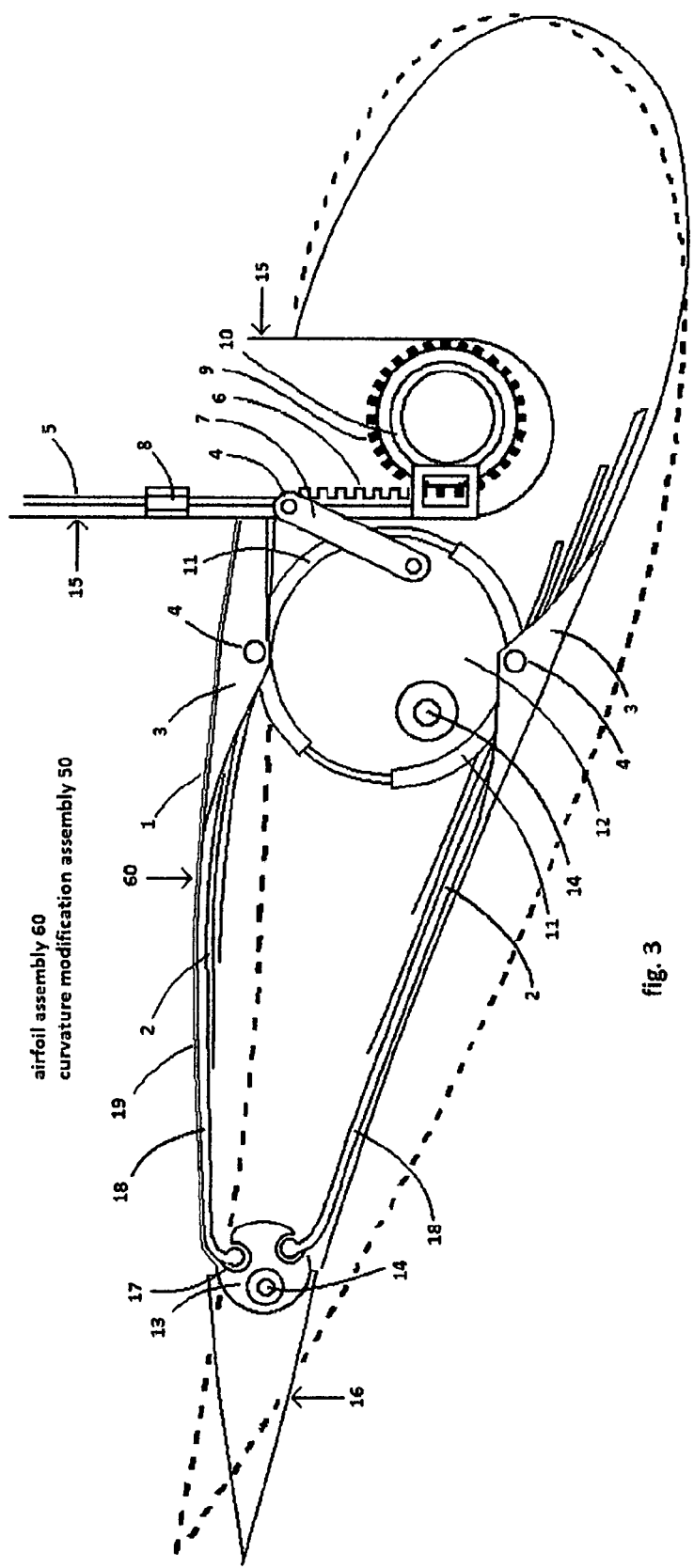
FIG. 3 illustrates certain components of an airfoil.

In FIG. 3 is seen a detail top view of an airfoil that includes elements of a profile adjustment mechanism (or "curvature modification assembly") which adjusts the profile of airfoil 60 so that it may have a range of different profiles (in cross section along a horizontal plane). The profile adjustment mechanism functions to change the shape of the two unlike curvatures of the airfoil in it rotational excursion around the wind turbines' central axis so that the lesser and greater curvatures change sides (i.e. airfoil may curve outwards, or curve inwards). Note: components including the outer sides and skin of the airfoil, and the end assembly are rendered in black for a particular profile and an alternative curvature profile is rendered in a broken dotted line to illustrate how changes in profile may occur as airfoil assembly 60 rotates.

In this example end assembly arm 15 is equipped with a push rod 5 that runs down the arm through guides 8 from the central hub and axis of the wind turbine. The turbine may activate the push rod 5 using a geared or cam system or may alternatively be equipped instead with a stepper motor/s that are either consolidated individually or with a common transmission in the hub section or in direct drive designs with the stepper motor placed over the airfoils main shaft at either or both ends of the airfoil. The direct drive design is featured in an accompanying figure.

In this example, when pushrod 5 is pulled towards the turbine's main shaft 9 the pushrod's rack gear 6 engages with the main shaft gear 9 rotating it and the joined airfoil in a clockwise direction with the body of the foil moving closer to the turbines central axis and its tail section flipping outward. Eccentric lever 7 is also attached to pushrod 5 at one end by a swivel 4 and likewise at the other end of lever it is attached to the eccentric race 12 by an identical swivel 4. Thus the lever runs between the pushrod 5 and the eccentric race 12. Eccentric race 12 is circular in shape with a swivel pin and bearing 14 offset from its center allowing 12 to eccentrically pivot back and forth. As a result of the retraction of pushrod 5 and rack gear 6 main shaft gear 9 is rotated clockwise, pivoting the joined airfoil towards the turbines central axis.

Also joined to pushrod 5 is eccentric race 12 which is simultaneously made to pivot counter clockwise by lever 7 extending between it and pushrod 5 As the eccentric race 12 rotates counter clockwise it rotates within two saddles 11, one saddle 11 joined to the upper half of 12 and the other opposed saddle attached to the eccentric's lower half The two parts the eccentric race and the saddle form a structure that is almost identical to a common sealed bearing that has a portion of its outer rotatable side sections removed leaving the rotating upper and lower rotatable portions of the bearing that forms the saddle 11. These upper and lower portions of the common sealed bearing become the saddles each have been modified with bearing keepers to keep their corresponding bearing in place within the extremities of the each saddle.

Each the upper and lower Saddle 11 are made to swivel on their corresponding swivel 4 that is attached to the apex of their corresponding upper or lower leaf spring fixture 3. The upper and lower leaf spring fixture each house and secure a plurality of leaf springs among them the inner most being the main spring 18

As the eccentric race is rotated counter clockwise as it is in this instance, it pivots up on it axis pin and bearing 14 pulling the upper saddle 11, leaf spring fixture with leaf spring/s 5, main spring 18, outer perimeter of the airfoil and skin 19 up to the greater curvature profile (i.e. forms a concave surface facing the central axis as shown), as it also pulls the lower saddle 11, attached lower leaf spring fixture 3 with lower leaf spring 5 and main spring 18, outer perimeter and skin of airfoil to is lesser curvature profile (i.e. forms a concave surface as shown). Thus the upper curvature of the airfoil in this alternating formation is of a greater curvature having lower air pressure asserted against it as the fluid velocity increases with airfoil's rotational movement, with the opposite side of the airfoil in this formation having a lesser curvature and a resulting higher pressure as a result of the fluid current moving across its surface at lower velocity.

With the reverse mechanical process the airfoil produces the opposite beneficial result as it assume it alternating profile as delineated by the broken line in the detailed figure.

Both the upper and lower leaf springs sets have a main spring 18 that is adjacent to the upper or lower perimeter side of a the airfoil. Each main spring 18 is joined to the elastic outer skin 19 of the airfoil. Both the upper and lower main springs 18 are attached to their receptacle slot 17 provided in the tail eccentric 13. Tail eccentric 13 is joined to the tail section allowing the tail section to pivot on it pivot and bearing 14. The tail eccentric 13 and joined tail section are parts of the tail assembly 16. Tail assembly 16 is joined to the core frame structure 20 by pivot assembly 14. Also joined to the core frame structure 20 are pivot axle 14 and main shaft 9. As seen in an accompany figure.

Both main springs 18 are of the same length. Because the lower pressure curvature 30 is longer than the higher pressure curvature 40 the tail eccentric reciprocates to address this issue. When the eccentric race pivot counter clockwise the saddle 11, leaf spring fixture 3 and main spring 18 pivot the tail eccentric counterclockwise allowing the upper main sprig 18 to assume the greater curvature profile and also allows the lover main spring of the same length to assume the shorter lesser curvature profile.

When the airfoil profile is modified into its opposite profile, the tail eccentric and tail pivot in the opposite direction corresponding to the movement of the main springs alternating profile.

Conclusion: the Airfoil 60 has two features. One feature changes the pitch of the airfoil relative to its circular rotation via the rack gear and main shaft and incorporated is the curvature modification assembly 50 that modifies and changes the profile of the airfoil.

Figure 4:
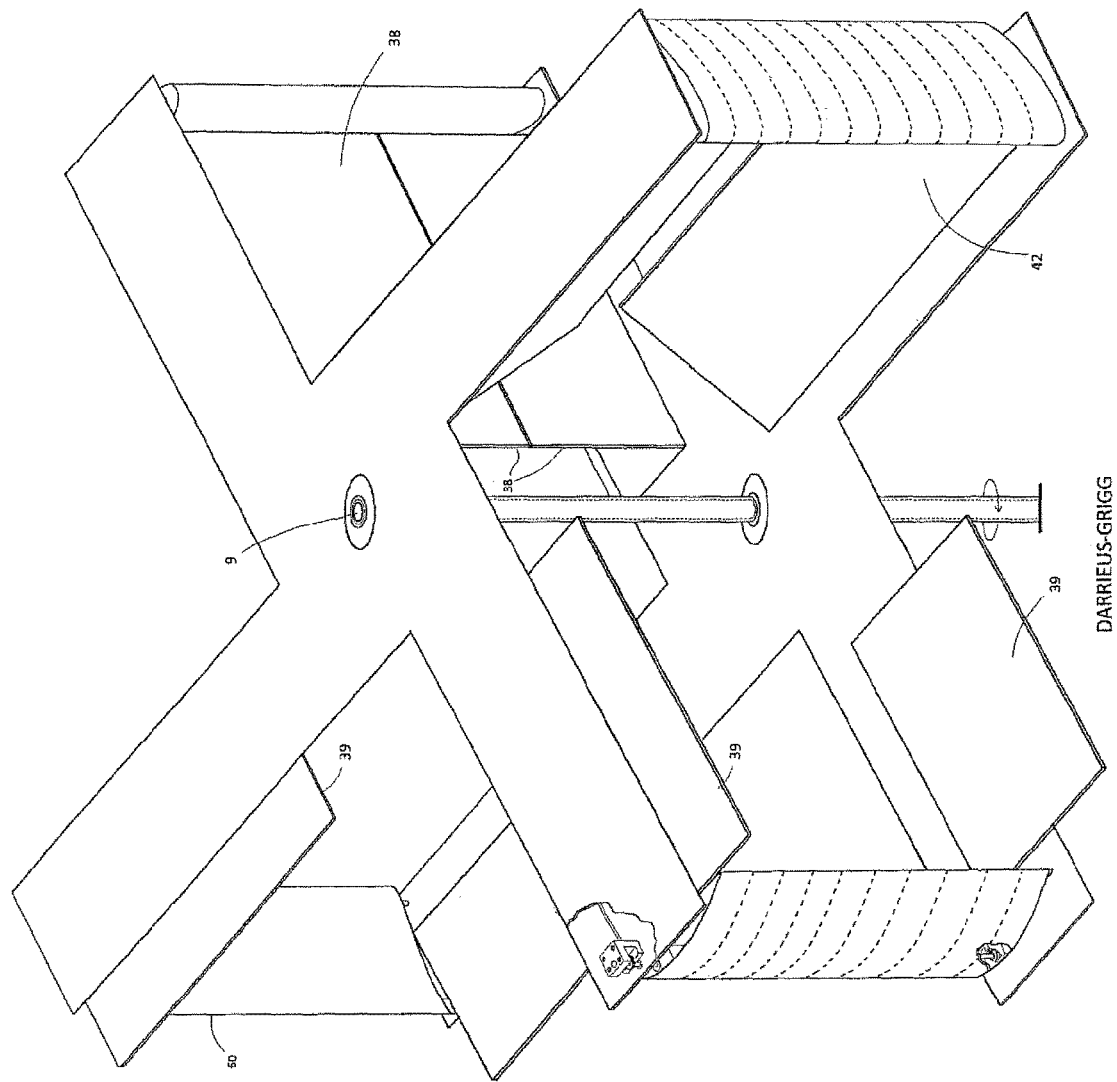
FIG. 4 illustrates a VA WT with configurable airfoils.

A Darrieus turbine generates rotation from lift force. Consequently the Darrieus turbine is not generally self-starting. In the effort to start the Darrieus Turbine and harvest energy at low rpm, the turbine in this figure is equipped with an opposed counter balanced wing assembly. An example of a self-starting VAWT is shown in FIG. 4, including opposed wings 39. Each of the two opposed wing are extremely thin, with each wing folding tight against its corresponding end assembly in glide from which it pivots into the sweep area when it deploys in its drive position. The upper wing is geared to the lower wing as is seen in the detail at the left of the figure. Both wings 39 are thus counterbalanced as the lower wing pivot 90 up is lifted up by the upper wing pivoting 90 downward to meet in a position transverse to the ambient fluid current. This design has two major advantages. It starts the turbine and harvests energy at low air speed until the turbine reaches its optimum rpm and at which time the wings are locked in their glide position. We can call this rpm the "drag/lift transition speed"

As rpm increases the turbine becomes more productive harvesting its energy from lift force. The turbine stays in its lift mode until air speed diminishes to the lower cut off speed again.

At the bottom of the vertical airfoil is a transmission block (not shown) that is a fixture for two bearings placed 90 degrees from one another. The lower bearing serves the horizontal pivot shaft. This pivot shaft is joined to the lower of the two opposed wings. The end of the pivot shaft extends out from the side of that wing where it is held in a rotatable position by the lower of the two bearing in said block. Beveled gears may be provided at the end of the pivot shaft to actuate adjustment of airfoil pitch (angle with respect to turbine arms). Pivot shafts may extend to couple to an airfoil at the top and bottom through one or more beveled gear mechanism or other coupling.

Figure 5:
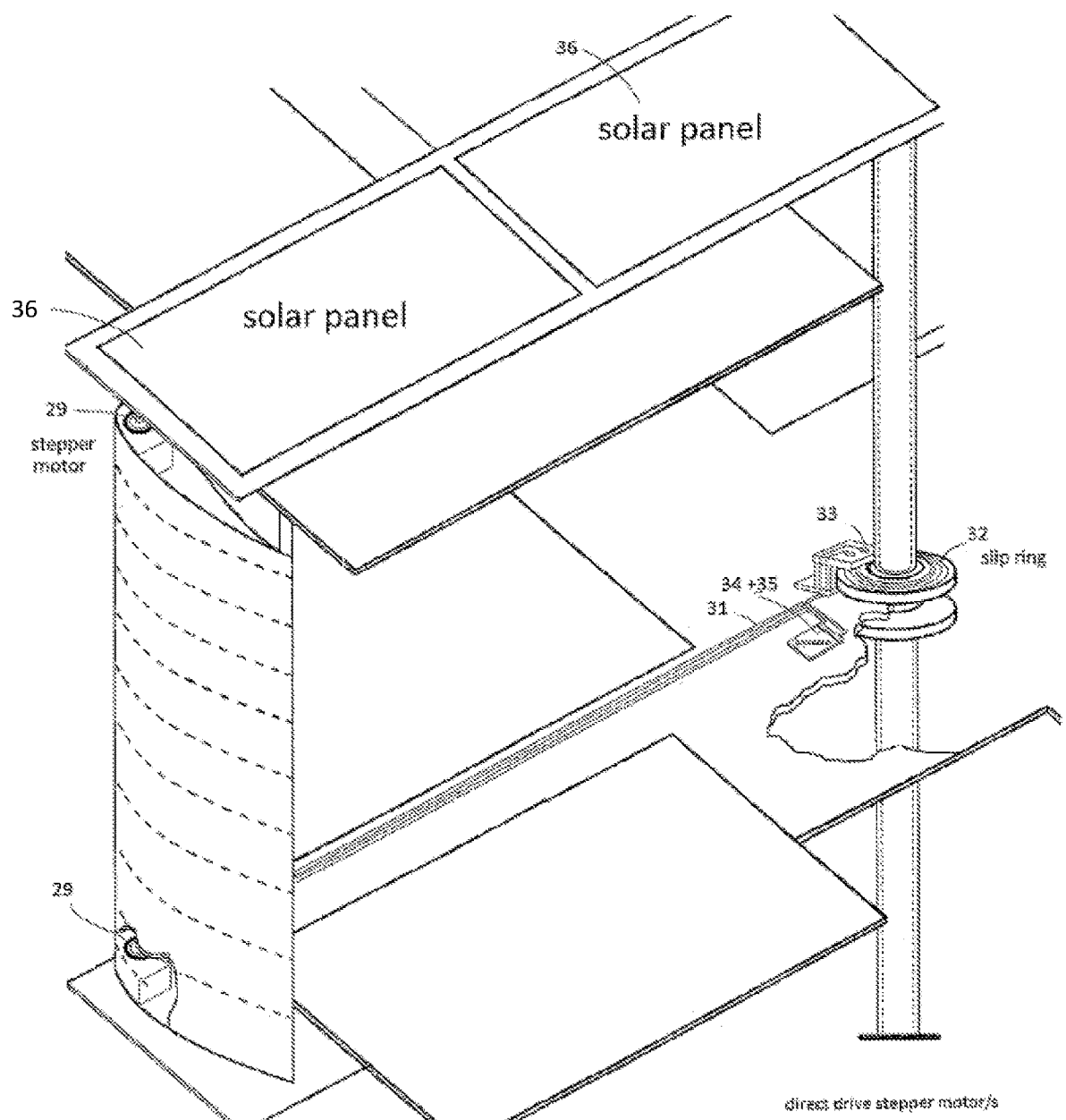
FIG. 5 illustrates a configurable airfoil operated by stepper motors.
Figure 6:
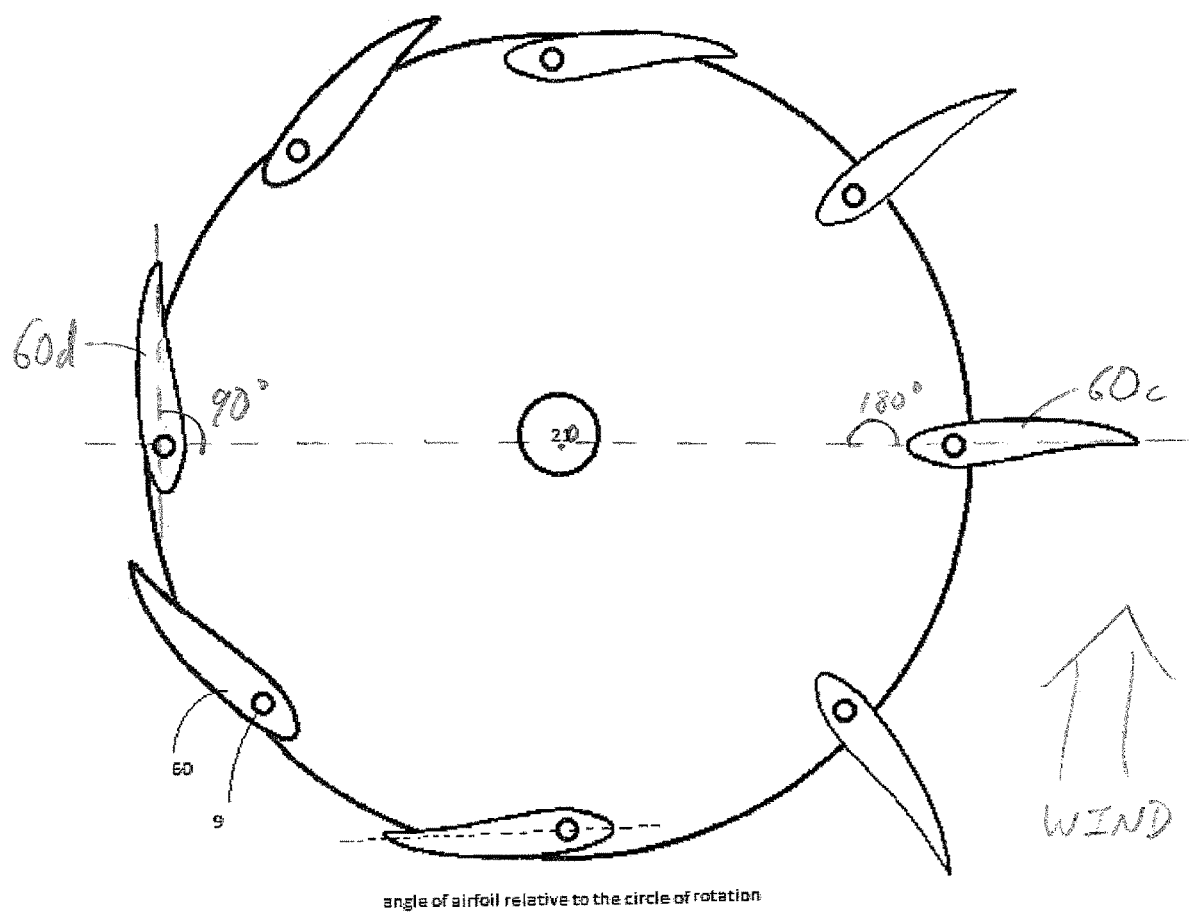
FIG. 6 illustrates configurable airfoils operated in drag mode.

In FIG. 5 is featured a Darrieus turbine that uses a stepper motors 29 to work the two functions described in FIG. 3 (i.e. stepper motors 29 adjust the angle of the airfoil with respect to its support arm and modify its profile). In addition the stepper motor can pivot the airfoils transitioning into the drive side of the sweep area to a position that is transverse to the ambient current starting the Darrieus turbine (e.g. at right angles to the wind) and extracting energy at low rpm as seen in FIG. 6. When the Darrieus turbine reaches it optimum transition rpm from drag to lift, processor 34 actuates stepper motors 29 (or other electromechanical actuators) to transition the airfoils to their lift mode and continues to trim the angle of the airfoils to their optimum positions relative to the turbine's circular rotation all the while keeping the dissimilar curvatures on either side of the airfoil at their optimum productive profile. The stepper motors 29 are an off the shelf item and are available with a large range of steps. A stepper motor that is placed in a direct drive position in line with the airfoil's main shaft as it is in FIG. 5 with for example 360 steps will rotate the airfoil 1 degree each step in either direction. A stepper motor with 1080 step will rotate the motor 1 degree each 3 steps and so on. Because the stepper motor can operates at a very low gear ratio is does not back slide but can hold the airfoil against the wing force in a semi-locked position. An electrical stop in the end assemblies may, if needed, be activated by processor 34 and control circuits 35 that regulates the stepper motor(s).

All these electrical motors naturally take energy to run. The end assembly can be used as a platform for an array of solar panels 36 as shown. Today's solar panels can be very light and thin minimizing the inertia form added weight and added aerodynamic drag. The array of panels can supply electricity directly to the stepper motors and/or to the storage batteries at the base of the turbines support structure. Energy can be transmitted to and from the turbine through traditional brushes 33 and slip rings 32 that are also off the shelf and of a large variety and number of circuits. Energy can be transferred from the solar panels to on-ground storage batteries and unused energy naturally can be transmitted into the grid if close to electric utility line.

In FIG. 6 is seen the Darrieus style turbine in top-down view, controlled by a processor and with a stepper motors rotating its airfoils 60 by 90 degree in the drive side of the sweep area to initiate start up and harvest energy at low rpm. Thus, airfoil 60c forms an angle of about 90 degrees to the wind direction (forms an angle of 180 degrees (or 0 degrees—airfoil may be nose-in or nose-out in different examples) with respect to a radius from central axis 20). In this orientation airfoil 60c is square to the wind and creates high drag and thereby creates torque. In contrast, airfoil 60d forms an angle of about zero degrees with respect to the wind (and 90 degrees with respect to a radius from central axis 20). Thus, airfoil 60d presents a relatively small profile to the wind and creates low drag and low torque. Thus, by creating high drag and torque on one side without counter-balancing torque on the other side, the net effect is generation of torque (in a counter-clockwise direction in FIG. 6). Thus, airfoils may be operated in a drag mode that may be effective even at low speeds, for example, speeds at which lift is not sufficient to maintain turbine operation. Such a drag mode may be used to start up a configurable airfoil turbine so that the turbine starts in drag mode (as in FIG. 6) and as it gains speed, operation transitions to lift mode (e.g. as shown in FIG. 1). Such a transition may be managed by a processor using appropriate software according to input from one or more sensors. For example, wind speed and direction may be measured and provided to a processor and in response the processor may determine that there is sufficient wind for operation. The processor may then initialize operation by orienting airfoils as shown in FIG. 6 to get rotation up to a threshold speed at which airfoils are angled (and their profiles modified) for lift mode.

Figure 7:
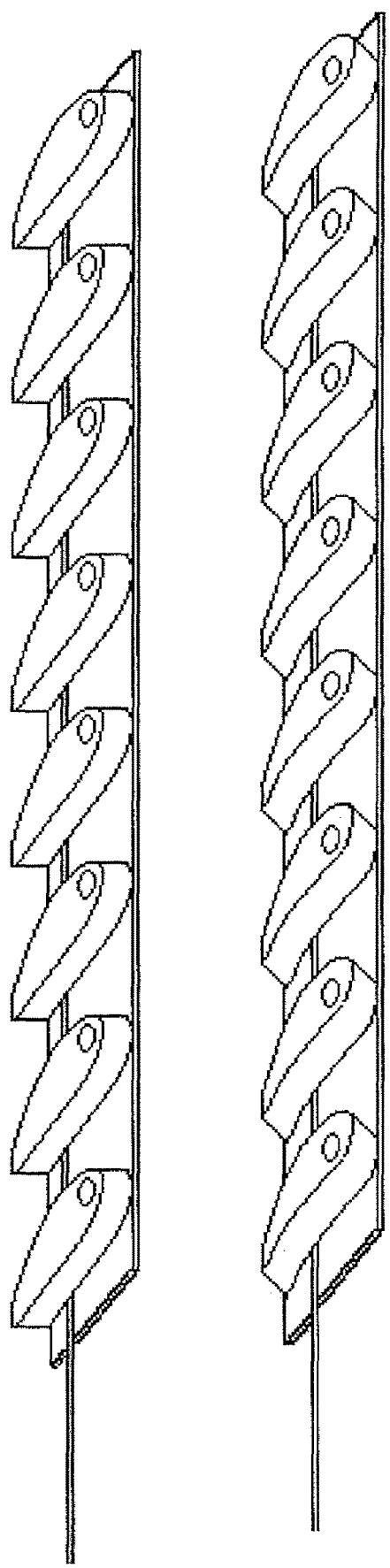
FIG. 7 illustrates mini airfoils.

In FIG. 7 is seen two styles of mini airfoils in series. The mini foils can be vertically offset or twisted like a propeller to enhance the end assembly and to add forward rotation from lift.

The horizontally oriented opposed end assemblies are necessary to secure the vertical airfoil between them but create a certain amount of undesirable drag resistance. It may be possible to add to the end assemblies a series of mini foils that work in tandem controlled by a common pivot shaft that also operates in tandem its corresponding airfoil by using a mechanical mean that is also activated and controlled by the stepper motor system. The mini foils can be of a variety of style and number.

Figure 8:
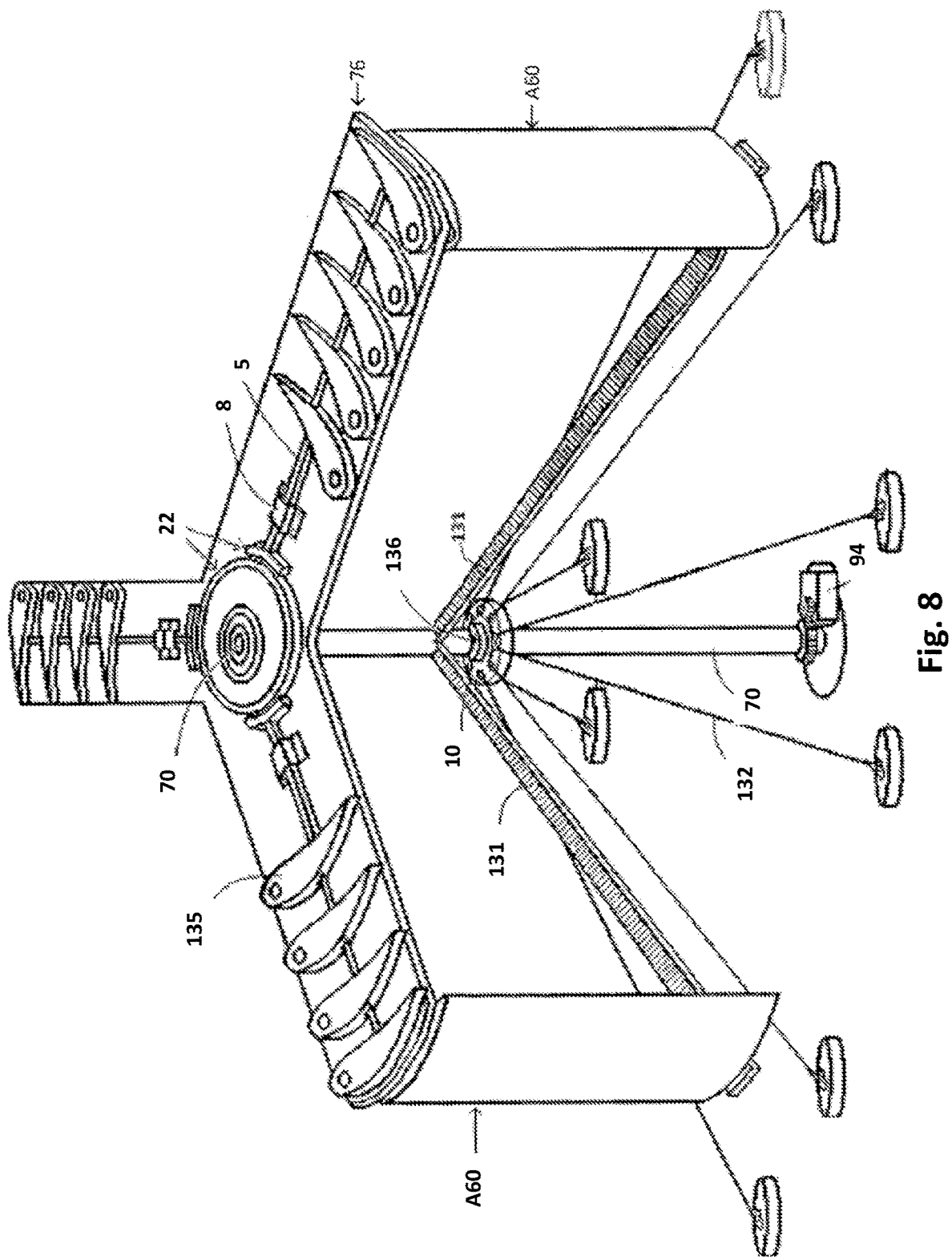
FIG. 8 features the electromagnetic control system and the angled end assembly 131 that provides for ground support cable 132 use for tethering the turbine at about the middle of the rotating assembly to thereby transfer most of the lateral loads from the tower to the ground by multiple cables triangulated to ground anchors 133.
Figure 9:
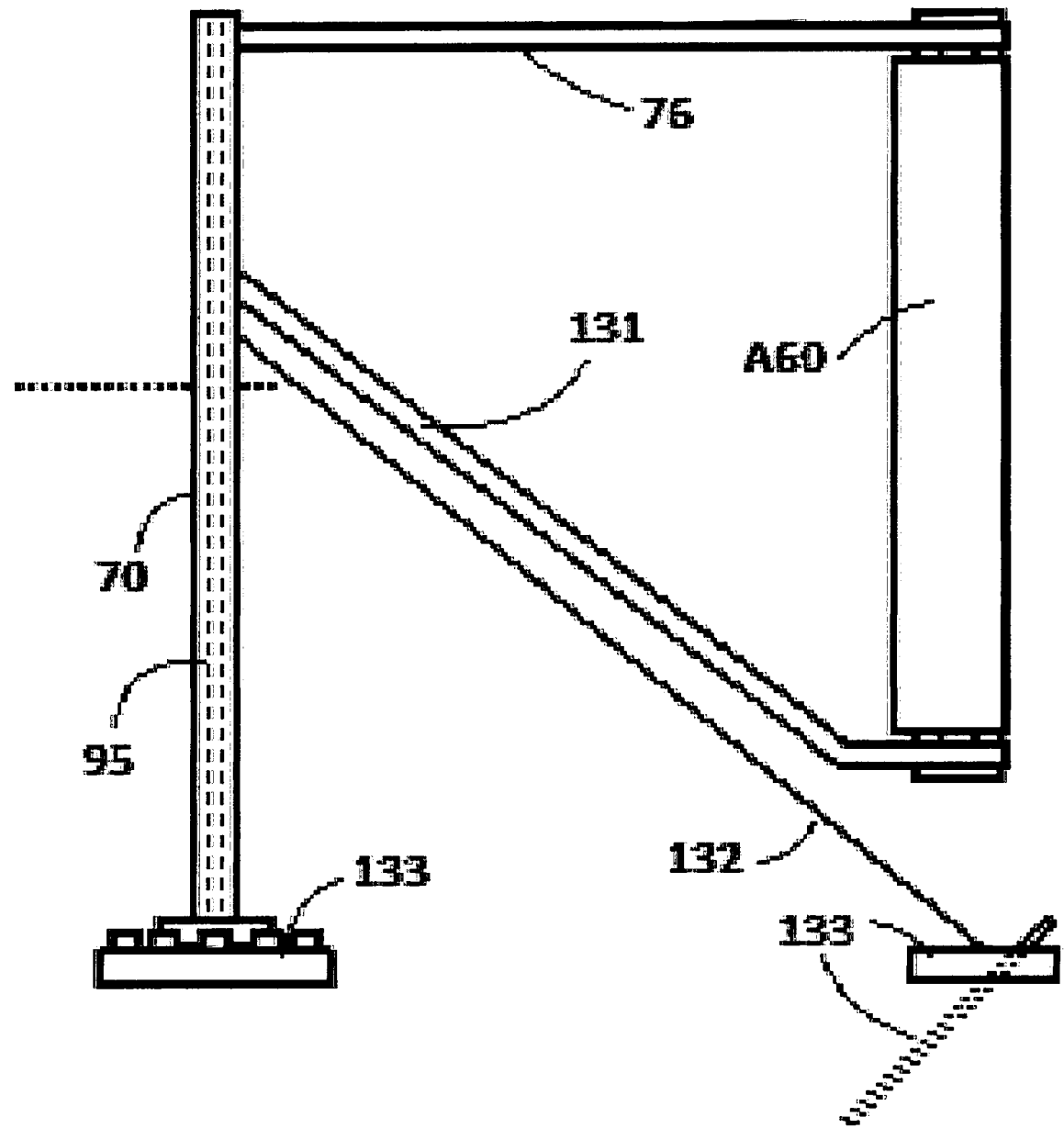
FIG. 9 is a cross section of angled end assembly 131.

FIG. 8 is a perspective view of a Darrieus turbine that includes arms that are angled from horizontal to accommodate supporting wires 132. FIG. 9 is a cross sectional view of the turbine of FIG. 8. Both figures feature the angled end assembly 131. FIG. 8 also features an electromagnetic cam system. The upper arrow from 22 is the neodymium magnetic array and the arrow under it the magnet/sat the end of push rod 5.

The lower end assembly 131 angles downward from the tubular main shaft 80 to which it is attached by bearing means. Tubular main shaft 80 is the support column for the turbine. The attachment of the lower end assembly can be well above the shaft's mid-point, designated by the horizontal dotted line in FIG. 9.

Because the end assembly 131 angles downward, it allows room for the attachment of a plurality of ground support cables 132 from multiple vertical positions on the column. The support cables transferring the lateral loads from the tower to the ground are secured to the earth by ground anchors 133. From these high and mid-range positions on the central column 80 triangulated cables at multiple levels can be attached. At the top of the ground anchors are attachment plates bolted to subterranean concrete pads and/or pilings, that can have angular counter anchors (designated by broken line) driven into the earth. These installations need not extend deep into the earth to support and transfer the lateral loads because of the cables triangular orientation to the column. The central support column in this case is the tubular shaft 80 that also functions as the drive shaft. At ground level the drive shaft engages the power take off gearing that drives the on ground generator 94.

Central tubular shaft 80 rotates by bearing means on the inter-stationary main axle 70. Main shaft 80 is fixed to the cable attachment bearing and housings 136 as both rotate in unison. The rotating ground anchor bearing housing 136 typically will have exterior main bearings 10 between it and the cable attachment flange to allow the turbine to freely rotate within the stationary flange to which the cables are attached.

It can also be common to have a split central tubular shaft 80 and have the cable support housing and flange fixed to the stationary axle 70. In this case the bearing, bearing housing and outer cable connection flange are fixed to axle 70 that supports the split central shafts 80 that are free to rotate in socket and thresh bearings provided within. These bearing designs are common mechanical methods.

Note: The mini foils 135 on the top of the end assembly 76 in FIG. 8 may add efficiency to offset the drag created by the end assembly 76. The tear dropped shaped mini foils 135 as attached in series to the push rod 5 pivot on an axis at the nose section and are positioned and move in tandem with their corresponding cambered foil and the variable pitch mechanism.

Darrieus also created a lift turbine design known as the egg beater. The angled end assembly 131 can also be contoured to be aerodynamically shaped supporting the foil without creating the drag. Lower angled end assembly 131 can also have an added horizontal support cable (not shown) attached to the pivot axle of A60. The column only needs to be robust enough to support the current loads and the relatively light weight foil 60. (Ultra-light cambered foils are featured in FIG. 12)

As the succeeding figures will show the core structure 28 of foil body can preferably be made of a sturdy foam material covered with light glass or carbon fiber/resin with all other structural parts constructed of lightweight metals like aluminum. Using such light materials produces an ultra-light turbine that costs a fraction of the cost to support HAWT with their extreme weight and lateral loads at the top of their tower. Having the heavy generation equipment on the ground with easy access, low cost maintenance, and detachable light weight airfoils makes maintenance comparatively inexpensive, with low production costs.

In FIG. 5, steeper motors were used as the position rotating device at the top and/or bottom of the cambered airfoil A60. With existing data lighter position regulators can be installed for example electromagnetic cam system in FIG. 8. At the top of support column and tubular shaft 80 within the hub of the upper end assembly 76 is such an arrangement.

In this example the activating mechanism is a cam system 22 positioned at the top of the end assembly 76 surrounding the turbines central axis. The cam system in this example is made with an off centered circular cast array of neodymium magnetic sections. Each cast section is individually charged to incrementally, pull by magnetic attracting and push by repelling the magnet attached at the end of push rods 5, guided in push rod bearing fixture 8.

Within each of the opposed end assemblies 76 one or both central hubs, surrounding the turbine's central axis 21, can be equipped with a cam system 22. Note: The turbine has a cam system on its upper end assembly in FIG. 8 but could have and additional cam installed surrounding the main shaft under the angled end assembly 131. The cam body of 22 is stationary and grounded to the central axle that goes to ground. The push rods 5 and cam followers 23 are secured by push rod fixture 8 to arm 15 on end assembly 76 part of the rotating turbine assembly that is made to rotate by the force of the ambient current.

This and other magnetic control systems, known in the art creating minimum energy and transmission loss can be adapted to operate all of the efficiency optimizing mechanism featured in this application.

Mechanical systems using Cam lobes generally can be shaped for a gradual circular exchange, or configured to exchange the curvatures more abruptly if desirable. The variable pitch mechanism can be tuned to provide efficient pitch (angular orientation) of airfoils throughout their rotation, using advanced electromagnetic positioning technologies. Other activating mechanism will be presented later.

FIG. 9 is the cross section view of FIG. 8 showing the tubular shaft 70 with an interstationary axle 95 extending the vertical length inside of the main shaft (dotted lines.) Ground anchor 133 has an angled element extending into the ground on the opposite angle of that of cable 132. This addition to the anchor may be much larger than shown here but is very effective and low cost way to create a robust anchor system.

In Fig. IO is seen a "high inertia turbine" that was designed to be operated in water currents. It uses the rotation of water in chambers in the interior of the turbine to mimic the speed of rotation and counteracting force of the exterior current rotating the turbine.

Fig. IO shows the inner mechanisms of the cambered foil A60 with the beveled gears and drive shaft arrangement (similar to those previously explained) to rotate the smaller container 66.

Fig. II shows a side view cross section of an upper portion of foil A60 that is a mirror image of the lower half the cambered foil A60.

In this example, the greater and lesser curvatures of the cambered foil are gradually exchanged, one with the other, over approximately 180 degrees of rotation or at optimum performance intervals by an activating mechanism that creates liquid pressure. In this example using liquid pressure, two containers are used, a cylindrical smaller container 66 that rotates within the perimeter walls of the cylindrical larger container 67. The smaller container is rotated eccentrically on axle 70 in a way that circulates fluid flow around the perimeter inner walls of the larger container creating a kind of water pump. The circulation of the liquid flow coincides with the circulation of the cambered foil around its axis and the movement of the current rotating the turbines.

The mass of the fluid added to the mass of the larger container are counter balanced with the counter weighted smaller container so the system stays centrifugally balanced. In air application this design may be viable even though it creates undesirable inertia. This is partly because the negative effects of the inertia of mass, during start up, diminish after optimum rotational speed is achieved. The balanced synchronicity of the rotation of fluid with the rotating assemblies seems best in a water environment. This is partly because the cycle of the centrifugal force of the rotation of fluid between the two containers creates pressure. This interior pressure is cyclically synchronized with the pressure against the turbine rotating in the ambient current, and the cycle of the equal and opposite opposed centrifugal forces created by the 90 degree opposed foil configuration previously described.

The tail assembly 16 has been described earlier. The attachment of leaf spring 2 can form the ribs of the cambered foil. Springs 2 are held in the forward part of the foil by the forward spring fixture 75 and leaf spring bearing and keeper pin 73. Fixture 75 pivots back and forth, as signified by the opposed arrows, securing leaf springs with bearing and keeper pin 73 allowing the opposed leaf springs to smoothly change curvature positions and be robust enough to withstand the turbulence and force of the water current.

Figure 10:
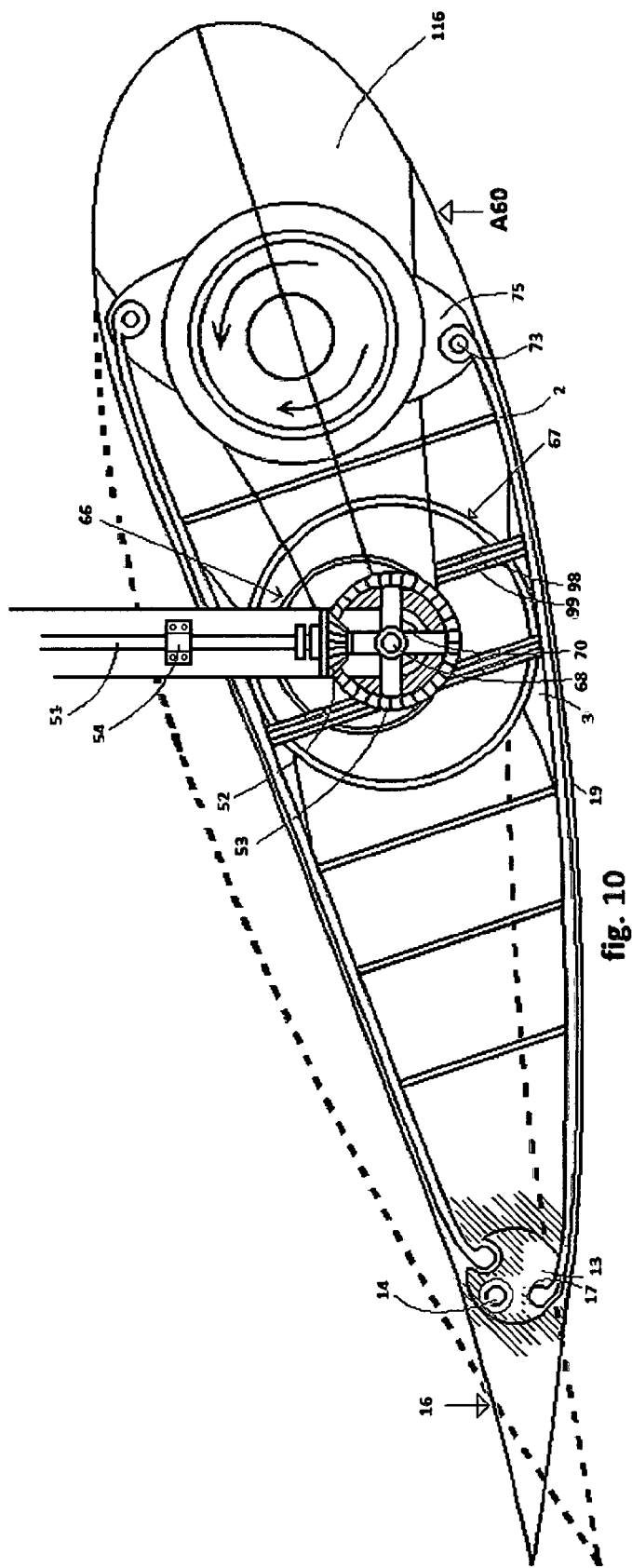
FIG. 10 shows a portion of a "high inertia turbine" that was designed to be operated in water currents. It uses the centrifugal force of the rotation of water in chambers in the interior of the turbine to mimic the speed of rotation and counteracting force of the exterior current rotating the turbine.

The cambered foil in FIG. 10 has a rigid connecting plate 116 that is secured in a fixed position to the nose of the foil and to main shaft 70 that surrounds the smaller container's axle 68 serving as a robust fixture for the fluid environment. The upper connecting plate 116 is delineated by shaded hatched lines.

Figure 11:
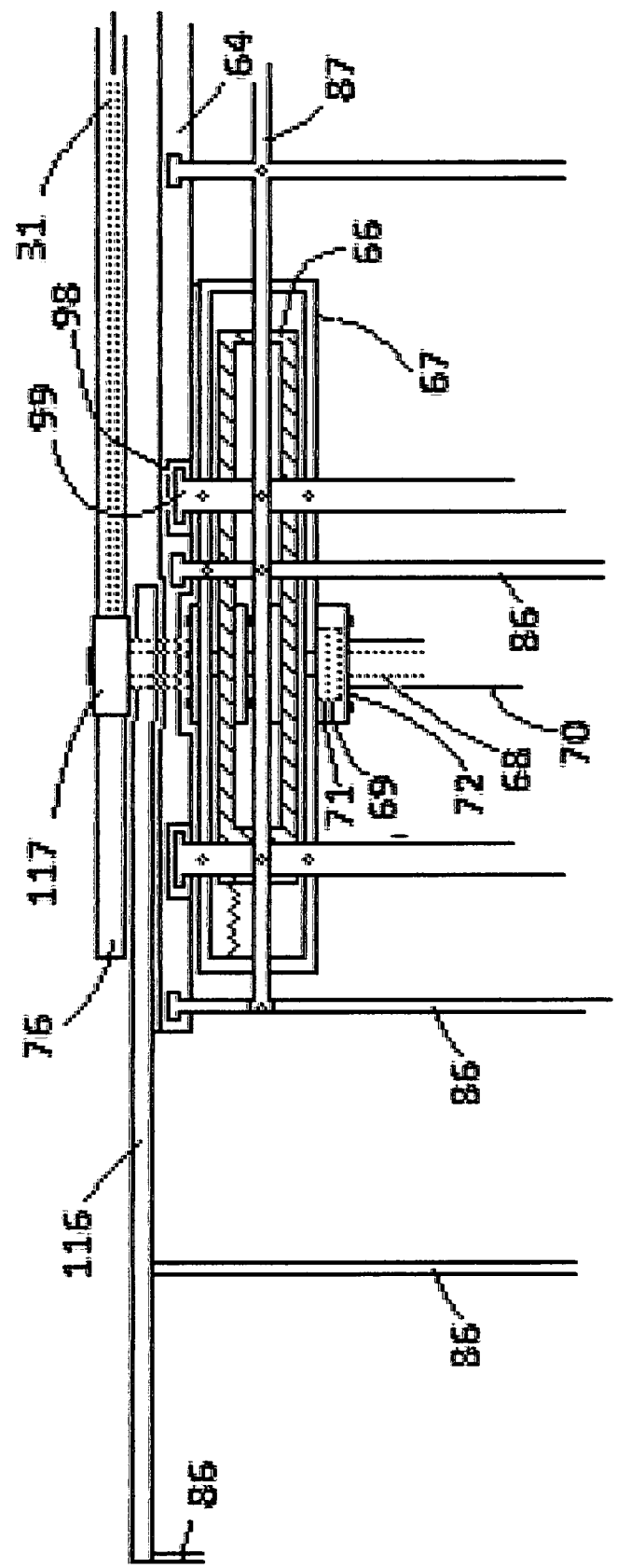
FIG. 11 shows a cross section of a portion of FIG. 10

As seen in the side view cross section in FIG. 11, both the shaft and the axle are supported by bearing means 69 and made independently rotatable by position rotator 117 that is secured to the turbines end assembly 76. Connecting plate 116 is separate but adjacent to its corresponding end assembly 64 allowing the rest of the body of the foil to flex back and forth between the two changing curvatures. Each end assembly 64 covers the remainder of the upper or lower sections of the cambered foil. Each end assembly 64 is mounted to the larger container 67 allowing for slight but snug flexible movement between the two structures. In this model the nose section changes its position by the variable angle/pitch mechanism to which it is attached pivoting in tandem but independently from the profile modification mechanism, and both can be controlled by a position rotator 117 with two rotatable functions.

In this example smaller container 66 rotates eccentrically and is made to counterbalance the moving liquid but does not come in contact with the larger container as it circulates the liquid between it and the larger container 67. The optimum mass weight and viscosity of the liquid are considerations in selecting the type and amount of circulated fluid.

In this example the smaller container is geared to rotate once on its axis as the foil rotates once around the turbine's central axis 21. With each rotation around the turbine's axis 21 the outer surface circumference of the smaller container 66 rotates adjacent to the circulating outer walls of the inter stationary larger container 67.

The surface proximity of these two rotating containers, 66 and 67, works as a type of pump creating fluid pressure. In the first two quadrants of rotation the fluid pressure against the inner circumference of the larger container 67 pushes the leaf spring 2 out on one side into the greater curvature profile, with the series of cross ties 60 extending across the foil simultaneously pulling the opposite side of the foil into the lesser curvature profile. In the second two quadrants of rotation the process is reversed as the lesser and greater curvatures gradually change to the opposite side of the foil as.

FIG. 11 shows a cross section of the upper portion of the cambered foil A60 supported in its corresponding turbine end assembly 76. In this figure the upper end assembly 64 is joined to the profile adjustment/modification mechanism and operates the profile modification of the entire foil. It is also possible to have two activating mechanisms, one in both the upper and lower end assemblies 64 making the lower half of the foil a mirror image of the upper half In this case carriage 99 extends vertically within the interior of the foil connecting each of the opposed end assemblies and activating mechanisms together to operate as one. In this example the nose section with struts 86 and ribs 87 are fixed to connecting plate 116 and tubular shaft 80. The nose section is independently rotated by the variable pitch mechanism controlled by rotator 117 mounted on end assembly 76. In this example rotator 117 also independently rotates the smaller container axle 68 and the profile adjustment/modification mechanism joined thereto.

The smaller container axle 68 is placed at the center balance point of the cambered foil to help equalize the effects of the centrifugal force of rotation on both sides of the foils axis. Part of this balancing effort includes the counter balanced weighted smaller container 66 and the amount and weight of the fluid held in the larger container 67. The smaller container axle 68 is seen in this image as the dotted lines running down the center of tubular shaft 80.

In FIG. 11 is seen a side view of axle 68 joined to the smaller container 66 that rotates within the larger container 67. The larger container's upper and lower surfaces are secured by flanges 71. Within each flange is a bearing housing, with bearing 69 and seals 71 allowing axle 68 and the fluid sealed within 67 to freely rotate there, within the larger container 67, as has been earlier described.

Joined to the upper and the lower cambered foil end assemblies 64 is a pair of carriage slides 98. Carriage slide 98 accommodates carriage 99 that slides inward toward and outwards away from A60's central axis during each rotation. Carriage 99 extends between and is joined to the two opposed end assemblies 64. Carriage 99 is also clearly seen here attached to the larger containers 67 to the series of horizontal ribs 87 and/or leaf springs 2 and vertical struts 86. Together with other parts, the carriage moves the greater portion of A60, sliding back and forth to modify the profile curvatures of both sides of the cambered foil as desired.

Position rotator 117 is powered and regulated by transmission lines 31 (as seen in image "3") that extends to and are regulated by processor 34, position regulator 91 (not shown) that can be located on board and/or transferred electromagnetically or mechanically by slip rings and other known methods to an on ground location.

Figure 12A:
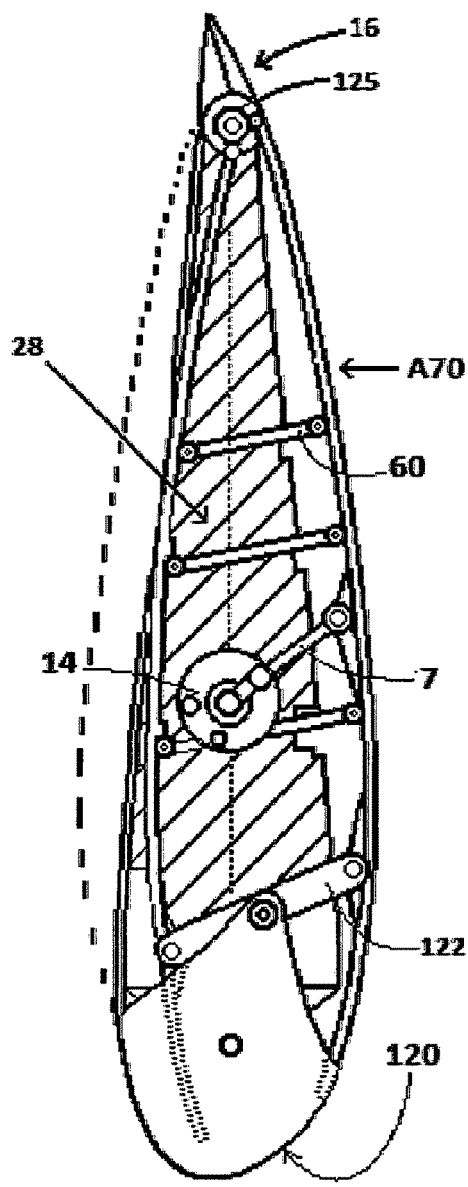
FIGS. 12A-B shows an Ultra-light low inertia cambered foil with a foam core structure 28, two opposed cambered foils side by side showing each foil's opposite in-flight profile position and the articulating rib assembly A70 of the profile modification mechanism A40.
Figure 12B:
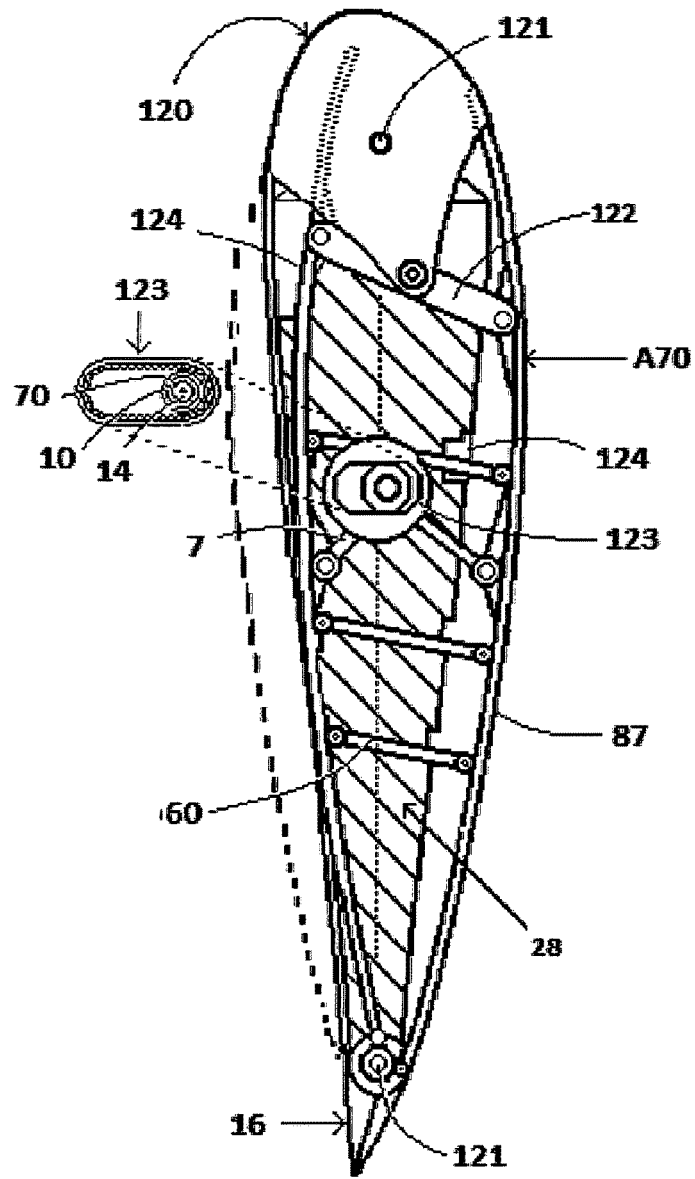

FIGS. 12A-B show two views of an airfoil A70 having different profiles at two rotational positions. In the example of airfoil A 70, ultra-light design materials such as aluminum, a variety of foams, plastics, carbon fiber and other materials with strong light weight characteristics are used almost exclusively.

Ribs 87, struts 86 and supporting structures for exchanging the exterior profiles instead of being flexible are rigid in the ultra-light design. These articulating parts do not change their shape but change instead their position. Therefore rigid lightweight materials with minimum flexibility are desirable. The outer thin membrane is the only surface that is semi flexible and can be made of fabric material with elastic characteristics. Other parts like rib and struts can be made all or in part of rigid aluminum and other light weight plastics or metal. The semi flexible outer membrane reciprocally conforms to the cross braced rib structure of the greater curvature and to the lesser curvature that is the curvature of the core structure.

During a portion of each rotation, on one side of the sweep area, the greater curvature is on the outer side of the foil and the lesser curvature is on the inner side of the foil (e.g. convex on outer side and concave on inner side, or more convex on outer side and less convex or flat on inner side). On the opposite side of the sweep area the greater and lesser curvatures both switch their position to the opposite side of the foil.

FIGS. 12A-B shows core structure 28 installed in two opposed cambered foils side by side showing each foil's opposite in-flight profile position and image 3 shows the articulating rib assembly A70.

FIGS. 12A-B core structure 28: This unchanged symmetric shape is the central body of the foil. The identical exterior surface of both sides of the core structure are the profiles of the lesser curvature. The lesser curvature exterior profile reciprocally appear on one side of the foil after the other within each revolution.

FIGS. 12A-B show the core structure installed in two opposed cambered foils side by side showing each foil's opposite in-flight profile position. The area to the right of each foil, between the core structure and the outer rib, represent the distance the outer surface of the foil must travel from its retracted position against the core structure to its greater curvature profile position. (Note: These two shapes are more apparent as they appear in FIG. 15 where they each become a bladder.

The only changes necessary to flip the greater and lesser curvature of the foil's opposed profiles is to rotate the linkage that pivots the nose section 120 and tail sections 16 on axle 121 opposite one another, accommodating the greater length of the extending greater curvature rib profile as it moves out away from the core profile while pulling the opposite rib connected by the series of cross ties 60 inward to the lesser curvature profile against the core structure. This process reverses reciprocally from one side of the foil to the other within each rotation.

In addition, the individual profile of the tail assembly 16 and nose assembly 120 are symmetrical and reciprocally pivot their position back and forth to reorient each to the flipped curvature profile.

As seen in FIGS. 12A-B the core structure 28 has recesses visible from this top view that usually extend down the vertical length of the foil. These recesses 124 either accommodate the struts 86 or towards the nose section, the nose assembly yoke 122. Other recesses down the length of 28 can accommodate additional rib assemblies 70.

The body of the core structure 28 can be made of a durable foam material with the core's exterior surfaces, including the recesses, encased with a skin of thin light weight durable material like fiberglass or carbon fiber and resin. Because the ribs and struts are rigid and identical they can be machined out of aluminum or other light weight rigid material creating an ultra-light easy to manufacture cambered foil.

FIGS. 12A-B show the core structure 28 with its optional main bearing with lateral roller guide 123. A larger rendering of 123 (in the puled by dotted line), at the center of the figure of the bearing can be seen in enlarged view in this figure. Main bearing with roller guide 123 as seen at the center of the weight load of the foil around main axle 14 may be required to allow the foil's main axle 14 to have guided lateral movement by bearing means to adjust the foil's changing profile. Roller guide 123 is seen in the right foil by removing some linkage 7 for visual purposes. When the foil changes its profile curvature the core structure is free to adapt to the lateral movement of the articulating rib assembly A 70 within the confines of the roller guide. The foils centrally located main axle with bearing 14 has bearings on the inside of its bearing housing that rotate on the main axle and a race on the outside of said housing that can move laterally within the elliptical confines of the roller guide.

The rib assembly A70 includes, but is not limited to, the tail flange 125, each opposed ribs 87, ball joints 59, yoke 122 and a plurality of rigid cross ties 60. Each cross tie 60 can be attached at both ends by pivot pins 59 to and between the opposed ribs to make a sturdy and when desirable a flexible foil body. This is important when employing a variety of starting mechanisms seen in succeeding figures.

Instead of being flexible to spring back and forth between the two curvature profiles, each rib 87 in this design is rigid and identically shaped into the greater curvature profile. The shape of the opposed side profiles of the core structure 28 are also rigid and identically shaped in the lesser curvature profile previously mentioned.

Because the rib assembly and core structure are rigid they can be made of strong lightweight materials. To further strengthen the core structure, it can be covered with a sturdy plastic or laminated shell made for example of carbon fiber, and resin, fiberglass fabric and resin, and fiber particle in resin emulsions. The shell like surface can cover the exterior of the structure including the channel through the core for the cross ties 60 and axles, shafts and other indentations to accommodate moving and inter-stationary parts.

Figure 13:
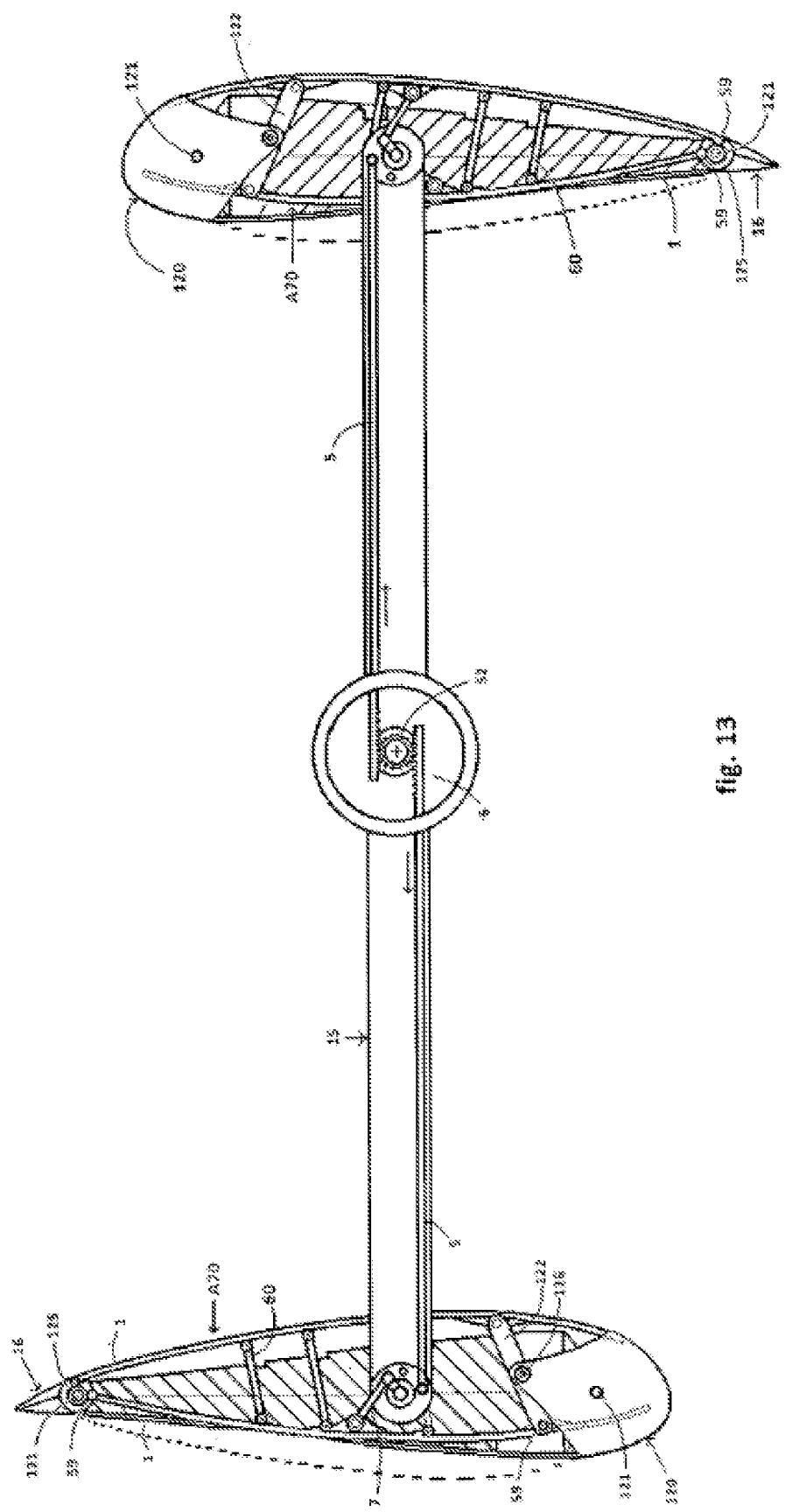
FIG. 13 shows two 180 degree opposed cambered foils. These two opposed airfoils constitute one of two airfoil pairs, one pair is held perpendicular to the other, making a turbine with four foils evenly spaced at 90 degree intervals around the sweep area. This figure and the next figure demonstrate advantages of counter balancing the centrifugal force of the mass weight of mechanisms moving outward away from axis 21 connected to those on the opposite side of the sweep area moving inward towards axis 21.
Figure 14:
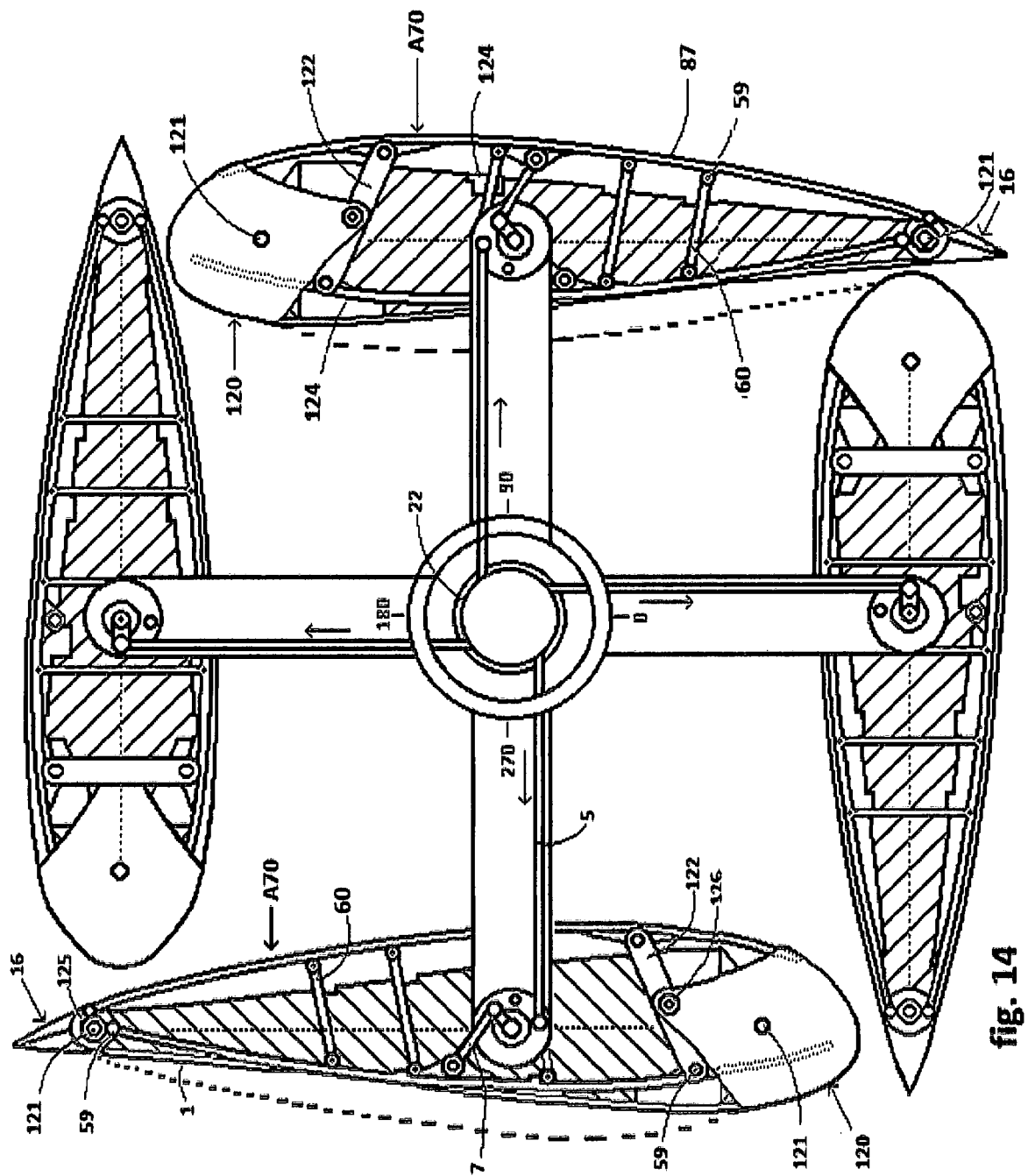
FIG. 14 shows the turbine from FIG. 13 with all four cambered foils showing the profile modification mechanisms in their transitional positions.

FIG. 13 shows two opposed cambered foils. In FIG. 14 all four foils are shown. FIG. 13 shows only one pair of opposed cambered foils 180 degrees apart for illustration purposes.

From this vantage point, the advantage of counter balancing the centrifugal force of the mass weight of mechanisms moving away from axis 21 connected to those on the opposite side of the sweep area moving in towards 21 becomes apparent. The energy necessary to power the activating mechanisms is not increased by the centrifugal force of rotation but reduced because of this arrangement. Operating opposing configurable airfoils on opposite sides of the central axis in combination may include combined operation by an angle adjustment mechanism, or by a profile adjustment mechanism, or by both. Adjustments of one airfoil may be opposite to adjustments for the airfoil on the opposite side of the central axis. Thus, as one airfoil is angled inwards (towards the central axis) its counterpart on the other side of the central axis may be angled inwards in a reciprocating arrangement. As one is cambered out, its counterpart is cambered in. This provides balance and allows changes in one airfoil to offset changes in the opposite airfoil so that balance is maintained.

With this four foil design, a minimum of energy is used in the articulations of the profile modification mechanism or for that matter, any of the efficiency enhancing mechanisms described herein. This efficiency is the result of the centrifugal force pushing out on one side of the sweep area extending the greater curvature, as it is counter balanced by the centrifugal force pulling against the greater curvature transferring to the inner side of the foil on the opposite side of the sweep area. Because the centrifugal force on the opposed mass are equal and opposite, the net centrifugal effect of the mechanism's changed movement is zero and the inertia effect is just the energy necessary to move or switch the position of the mechanisms.

In this example the tail assembly 16 and nose assembly 120 both pivot back and forth on their corresponding end assembly axle/fastener 121. The end assembly axle fastener most often extends through the core structure, joining the two ends of the pivoting tail and nose assembly and the rest of the foils to the two opposed end assemblies 64.

Each rib 87 in the rib assembly 70 pivots away from the center broken line seen down the center of the foil. Each rib extends out beyond to core structure's lesser curvature profile to the greater curvature profile position from one side to the other reciprocally within each revolution. When each side of the foil takes its turn assuming the lesser curvature side, each corresponding rib in the assembly is pulled inward either over the corresponding end of the core structure or if the rib is adjacent to the core structure the rib is pulled into the recessed area provided within the core structure.

Ribs 87 move back and forth from their greater curvature position to their retracted position as the outer semi-flexible membrane changes its curvature to conform to the lesser curvature profile that is the profile of the core structure.

This reciprocal action can be achieved by many methods know in the art of Mechatronics. A mechanical example is herein provided that uses the centrifugal force of rotation to change the profiles from one side of the foil to the other.

The following describes the mechanical sequence. The tail assembly 16 and nose section 120 are pivoted on their corresponding axles 121 with nose section 120 also counter pivoted on nose assembly/yoke bearing and pin 126 by the end of each rib mounted on tail flange 125, by ball joints 59 with the other end section of each rib mounted to opposite side of yoke 122, also in this example on a ball joint 59. Nose assembly 120 is also pivoted on bearing and pin 126 secured in a rotatable fashion to yoke 122. When rib assembly 70 is engaged by the profile exchange levers 7, moved by push rod 5 extending down hub arm 15 to rack gear and pinion gear at the central hub surrounding axis 21.

FIG. 14 Shows the two pairs of cambered foils held directly apart at 180 degrees by their respective hub and arms 15 with the identical pair of cambered foils and end assemblies held perpendicular to the first, creating a turbine with four cambered foils identically spaced 90 degrees apart within the sweep area and around axis 21. (Note: The sweep area of the turbine has been decreased by shortening the arms 15 so all four foils will fit on the same page for viewing purposes. Arms 15 are not to scale. The stationary degrees of rotation 0, 90, 180 and 270 correspond to this figure's narrative. These numbers are arranged around the turbines central hub).

The area between the lesser curvature of the outer side of the core structure 28 and the outer rib at full extension is seen on the far right of FIG. 14 where the foil is at 90 degrees of rotation. As this cambered foil reaches 180 degrees of rotation the area between each of the foil's two opposed ribs 87 and the two exterior sides of the core structure will be equal in size. In this position the profile adjustment mechanism is in its neutral symmetrical position. As the foil rotates to 270 degrees the area between the inner side of the core structure and the inner rib will be of the same size as at 90 degrees except this will be on the inner side of the foil. As the foil completes its rotation at 0 degrees it will return to its neutral symmetrical position with the space between the core structure and the ribs equal again like it was at 180 degrees Research and testing may determine how to regulate the variable pitch mechanism to adjust the cord angle within the rotation relative to the regulation of profile modification mechanisms exchanging the curvatures to gain the maximum efficiency by the cam 22 at the main shaft for a given turbine in a given set of conditions (e.g. wind speed, gust range, air density, temperature, etc.)

Figure 15A:
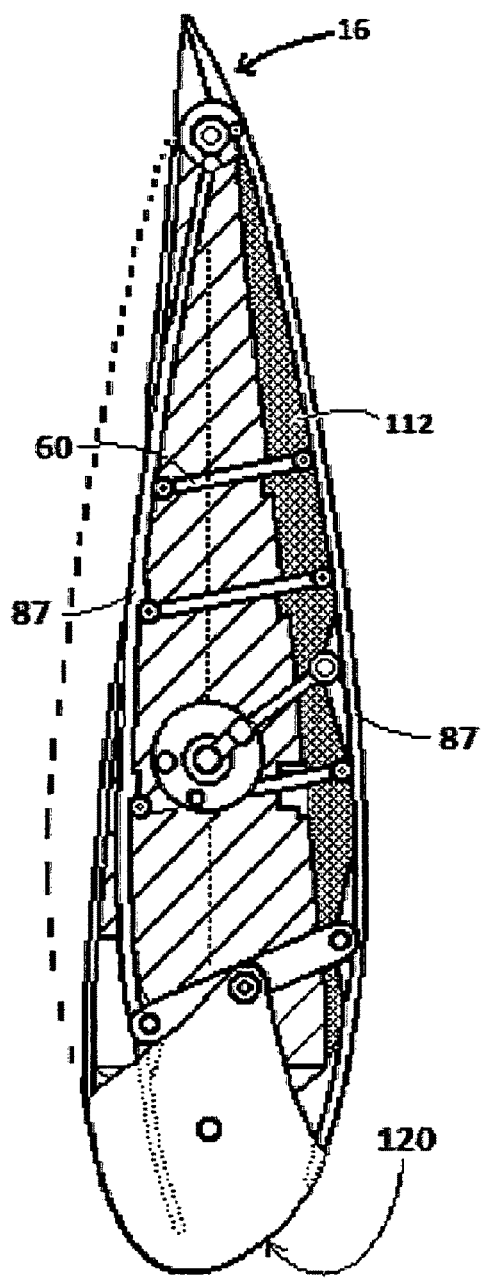
FIGS. 15A-B shows two images of a cambered foil that has two opposed bladders that pass compressed air back and forth there between, reciprocally exchanging the greater and lesser profiles each cycle.
Figure 15B:
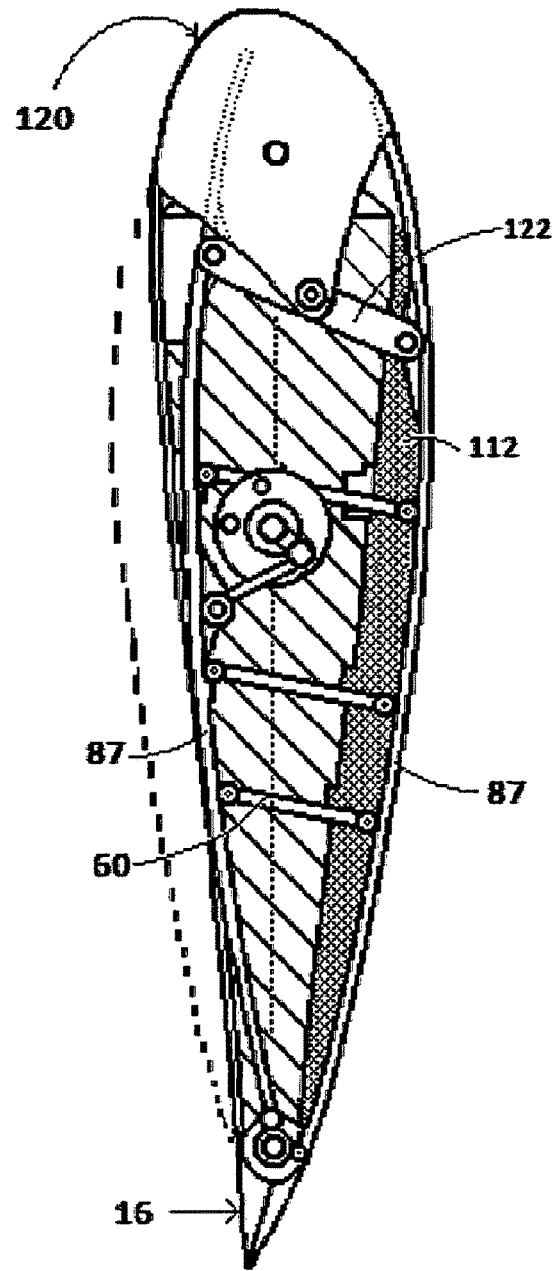

FIGS. 15A-B show a cambered foil that has two opposed bladders that pass compressed air back and forth between them, reciprocally exchanging the greater and lesser profiles from one side of the sweep area to the other. The two cambered foil in FIGS. 15A-B are images of a single foil in two opposite in-flight profile positions.

The hatched area is the core structure 28 and the cross hatched area in this figure represent the inflation of one of the foil's pair of bladders 112. Each side of the core structure between the core structure 28 and the ribs 87 is a bladder. Each rib 87 has a plurality of tie rods 60 extending across the airfoil joining each of the two opposed ribs 87. The foil of has its outer bladder inflated in the greater curvature profile in FIG. 15B and is seen again on the left 180 degrees advanced rotation of FIG. 15A with its inner bladder inflated to the greater curvature position. Each side of each foil passes fluid back and forth through by-pass tubes that extend through the space provided in the core structure 28. Each bladder is exactly the same size so the psi in each is balanced and equal. The energy necessary to exchange the fluid back and forth is also equal in each foil. Here again, because the pair of opposed foils are connected by linkages down the hub arm 15 and directly through the central hub, the net effect of centrifugal force on the two mechanisms exchanging position is zero. Therefore energy expended to exchange the positions of the two mechanisms is equivalent to the inertia of movement thereof. This is specifically true of the three efficiency enhancing mechanisms identified on page 1.

Figure 16:
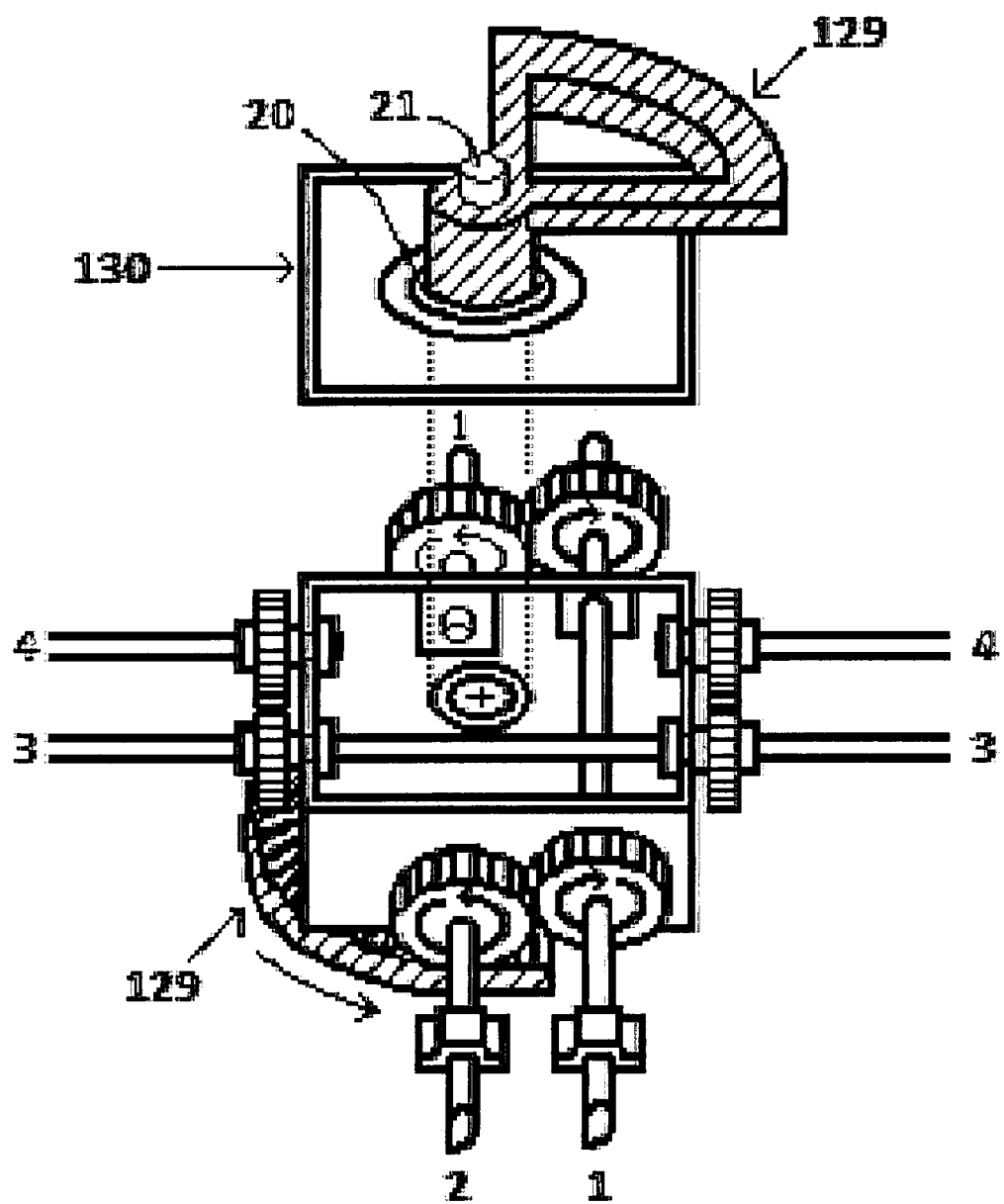
FIG. 16 shows an example of transmission design. The reciprocal counter pivoting functions on each side of the sweep area in a single revolution is characteristic of the basic function of this transmission. These functions make it adaptable with slight modifications to run the multiple function of the reciprocating efficiency enhancing mechanism.

FIG. 16 features a transmission that is located in the hub of the turbine's rotating end assembly 76. With a transmission in each end assembly this transmission is a mechanical option to run four independent reciprocating attachments. Transmission may simultaneously run multiple independently regulated efficiency enhancing mechanisms like those described in the examples above. A transmission is generally comprised of two sets of pinion gears that are joined to each shaft. There are two pairs of parallel adjacent pivot shafts 1-4 that extend through transmission, one pair of pivot shafts 1, 2 that extend perpendicular to the other pair of pivot shafts 3, 4.

The reciprocal counter pivoting function on each side of the sweep area of each pivot shaft in a single revolution is characteristic of the function of transmission. Therefore each pivot shaft of each pair extending directly out of the transmission to its corresponding foil can independently run the reciprocal movements of its assigned mechanism. Having this transmission arrangement operating from each hub on each opposed end assembly 76 can make either a more robust turbine or each opposed transmission can operate independent mechanisms, doubling the implementation capability to four separate mechanisms.

This adapted transmission can simultaneously regulate the position of each foil's three optional mechanisms (angle adjustment mechanism, profile adjustment mechanism, and twist/spiraling mechanism) by transitioning the parts of each mechanism into their alternative positions on the opposite sides of the sweep area to regulate and counter balance the opposed wings and wing position relative to both sides of the sweep area.

For example, the variable pitch mechanism pitches the cord angle out on one side approximately the same degree that it pitches the cord angle in on the other side of the sweep area. A spiraling starting mechanism may rotate the upper foil section opposite the positions of the lower section and can also, when desirable, change the position of the upper and lower sections to their opposite spiraled position on the opposite side of the sweep area to achieve a lift propeller effect.

The circular transmission cover 130 has openings to accommodate the pivot shafts 1-4 exiting the transmission and is supported and joined to the turbine's rotating hub and/or end assembly structure. It functions to aerodynamically enhance the central hub portion of the turbine.

As seen in FIG. 16 at the right, the pivot shafts 1 and 3 are the driver shafts that extend through the transmission. Each driver shaft has two pinion gears that are joined thereto. The pinion on the driver shaft runs the rider shaft. Each pinion gear pair is supported by bearing means within each sidewall of the transmission. The transmission staggered placement of the pivot shaft 1 is closer to the top cover of the transmission and pivot shaft 2 is closer to the lower cover. The two pivot shafts in each pair are staggered to allow the two perpendicular driver shafts in each pivot shaft pair to intersect in the transmission extending under or over the other. With this arrangement the teeth on the pinion gears 52 at each side of transmission on driver shaft 1 and the pinion gears on rider shafts 4 on both sides of the transmission extend above the top cover allowing them to engage with the quarter ring gear portion 129 seen directly above delineated by the shaded hatched lines. The pinion gear on rider shaft 2 and driver shaft 3 extend out the lower side of the transmission allowing them to engage with the lower quarter ring gear portion 129. Both the upper and lower ring gear portions in this design are stationary and are grounded to the stationary axle.

The upper cover of the transmission is seen raise up to show the inside of the transmission. The dotted lines of the turbine's main shaft 20 show the shaft fixed to and extending through the transmission The transmission placed around the axis of the turbine is made to rotate by the incident fluid current causing the pinion gears 52 that extend above the upper cover and lower pinion gears 52 that extend out below the lower cover to mesh with the upper and lower stationary ring gear portion 129 which causes the pivot shafts 1+4 and 2+3 to gradually and reciprocally rotate to a counter position each 180 degrees. With methods known in mechanical art this reciprocal counter pivoting movement of the pivot shafts can be used to engage the foil's various on board mechanisms.

The turbine's rotating assembly rotates on upper and lower main bearings and lower thresh bearings around the stationary axle that goes to ground. The rotating main shaft connected to the lower end assembly can also have a stationary anchor that has bearing between it and the tubular drive shaft that extends down the stationary shaft to ground level by bearing means where it is used as the power take off that turns the on ground generator. The stationary anchor plate can also be attached on the stationary axle between the upper and lower main bearings to support the turbine by transferring the lateral loads to the ground by the triangulation of a plurality of cables as seen in FIG. 9.

As seen in FIG. 6 above, a configurable airfoil may be configured to create high/low drag at different rotational locations so that torque is achieved and rotation is initiated. The example of FIG. 17 modifies the airfoil's vertical profile creating a drag profile to start the turbine rotating. When necessary rpm is reached, the modified Darrieus turbine transitions into its lift mode.

Another embodiment includes a spiraling starting mechanism. By constructing a foil that has opposed independently rotatable end assemblies 76, with a flexible body there between, the spiraled shape of the foil creates the lift characteristics usually associated with a propeller. This mechanism is one of several described in this application that address self-starting, a mechanism that is also productive at low wind speeds.

Figure 17:
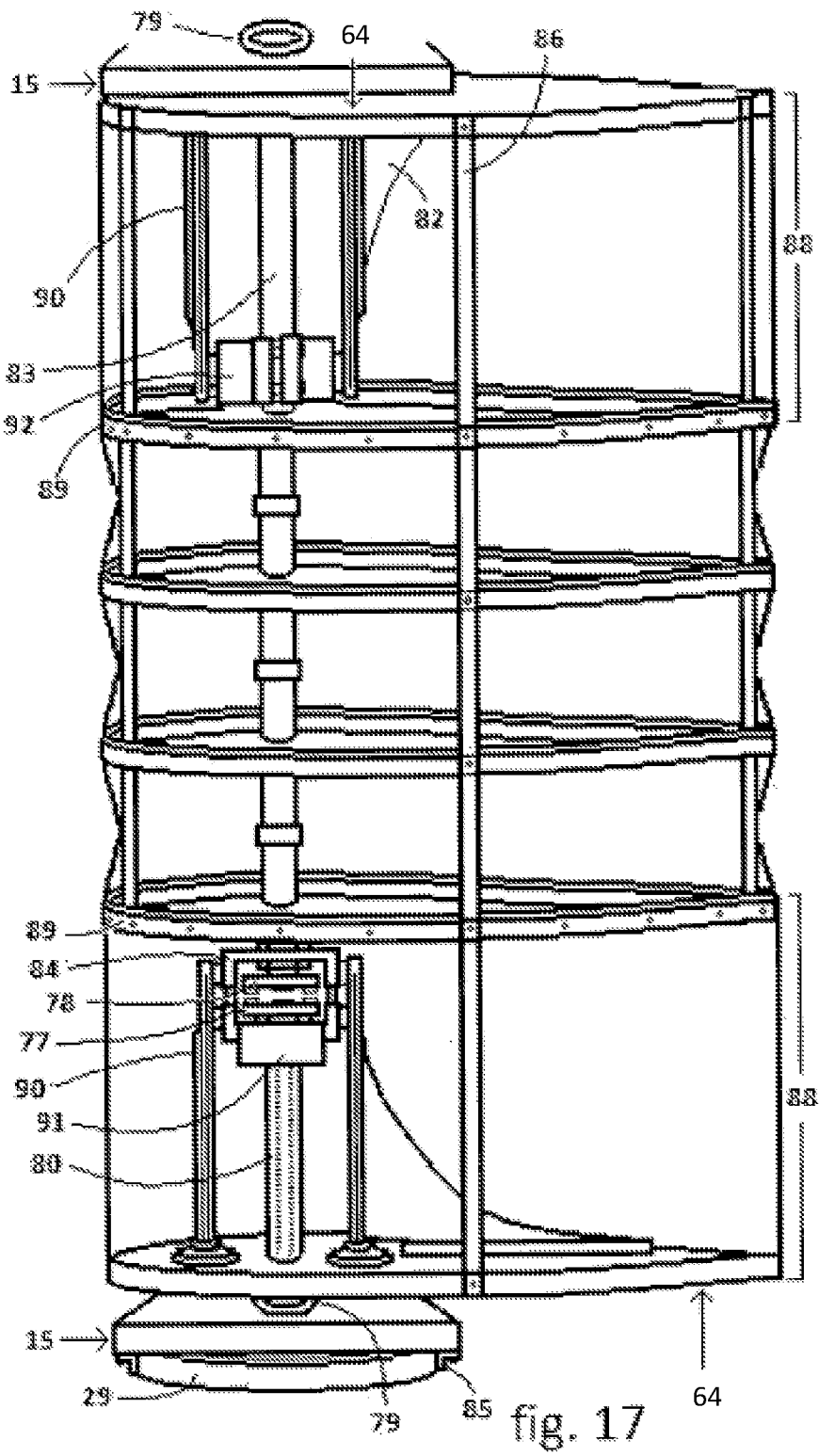
FIG. 17 shows aspects of a spiraling or twisting mechanism.
Figure 18:
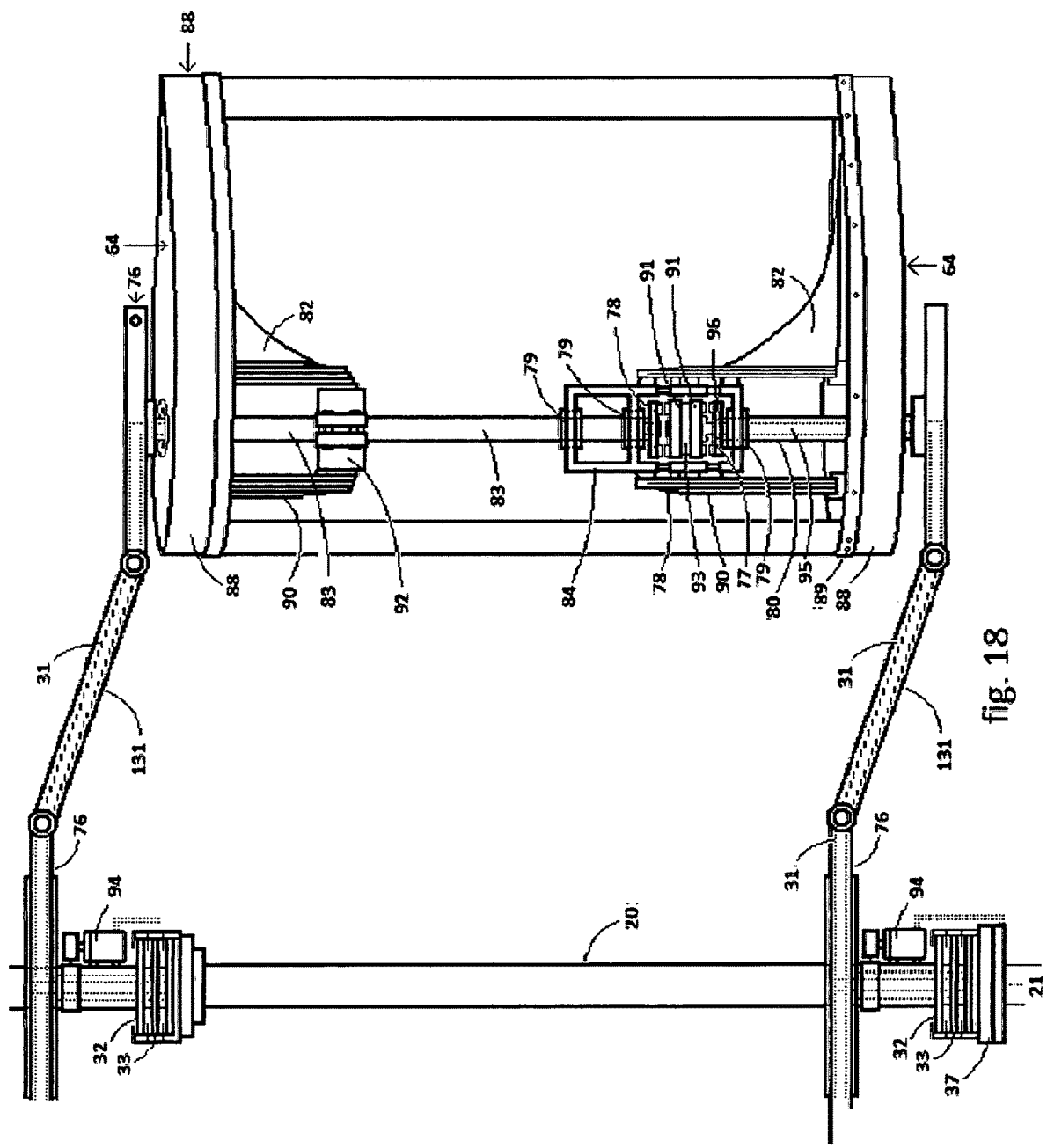
FIG. 18 shows aspects of a spiraling or twisting mechanism.
Figure 19:
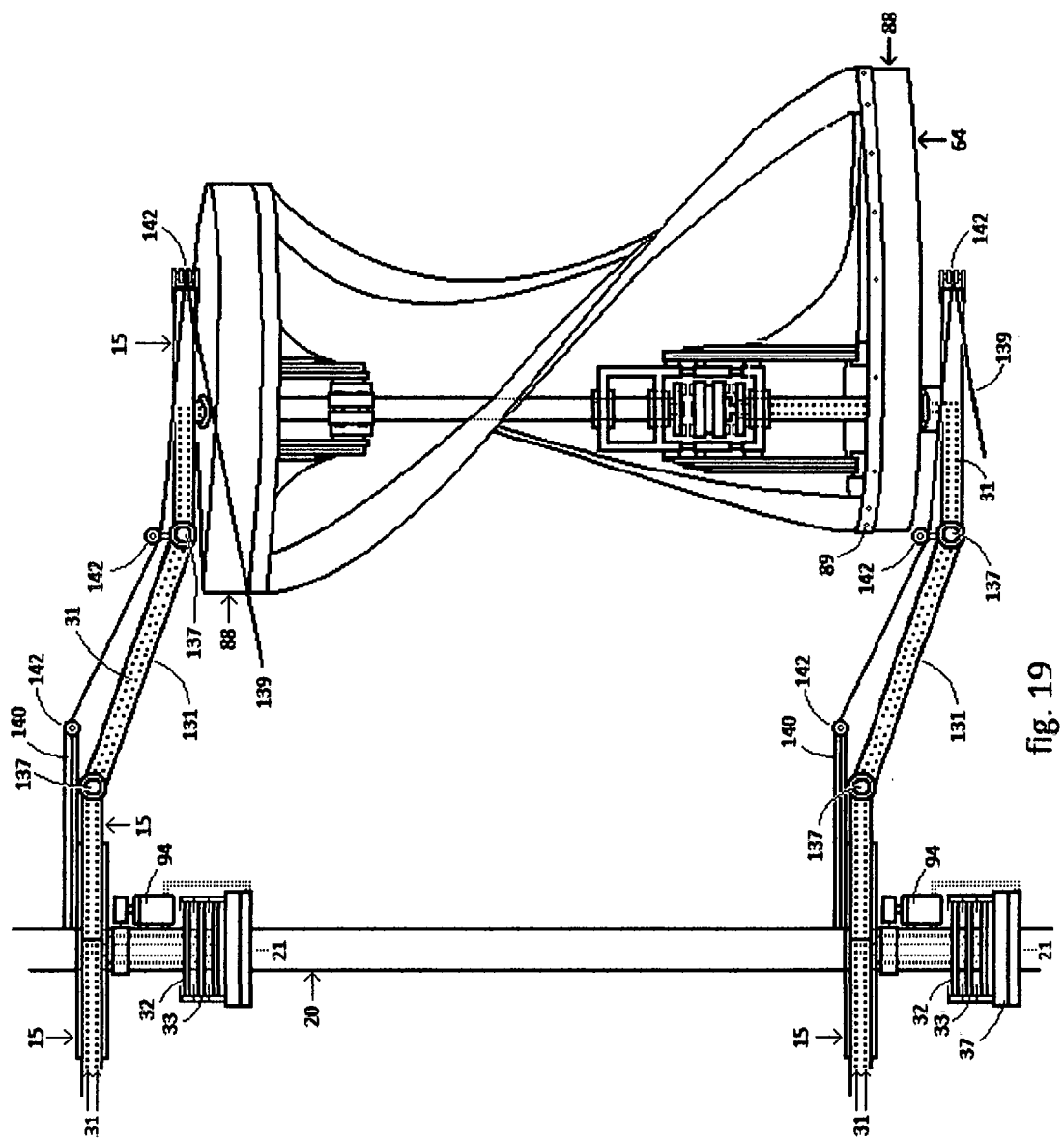
FIG. 19 shows aspects of a spiraling or twisting mechanism.

With this capability the spiraling starting mechanism and the vertical pitch mechanism can be regulated by a single or dual system. FIG. 17, and FIG. 18 and FIG. 19 show models with similar operating capabilities. There are many known ways in (e.g. in the Art of Mechatronics, pneumatics, hydraulics, etc.) to counter rotate each of the two opposed ends of two shafts with a fixture attached to the shaft's opposite ends. The mechanisms in this application are given as examples and are not meant to be limiting.

In the examples of FIGS. 17-19, each airfoil A60 can, within part or all of a rotation, pivot its upper end assembly 64 in one lateral direction while simultaneously counter pivoting its lower end assembly 64 in the opposite lateral direction. Or one end assembly can stay regulated to optimum variable pitch mode and/or profile modification mode position while the other end assembly is independently rotated and/or counter rotated.

When the upper end assembly 76 is rotated and the lower end assembly is counter rotated, its vertical members between are placed into a vertical spiral like curvature. This shape enhances lift characteristic of the airfoil, in essence transforming the straight bladed Darrieus airfoil into a propeller like shape. Each foil can be regulated to optimum rotational rpm until the controlling system returns each airfoil to its straight bladed Darrieus profile if desired or when rpm is sufficient to enter into the lift mode with the variable pitch mechanism engaged, trimming the cord angle of each airfoil to its optimum position relative to the increments of its rotation. When the airfoil is in its "spiral" curvature it will be slightly shorter than when it straightens into the standard straight bladed Darrieus profile. Therefore an upper and lower straight or spiraled spline gear attaching the foil to pivot shaft may be used to correspond to this reduced height.

FIG. 17 shows the basic structure of the airfoil embodiments, including the ribs 87 or spar and skin attachment rim 89 and or struts 86. The plurality of ribs and spar have multiple inter connections where one crosses and overlaps the other. Each connection is constructed in a way that preferably allows the two surfaces to pivot smoothly against one another with minimal friction, using lubricated connectors, slip washers and other connecting methods facilitating freedom of movement that allow the foil to remain flexible and smoothly spiral in either direction. The struts 86 can be made out of a sprung steel or a lighter material with the similar flexible spring like characteristics. The skin over the spiraling portion can be changed as a maintenance procedure removing and replacing attachment rims 89.

FIG. 17 shows the basic structure with the ribs and a spar 86 for an example. In this example the outer profile of the ribs are reinforced by a rigid plate there between that are joined in rotatable manner to primary shaft 80. The foil structure can be made with a plurality or series of rigid or flexible ribs, covered with an outer flexible light and strong outer covering. As the vertical profile changes the outer perimeter of the ribs are held in place by a skin that can stretch into a spiraled shape and return to its straight vertical position.

FIG. 17 shows two end assemblies without the optional additional spars to give an unobstructed view of the spiraling starting mechanism working parts. It is appreciated that the spiraling starting mechanism can operate a variety of attachments that alter a foil's vertical profile and the curvature profile of a cambered foil. The capability of altering the vertical and horizontal profile offers engineers many dimensional design options that can be tested.

For example in FIG. 17 a pair of pivot shafts sections, sectioned pivot shaft 83, between the two end assemblies 64 creating two aligned pivot shafts, one serving the lower foil end assembly 64 and the other serving the upper foil end assembly 64.

This airfoil design is constructed with an upper and lower independently rotatable end section 88 that includes but is not limited to an end assembly 64, the strut or outer covering attachment rim 89 attached to the side rigid section 88 of the cambered foil. Each rotatable foil end assembly section 88 is supported in its corresponding turbine end assembly 64 by bearing and bearing housing 79. Each rigid section of airfoil 88 can be regulated to pivot laterally in either direction. In this design the rigid sections 88 do not alter their profile. 88 can be of varying size, taking up more or less of the total foils surface area. The rigid assembly adds structure and basically serves as the fixture for the strut attachment rim 89 that secures the flexible out skin 1 that is the outer surface of the foil between the two opposed end sections 88.

In this design a stepper motor 29 that rotates the primary pivot shaft 80 and attached assembly. Stepper motor 29 is fixed to the turbine end assembly 76 by attachment fixture 85.

Primary pivot shaft 80 is fixed to the lower airfoil end assembly 64, the end assembly brace 82, both sides of the extended rigid airfoil section 88, and the pylons 90 that extend vertically adjacent to shaft 80 and fixture 84. The Support and bearing fixture 84 is attached to the primary pivot shaft 80 and houses the secondary driver 77 within its perimeter. All the above parts in this paragraph move in unison and are regulated by the stepper motor except the secondary driver 77 that is independently rotated by the position regulator 91 and the secondary rotator that uses 84 as its bearing housing.

The processor and position regulator, in this case the stepper motor, have dual transmission lines that transfer their current and impulses by slip rings through the center of the turbines tubular rotating main shaft and out the arms of the end assemblies 76. One set of transmission lines runs and regulates the stepper motor and lower rotating assembly and the other supplies the position regulator 91 and secondary driver that independently rotate the corresponding secondary rotator that is also housed in fixture 84. The rotator is joined to the secondary pivot shaft 83 and, independent of the stepper motor, regulates the rotation of the airfoils upper assembly.

The feed lines that run secondary driver 77 and secondary rotator 78 run up the airfoil central tubular axle to the slip ring in the lower part of the 84 supply and distributing charges from the processor to position regulator 91 within the support and bearing fixture 84 to the secondary rotator. Other methods know in the art of Mechatronics may be used to achieve these objectives.

Note: Another option is to have a stepper motor above the upper assembly that takes the place of 77 and 78 and position regulator 91. This arrangement of two stepper motors, one above and one below each foil is seen in FIG. 5.

The upper assembly may be constructed almost entirely like the lower.

Starting from the top of FIG. 17 is seen the upper turbine end assembly 15 and lower 15 supporting airfoil in end assembly 64 in a rotatable manner 64 supporting the sectioned pivot shaft 83 by bearing means 79.

The secondary pivot shaft 83 is fixed to the rigid airfoil section 88, pylons 90, and brace 82 like the lower end assembly and to the keyed split collar. The opposite end of the secondary pivot shaft 83 is fixed to the secondary rotator 78. This upper assembly unlike the lower assembly is not fixed to bearing fixture 84. Secondary pivot shaft 83 and secondary rotator 78 are supported by bearing fixture 84 in a rotatable fashion by bearing means in hearing housing 79 that is part of fixture 84. The tubular axle 93 runs up the primary pivot shaft 80 and is the conduit for the transmission lines to the position regulator and secondary driver 77 that transfers the charges electromagnetically to the magnetic secondary rotator. (Transmission lines 31 is delineated by a double broken line extending up primary pivot shaft 80.)

FIG. 18 is a rendering of an airfoil with a spiraling (or twist) mechanism 80 disengaged so that the airfoil is not twisted or spiraled and has the same angle with respect to arms 15 from top to bottom. FIG. 19 is the same airfoil with spiraling (or twist) mechanism 80 engaged so that the airfoil is twisted or spiraled and has a different angle with respect to arms 15 at different heights.

In the example of FIG. 18, instead of a ribs structure keeping the symmetric or cambered profile are the area between the opposed end sections 88, an air filled bladder 112 performs that function. The bladder is inflated with compressed air to and operating psi.

Also featured in this FIG. 18 is a controlling system that can be fitted to nearly all designs of airfoils. The controlling system in this example is powered by on ground storage batteries 37 and/or the turbine's generator 94 that supplies the power to operate the electromagnets and processors that rotate the neodymium magnets of the position regulator. The current is transferred into the turbine's rotating tubular main shaft 20 by slip rings 32 and brushes 33 at or below ground level. The conduit lines 31 (delineated by dotted lines) run up the main shaft through the end assembly 76 out its hub and hub arms 15 to each of the plurality of foils A60, up the foil's inter-stationary axle 96 that is joined to and moves in unison within the turbines end assembly 76. Axle 96 is joined at its opposite end to the position regulator 91 that consequently is also inter-stationary with end assembly 76.

Position regulator 91 has an upper and lower array of electromagnets that serve as the primary driver. The polarity of each magnetic array can be switched by reverser 93, by being turned on or off, to send the same or opposite charges to the secondary driver 77 attached to the lower end assembly 75 and the secondary rotator 78 joined to the upper secondary pivot shaft end assembly and its other attachments.

Thus the circuits of the position regulator 91 can be reversed, reversing the magnetic charges to the upper and lower half of the foil. This reversal will cause the secondary rotator 78 to pivot in the opposite direction of 77, engaging the spiraling mechanism to start the turbine as seen in FIG. 19, Secondary rotator 78 is fixed to the secondary pivot shaft 83 that is supported in two places by pivot shaft bearings and bearing housings 79, both bearings housed in support and bearing fixture 84. The secondary pivot shaft 83 is joined to the keyed split collar 92 that is joined to the upper support pylons 90 that are joined to end assembly brace 82 and the rigid airfoil section 88 in a mirror image of the lower end assembly.

When optimum rpm is reached or when desired the reversing circuits 93 can change the upper and lower foil sections back to their vertically aligned position where the upper and lower end assemblies 64 are in the straight bladed Darrieus vertical profile. The air bladders can be recharged in this position and the variable pitch mechanism can be engaged or continued to trim the cord angle of the straight foil to its optimum pitch angle relative to the increment of its rotation around the turbine's main axis 21.

In FIG. 19 are seen a version of the "centrifugal force support system" and the "cable support system". The upper and lower hub arms have an intermediate angled hub arm section 131 allowing the centrifugal force of rotation to extend and pivot the hub arm on axles 137 to the hub arm assembly's fully engaged position, 90 perpendicular to the central axle 21, raising the turbine's rotating assembly and increasing the radius of the sweep area. This is an example of a passive system that only depends on the placement and length of the cable tension lever 140 to maintain a constant tension on the cables as the hub arms raise and lower.

The cable support system is also seen in FIG. 19. Lateral support cable 139 is fixed to main shaft 20 extending out cable tension lever 140 and over the cable spool 140 extended end extending further out the angled hub arm 131 under spool 142 directly above axle 137 and out 15 around cable spool 142 at the extended end of 15 and over to the cable spool 142 at the end of the hub arm 15 from there cable 139 extends diagonally 90 degrees to the left where the cable retraces it way in the reverse order from the adjacent extended hub arm over the series of spools over the other hub arm's cable tension lever 140 back to the main shaft where the opposite end of 139 is fixed.

As the hub arms of the turbine assembly raise and lower from the centrifugal force of rotation the cable tension lever is of a length and the cable spools are at a position that hold the cable at an angle that has the net effect of allowing the sweep area and the circumference of the rotating assembly to expand all the while maintaining the same tension of cable 139 that supports in an evenly spaced manner the plurality of hub arms and rotating airfoils that are all likewise equipped.

As seen in FIG. 19 the size ratio between the rigid cambered foil sections 88 and the flexible spiraling center section can vary. In this design the majority of the foil can modify its profile and the central part of the foil can spiral and return to either a cambered or symmetrical foil shape.

The foil presented in FIG. 19 is optionally equipped with a profile adjustment mechanism and an angle adjustment mechanism.

The cambered foil in FIG. 19 has an upper and lower rigid section 88 with the articulating rib assembly 70 installed with the profile modification mechanism. Between each rigid section 88 is a mid-section that has an inflated nose and tail section, each attached at both ends to the corresponding nose or tail sections of the upper and lower cambered foil section 88. These flexible nose and tail sections are rigid enough to hold their in-flight profile, but flexible enough to be pulled at both ends by the counter rotated rigid foil sections 88.

Figure 20:
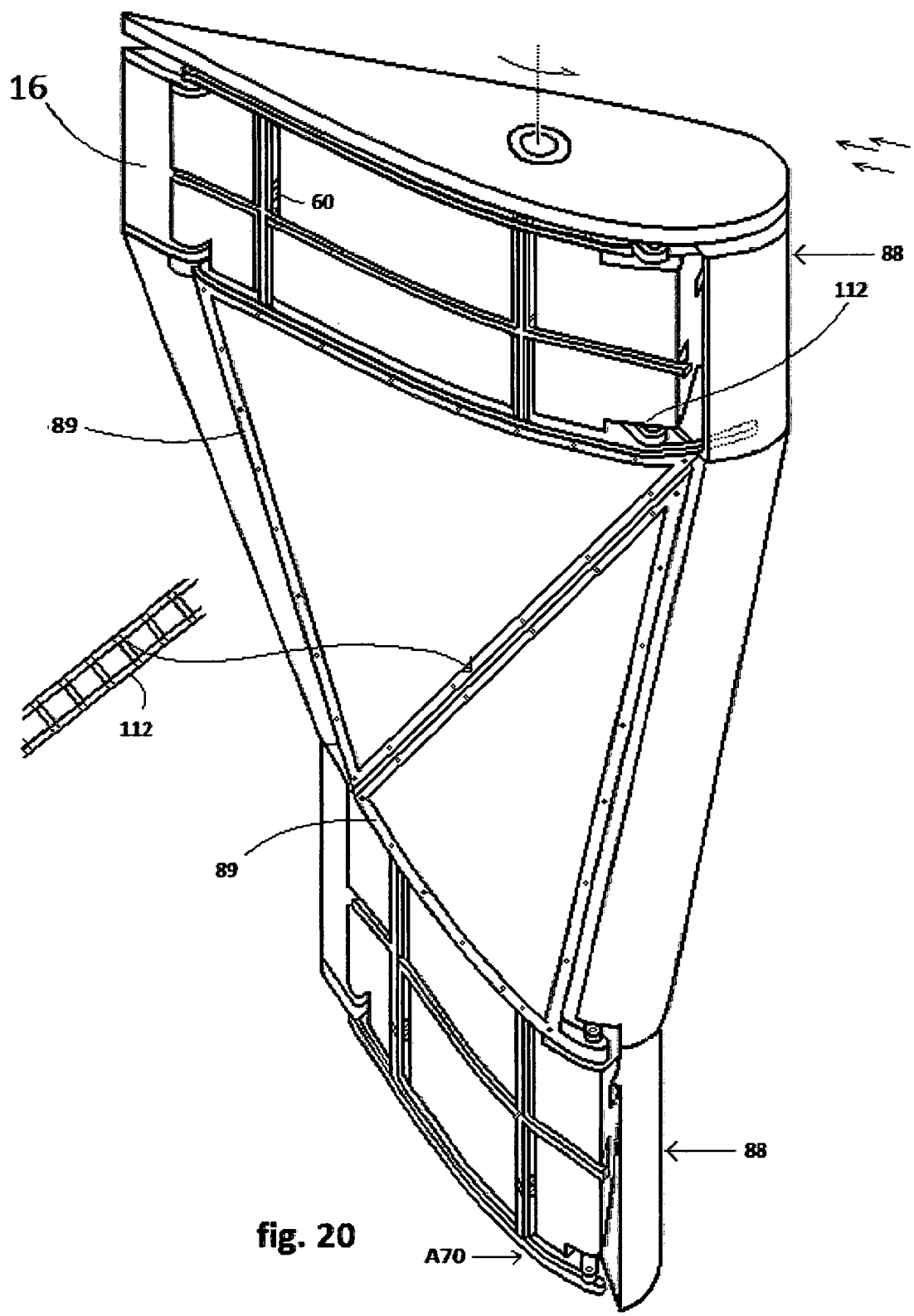
FIG. 20 depicts a cambered foil with a spiraling mechanism that consist of triangulated collapsible panels that return to their cambered or symmetric lift position by an interior inflatable device is a graph showing Cp vs. rpm.

FIG. 20 has end sections 88 with several sets of profile modification rib assemblies A 70 in each section. Both the inner side and outer side of the central rectangular area of the foil are divided in a triangular manner into two t sections. Each of the pair of triangular sections, on each side of the foil, on the triangular hypotenuse has a hinge connecting each pair of triangular sections together. Each side is identically configured so that both pairs of hinged panels fold in the same direction, as the rigid end sections 88 are counter rotated. As the foil enters into lift mode the end sections return to their straight position and an "air ladder" connected to the inside surface of each hinge is inflated holding the two rectangular sides of the center section into its symmetric or cambered profile. The air latter is a form of bladder 112. If this were a ladder, each step would be a duct. On 112 each duct inflates and pushes out the sides of the foil to their lift profile position. When deflated the air ladder collapses and fits between the two folded hinges between the two pairs of triangulated panels.

Each rib structure is joined to the central tubular shaft 70 with a lock and release mechanism 134 that allows the rib 87 to rotate to its spiraled position when the foil is in its starting mode. When lift rpm is reached the ribs return to their aligned position and are locked into a straight vertical cambered shape that can again be trimmed by the variable pitch mechanism. Stretching and flexing of the skin 19 occurs in the vertical area between the ribs as the foil spirals into its starting profile.

Figure 21:
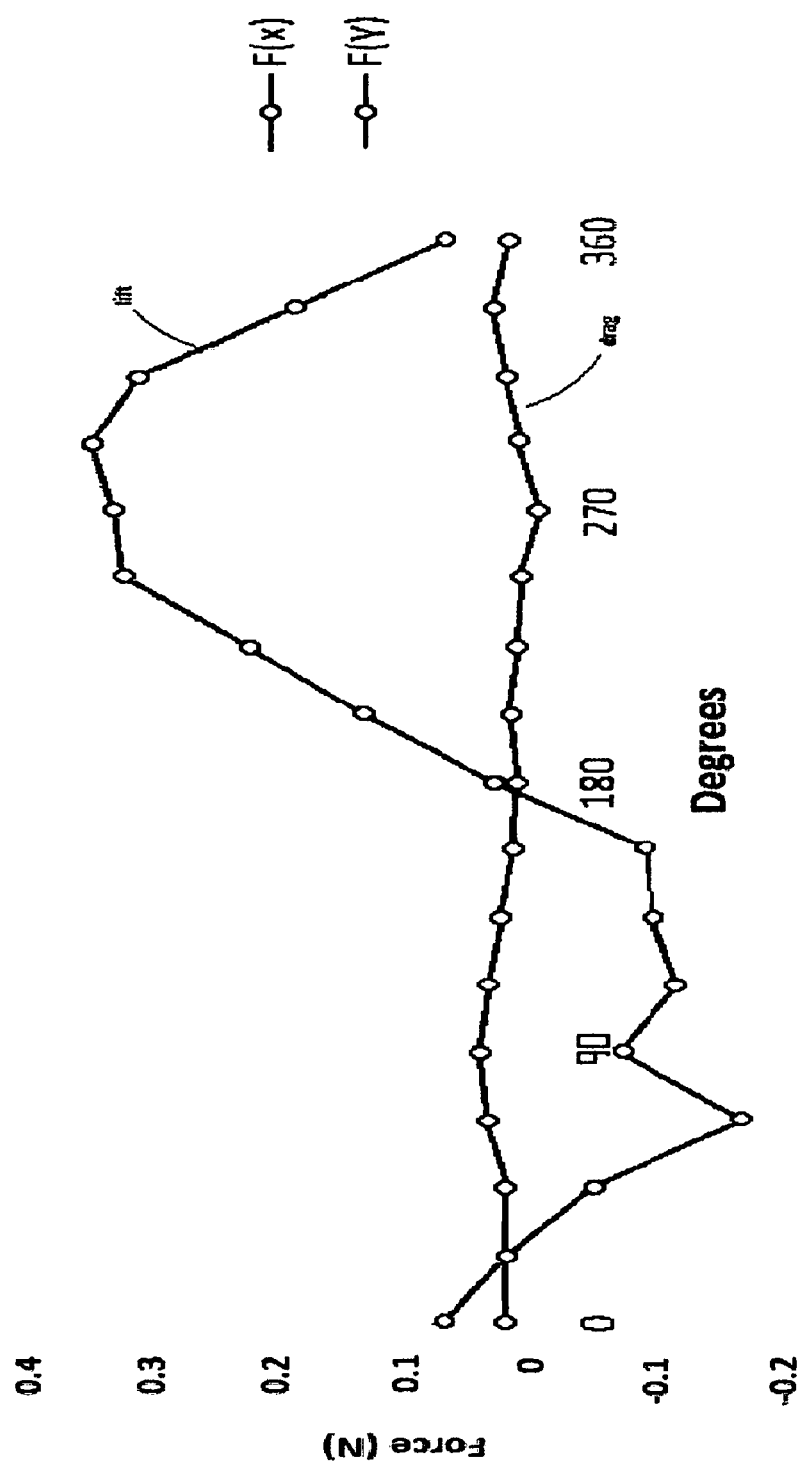
FIG. 21 is a graph showing Lift and Drag forces of GOE 222 airfoil vs. position.

FIG. 21 is a graph showing the lift force (Fy) and drag force (Fx) of a GOE222 airfoil at different positions on the circle of rotations for a constant pitch of 0 degrees. There is an 8% increase in thrust force when the pitch angle is varied compared with when the pitch angle is held constant. There is no constant pitch angle that will improve the overall efficiency because different pitch angles are more efficient at different locations on the circle of revolution. In one example, adjusting pitch by +/−three degrees (3°) was found to significantly improve efficiency. Thus, the angle between an airfoil and an arm may be varied between 87 degrees and 93 degrees as the airfoil rotates about the central axis. It will be understood that different airfoils and different conditions may call for different pitch and/or profile adjustment.

Figure 22:
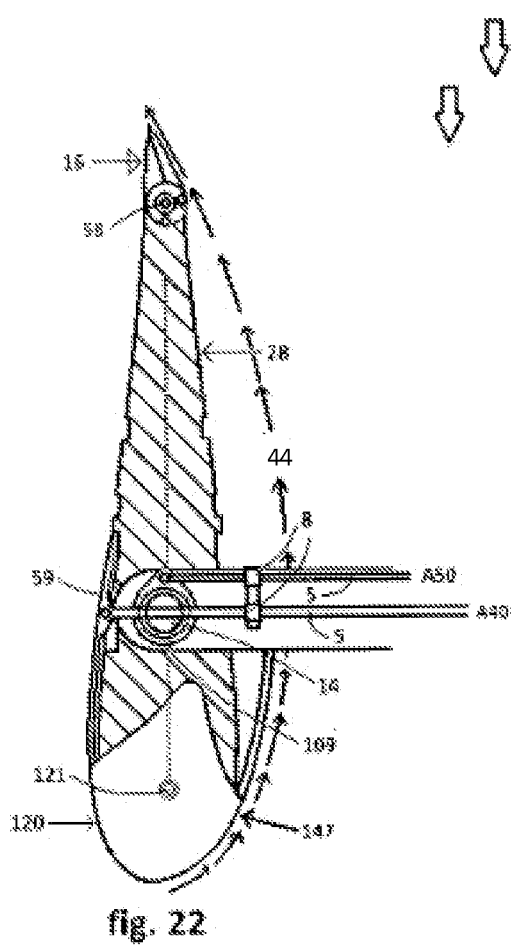
FIG. 22 shows an abbreviated nose w/ tail assembly reciprocating greater curvature profile to the inside of the airfoil when going with the current.
Figure 23:
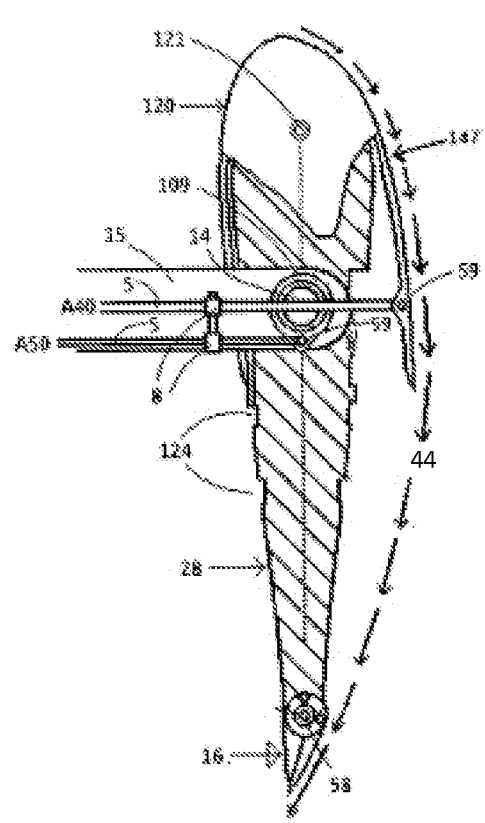
FIG. 23 shows an abbreviated nose w/ tail assembly reciprocating greater curvature profile to the outside of airfoil when going against the current.

FIGS. 22 and 23 feature a mechanism referred to as the "abbreviated nose section" 147 that pivots by bearing means on shaft 14 that extends vertically through the forward section of core structure 28 described in FIG. 12. The tail section is also secured by bearing means to counter pivot the direction of the nose section also described in the earlier document.

With the abbreviated nose and tail sections connected by gears and/or linkage each section can be counter balanced about their mutual axis in their reciprocal pivots in both 180 degree cycles. When nose section 147 has its leading edge going against the current both 147 and tail section 16 pivot inward toward the central axis as seen in FIG. 23. And when section 147 is in the next 180 degree cycle with the greater curvature on the inside when going with the current, nose section 147 and tail section 16 pivot outward as the greater curvature moves inward toward the turbine's central axis as seen in FIG. 22. To have centrifugal balance core structure 28 can be reduced in size and the tail section 16 can become a larger portion of the airfoil to be either of an equal weight to that of the abbreviated nose section 147 or the central axis of the turbine main shaft 109 and axle 14 can be moved to more centralize centrifugally balanced position.

Together the nose and tail sections counter pivot to create the greater curvature reciprocally from side to side as desired. The arrows at the top of the figures indicate the direction of the incident wind. The arrow following the profile of the greater curvature side of the foil, represent the raised current velocity and resulting lower pressure of the greater curvature's created lift force. FIG. 22 shows airfoil A60 with the greater curvature side closest to the central axis. FIG. 23 shows A60 with its greater curvature on the side of the airfoil furthest from the turbines central axis. The core structure has a contour with spaces provided for vertical spars. This ultralight core constitutes the largest section of the foil body and is preferable made of a durable foam product with laminated carbon fiber or light weight metals like aluminum for its ribs, struts and with a carbon fiber aluminum exterior skin.

Starting the turbine: A turbine at rest with four airfoils arranged evenly every 90 degrees about the sweep area will have at least one airfoil facing into the wind that will be prone to catch the current with sufficient wind to start rotation. At low wind speeds, the articulating nose section 120 that is in or is entering into the current stream will have its nose section pivoting inward, and will be loaded with current that will create unequal drag resistance with respect to the opposed airfoil/s on opposite side of the sweep area. The uneven drag resistance on opposite sides of the axis will start rotation. Functioning as a drag turbine, the rpm will increase with the nose tip speed to current ratio, passing from drag mode into lift mode. When lift mode is reached the turbine will rapidly accelerate the rotational speed by lift forces with a tip speed that will exponentially become much faster than the current.

A cambered airfoil will generate low pressure/high velocity lift force going against the wind when the greater curvature is on the outside of the foil. A cambered foil will also generate these lift forces, on the other side of the sweep area, entering into and moving with the current if the greater curvature switches sides, to the side closest to the turbine's central axis.

Tests have shown that the whole length of the greater curvature is not necessary on either side, to create lift on both sides of the foil although it may be partially desirable. An abbreviated nose section A-147 is featured in FIGS. 22 and 23. Reciprocating from side to side the "abbreviated nose section" A-147 directs the current outward forcing the current to increase velocity to pass the counter reciprocated tail section to meet up with the current traveling against the other side of the foil. The mechanism governing the modification of the changing profile is referred to as the profile modification mechanism A40.

Figure 24:
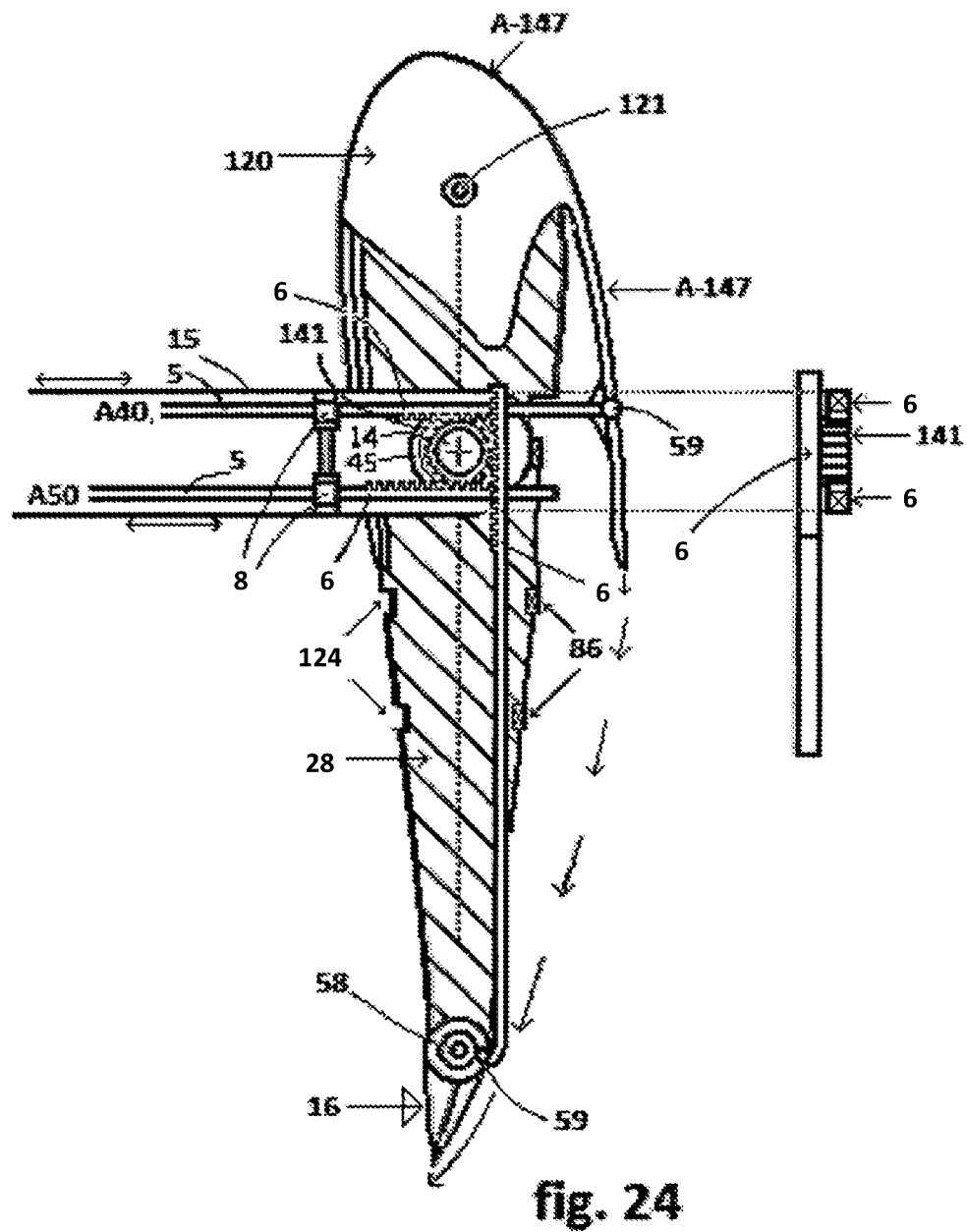
FIG. 24 shows gear driven assemblies A40 and A50 operating tail and abbreviated nose section.

FIG. 24 shows rack and pinion push rod controls for abbreviated nose assembly 147 and tail assembly 16 connected to assembly A40 (profile modification mechanism) and assembly A50 (for variable pitch mechanism).

Parts mentioned; abbreviated nose section A-147, nose assembly 120, nose assembly pivot axle and bearing 121, push rod 5, rack gear 6, ball joint 59, pinion gear 141, pivot axle with bearing 58.

There are many ways known to operate two mechanisms with movement parameters such as those of assembly A40, the profile modification mechanism, and A50 the variable pitch mechanism. The following mechanical description is offered as a one example of many other possibilities are known in the art of mechatronics to integrate two control systems into one.

In this example each of the two horizontal push rods 5 are free to slide freely by optional bearing means in push rod bearing housing 8. Each push rod has a rack gear 6 fixed thereto.

The upper push rod 5 operates A40 the profile modification mechanism. The upper push rod attaches to a ball joint 59 on the outer extended side of the abbreviated nose assembly 147 with its rack gear meshing with a pinion gear 141 rotate able about axle 14. In this design both horizontal push rods 5 are driven by the pilot bearing in the cam assembly operating about the turbines central axis 21. The upper push rod extends and retracts pivoting 147 on nose assembly axle 121. Operating is tandem with the noses section 120 is the tail section 16. Tail section 16 also has a push rod 5 joined to a ball joint at the tail section. Its push rod 5 extends upward and also meshes with the same pinion gear 141 operating 147. The vertical push rod's extension and retractions, pivot the tail assemble 16 on axle 58. The combined extension and detraction of the upper push rod 5 and the vertical push rod 5 create the greater curvature reciprocally from one side of the airfoil to the other every 180 degree cycle.

The lower push rod 5 operates A50 the variable pitch mechanism. The lower push rod 5 is equipped with a rack gear 6 meshing with its separate pinion gear 141, (directly above or below the other pinion gear), that is fixed to the airfoil's main shaft 45 that is rotatable and supported by bearing means in hub arm 15. As the lower push rod extends and retracts it will pitch the cord angle of the foil out going against the wind and reciprocally pitch the cord angle in going with the wind. This push rod's rack and pinion gear varies the pitch of the cord angle, and happens to be out in this position, to +3.5 degrees as the airfoil is operating against the wind. It will be understood that the angle may be controlled as a function of angular position so that the airfoil's angle with respect to the arm is adjusted as the airfoil's angle to the wind changes.

Figure 25:
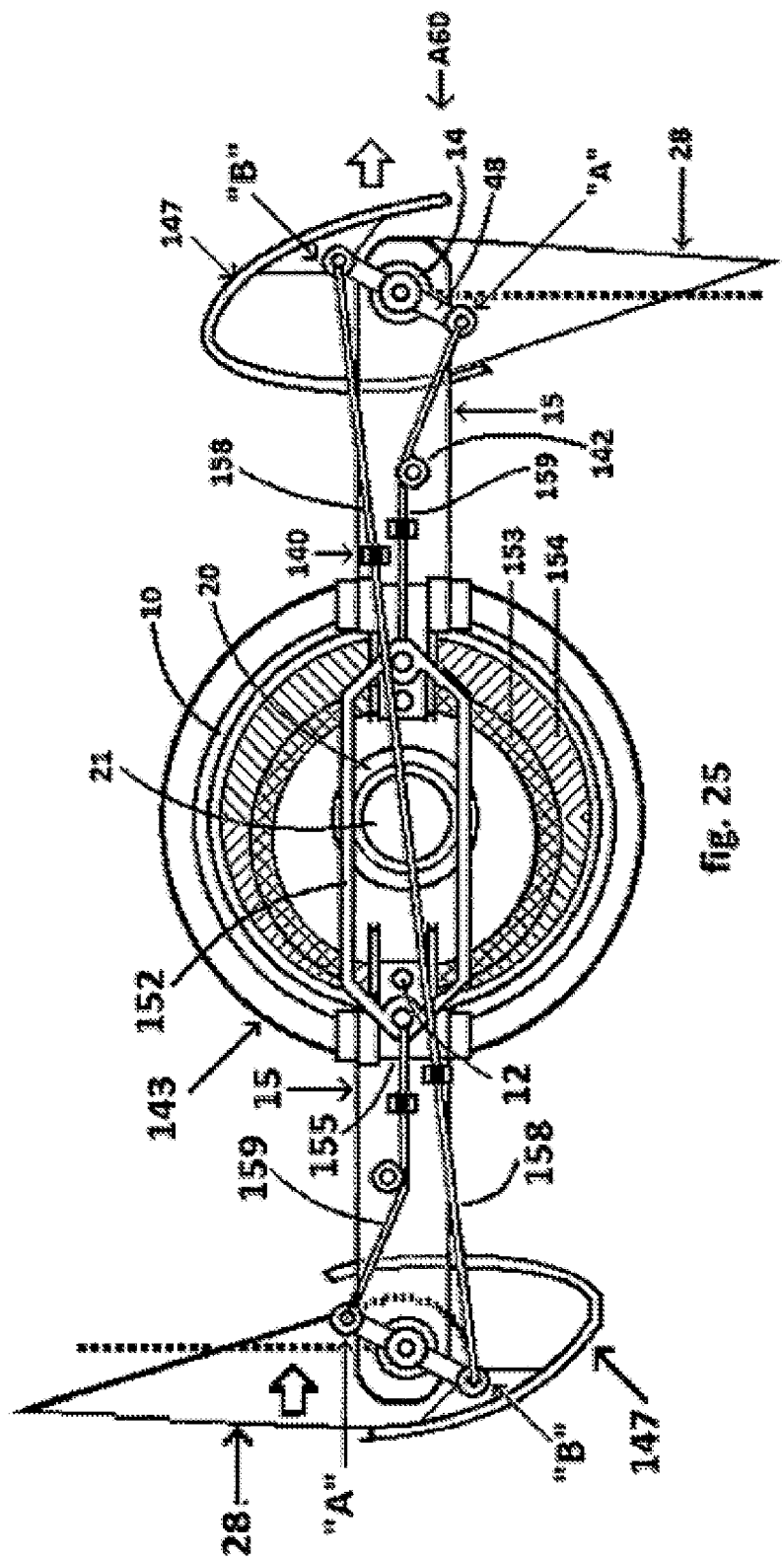
FIG. 25 shows an eccentric cam with light weight cable controls counterbalancing the "G" force of mass being moved in toward the axis connected to with equal mass being moved away from said axis.

FIG. 25 shows an eccentric cam with light weight cable controls to counter balanced "C" force of mass being move in toward the axis connected through the cam body with equal mass being moved away from said axis.

Seen at the center of FIG. 25 is an eccentric cam with its cam disk 154 seen in the hatched area and cam track 153 in the cross hatch inner circular within that hatched area. Surrounding the stationary cam disk is the main shaft 20 that is rotatable about the axle 21 by bearing means in Hub 143. Hub 143 is joined to hub arms 15. At the other end of hub arm 15 a "T" shaped hinged pivot axle connects the axle to the airfoil. The stem of the "T" shafted axle essentially becomes the airfoils axle supporting the airfoils main shaft 14 by bearing means allowing the main shaft to pivot back and forth aligning the airfoil's pitch to the optimum cord angles within each rotation. The top of the "T" shaped axle allows the top of the end assembly to pivot vertically up and down as part of the centrifugal support system as does the axle at the opposite end of the hub arm between the hub arm and the airfoil.

Note: only one pair of opposed hub arms 15 and airfoil A60 are shown. The other centered identical pair attached to the hub perpendicular to the pair shown have been removed for the sake of clarity. In other examples, different numbers of airfoils and arms may be provided.

Working explanation of mechanism: (parts): 12, pilot bearing, 14 foil's main axle w/ bearing 20 main shaft, 21 main axle or axis, 140 cable slack lever, 142 cable spool, 143 hub, 145 housing+axle ass. 150 main bearing split collar, 151 upper or lower cam cover plate, 152 slider connecting plate, 153 cam track, 154 can disk, 155 cam slider, 156 hub hinge for 15, 158 cam pullback line, 159 cam pull line.

As airfoil 60 rotates about axle 21, the pilot bearings 12 in the rotating cam housed in the hub 143 rotate around the eccentric cam track 153 within the centered cam disk 154. Each pilot bearing is secured in the corresponding cam slider 155. Each of the two opposed sliders are connected to the slider connecting plate 152 so that when one slider and connected linkage with attachments extends out on one side of the sweep area the attached linkage and attachments on the opposite side of the sweep area are pulled in toward the central axis 21, and when the linkage moves in the opposite direction conversely the linkage is outward away from 21.

The configuration of pairs of 180 degree opposed foil allow for equal and opposite mass movement across the axis. The explanation of this phenomena as it applies to these turbine is as follows.

When connected equal mass, that is nearly equal distance from the axis, when mass is in motion and is being moved equally and in opposite directions on both sides of said axis, the mass being moved out away from the axis is countered by the mass that is being moved in toward the axis, so consequently, the net effect of "G" force relative to this the mass movement is minimal. Thus the expenditure of energy of mechanical engagement is merely the inertia of the mechanism's moving parts irrespective of centrifugal force, except for the minor loss from the unbalanced leverage of the opposed mass relative to any inequality of their distance from the central axis.

Explanation of working mechanism; Connecting plated 152 is fixed to slider 155 and pilot bearing 12 that is eccentrically rotatable in cam track 153. Attached to the connecting plate 152 is the pull cable 159 that extends over the cable slack lever 140 to compensate for the difference in cable length as the end assembly 15 raises and lowers with the centrifugal force of rotation. Pull cable 159 on the right hand side of the figure, continues around cable spool 142 and out to the corresponding connecting point on the articulation movement lever 160 to lever "A".

The use of cables allow for a very light weight mechanism that can be as robust as more massive designs that would create much more inertia. Cables in rotation create very little drag. It will be understood that the term "cables" does not imply any particular material. Cables may be formed of steel or other metal, or may be formed of a synthetic material (e.g. Dyneema, or similar material with high tensile strength). Cables have excellent pulling strength but, cables do not push. To compensate for this fact, the opposite side of the axis of the articulation levers 160 has and opposed lever "B" for a pullback cable 158 that extends from lever "B" to the corresponding lever "B" on the articulating movement lever 160 on the opposed airfoil on the opposite side of the sweep area. As the pull lever moves mass in toward the central axis the pullback 159 lever pulls the mass on the opposite side of the sweep area back.

As pilot bearing on the right side of the cam pulls pull cable and joined lever "A" of articulation movement lever 160 inward, the upper lever "B" pushes out A 147 into its greater curvature position further from the turbines central axis. Also attached this upper lever is pull back cable 158 also attached to lever "B" on the right side. Pullback cable 158 extends from there across the sweep area to pull the 147 on the opposed airfoil back so the greater curvature on the inside of the foil closer to the central axis. The sequence may reverse reciprocally every 180 degrees of each revolution so that an individual airfoil goes through a full cycle of adjustment during a full rotation of the turbine.

Both pull cables 159 and pull back cables 158 are seen in this top view attaching to lever 160 extending around the cable spools 142 to be aligned with the cam sliders 155 and each of the cables goes over its corresponding cable slack lever 140 to make the necessary adjustment relative to the pivot angle of the hub arms in rotation.

The tail assembly 16 was not included in FIG. 25 but it should be noted that it could be included either by a rack and pinion design FIG. 24 or by simply adding another push and pull cable assembly.

The cam mechanisms described above my be a unique design but are not intended to exclude the use of other mechanical or electromagnetic control design options and are meant only to give an example of a mechanical solution to the described objective of creating a lightweight highly efficient turbine.

FIG. 26 illustrates a split foil starting mechanism. Parts mentioned: 10 main bearing, 20 turbine's main shaft, 21 turbine's main axle, 44 low pressure profile, 45 electric line, 92 keyed split collar, 147 abbreviated nose section, 152 slider connecting plate, 153 cam track, 155 cam slider, 158 cam pull back line, 159 cam pull line, A60

Each airfoil A60 pivots on its axle that extends vertically down the length of the airfoil at the center of its mass load distribution point so that the centrifugal force of rotation is equal on both sides of the foil's pivot axis to eliminate the negative effects of an unbalanced load about the airfoil's axis.

Each airfoil A60 can be equipped with mechanisms A50 that change the pitch of the cord angle in the increments of rotation and/or A40 that change the side profile to a greater or lesser curvature profile within each rotational excursion around the turbines central axle 21. Each airfoil can also be equipped with a starter mechanism. In earlier examples there are several versions of spiraling airfoil starting designs. In this example the split foil starting mechanism is illustrated. When the turbine is rotating slower than lift mode or stopped as it is in this figure, the split foil mechanism places each half of the airfoil into an opposite position relative to the pitch of its cord angle and the profile side of the greater and lesser curvatures. This position creates the necessary drag to start the turbine rotating. In this example to assume this position the lower cam serving the lower half of the airfoil rotates 180 degrees to their opposite setting. The switching mechanism is not shown, but conceivable could be any number of centrifugal force switching devices, mechanical or electromagnetic known in the art of mechatronics.

The cam body is fixed to the stationary axle and the hub and cam rotate around it. The axle can be hollow inside like a large pipe. The cam may be made to rotate able around the axle by an interior motor rotating the cam body 180 degrees to reverse the control parameters of one half section of each foil to start the turbines rotation with the incident wind.

When the turbine reaches transitional lift rpm, the lower cam reverses by counter rotating 180 degrees and returns the foil to its aligned position parameters when lift rpm is reached. The variable pitch mechanism and the profile modification mechanism in the design can be regulated by a variety of mechanism including the double cam push rod or cable system shown here and explained in FIG. 27.

The hub arm 131 tapered lower con-vexed and con caved tubular cross section is a durable strong lightweight shape especially when made of aluminum sheeting or carbon fiber composite. If aluminum is used it can be an excursion with interior cross-bracing optionally having inner voids filled with strengthening materials.

Instead of having levers and linkage outside of the foil they can be aerodynamically placed in the interior of the hub arm. The cables and levers that run the variable pitch and profile modification mechanisms can be aerodynamically placed inside the profile of the end assembly. The upper half of the hub arm 131 has been raised up to show the pull cable 158 and pull back cables 159. The upper cam cover has also been raised up to show the working cam's counterbalanced reciprocal mechanism, explained in detail in the next figure.

Seen near the bottom of FIG. 26 is the ground cable flange bearing housing 136 that is rotatable about the main shaft. Adjacent to 136 and at the top of the rotating assembly serving the main shaft is the inter stationary axle and bearing housing 96 fixed to axle 21, housing the main bearings 10 and thresh washers bearing with the locking keyed split collar 92 serving to support, by rotatable means the main shaft 20 and fixed rotating assembly. Transmission line 31 is also seen extending up the interior of the axle 21.

Figure 27B:
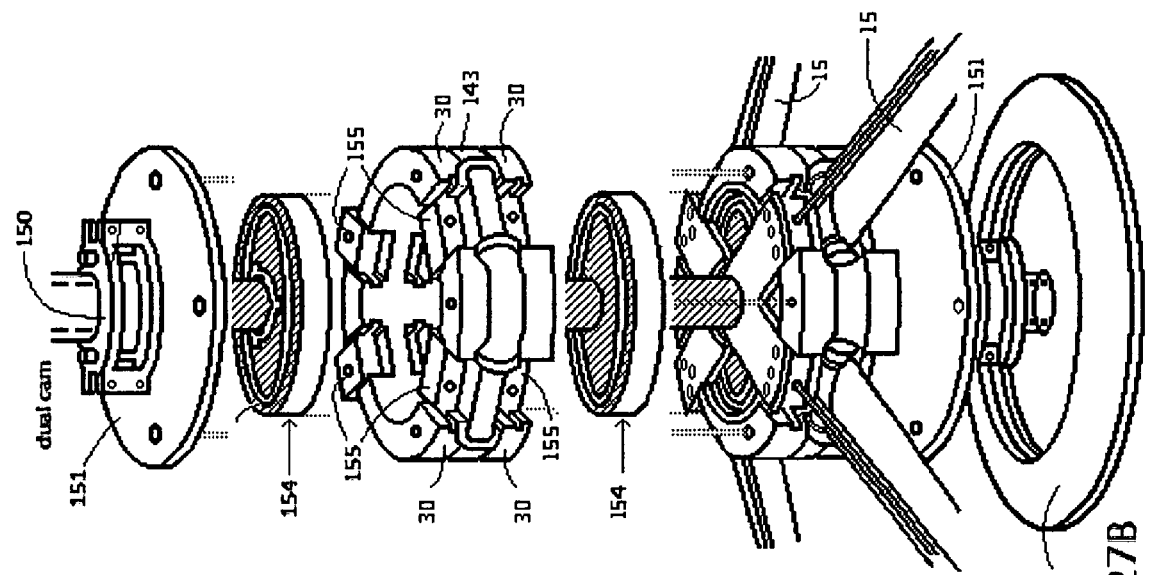
FIGS. 27 A-B show a blown up parts detail of cam mechanisms.
Figure 27A:
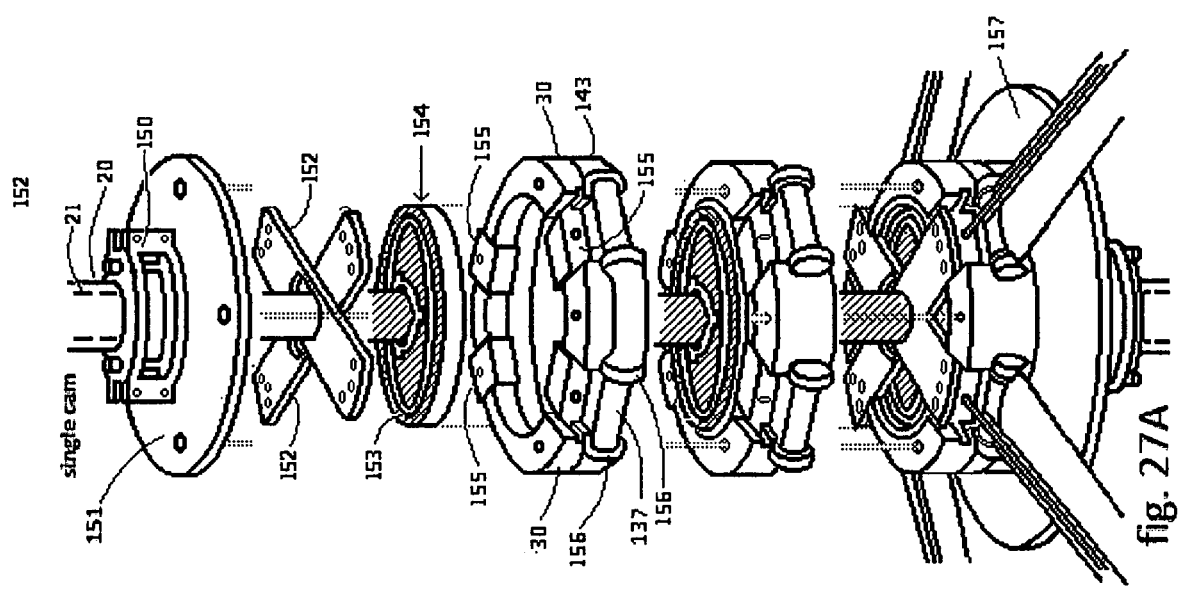

FIGS. 27A-B cam system. Parts: cam body 30 Pivot able hub arm 131, 143 hub, 150 main bearing housing w/ keyed split collar, 151 upper or lower cover plate, 152 slider connector plate, 153 cam track, 154 cam disk, 155 cam slider 156 hub hinge for 15, 157 hub arm support flange, 159 pull cable In FIG. 27 A is seen the parts blow-up of a single cam, (first column) and in the second column of parts in 27 B the dual or double cam. The cam is the central regulating mechanism controlling the movement parameters of the variable pitch mechanism and/or the profile modification mechanism.

As seen at the top of the FIG. 27 A, the stationary axle 21 (broken line) IS surrounded by the turbine's central main shaft 20 that rotates thereabout. Main shaft 20 IS supported by bearing means by main bearing housing with keyed split collar 150. The upper section of the main shaft 20 terminates just below the upper keyed split collar 150 creating a split shaft. There is provided a pair of main bearing housing with a split keyed collar 150, one serving the bearing support for the upper end assemblies and one serving the bearing support for the lower split main shaft section serving the lower end assembly. Each keyed split collar 150 supplies the lateral bearing support for each end of split main shaft 20 with vertical support for 20 provided by thresh washers and bearing and keyed split collars of 150. This support allows clearance for hub 143 the upper cam and optional lower cam body 30 to rotate about the stationary cam disk 154 that is fixed to the stationary central axle 21. Both upper and lower end assemblies are supported on their split main shafts 20 in this same manner including the optional lower cams systems that is also a mirror image of the upper cam and bearing components.

Fixed to main shaft 20, is upper cover plates 151 and 150 just described, and hub 143. Fixed at the center of the hub 143 is the split end of main shaft 20 and at the hub's perimeter is a plurality of the hinge sections 156 for hub arm 15. In this design, the cam body is incorporated in hub 143. The hub houses, in a slide able manner, two pairs of sliders 155. Each slider is paired with the opposed slider on the opposite side of axle 21. Connecting each pair of sliders 155 is slider connecting plate 152. Each of the pairs of 152 are perpendicular to one another having clearance as one slides back and forth over the other. Each 152 also has a hole at its center allowing each to slide back and forth around the stationary axle 21. At the perimeter side of the slider is provided an attachment point for the linkage that will extend out the hub arm 15 and move the airfoils corresponding control mechanism. With each pair of sliders joined by connecting plate 152 the cam can push and pull in opposite directions corresponding to outward of the greater curvature on one side while moving in the greater curvature on the other side of the axle and likewise moving out the cord angle on that side while moving in the cord angle on the other side. Each slider 155 has a pilot bearing attached that rides in cam track 153 in cam disk 154. As the turbine is rotated by the incident current the pilot bearing 12 in slider 155 is guided in the eccentric path of cam track 153 that causes a linkage like push rod 5 to move away from the axis on one side of axle 21 and move toward the axle 21 on the other side of 21.

The movement parameters of the profile modification mechanism are balanced, so just straight linkage on both sides of the axis is all that is necessary to operate this control mechanism at the foil. The cord angles however on both sides of the axis are ideally different, asymmetrical but can be rounded off for approximate efficiency advantage.

However, if optimum parameters are to be achieved, a secondary regulator operated eccentrically at cam disk 154 with an activating lever extending to the foil to operate a limit stop that allow the stroke of the activating member to fully extend but limits the movement of the control mechanism, may be necessary.

Alternatively; FIG. 27 B shows a double or dual cam system. This cam works as the single cam but has two cam systems instead of one. This cam can be used with one cam operating the symmetric movements of the profile modification mechanism and the other operating the asymmetric parameters of the variable pitch mechanism.

Alternatively the single cam can have a cam track on both sides with and additional pairs of sliders and pilot bearing etc. to run both functions. And finally the dual cam system can have two side cams running four controllers. The dual cam system is ideal to operate any one of the variety of starting mechanisms. For it can reverse the parameters merely by being rotated 180 degrees the stationary cam disk 154 with a spring loaded release pin engaged and disengaged a common centrifugal weight device or the raising and lowering of the hub arms. End of 27

The effort to minimize inertia is may help to raise the efficiency coefficient. The ability to manufacture light weight rotating assemblies is possible by having lateral and vertical support cables verses achieving stability and support by adding mass. To this end the turbine design featured in FIG. 28 uses cables to secure each hub arm and attached airfoil in a centered, balanced and evenly spaced concentric manner even when under high rpm, extreme torque and wind conditions. Because the airfoils are secure and locked between opposed cables the supporting arms can be light weight; for example they may have a thin metallic skin over a flexible aluminum frame with a foam-like central core.

The majority of the drag created by each hub arm comes from the side facing the current and not its width. Therefore as seen in FIG. 28 the hub arms can have a curved cross section like a symmetric airfoil creating minimum resistance, a shape also able to be flexible and support the cantilevered weight of the airfoil.

In this design the load support on the rotate able turbine assembly A104 is greatest when the airfoils are at rest. The resting support weight load on hub arm 131 and padded rotatable support structure 106 exponentially diminishes according to the turbine's increasing rpm as the centrifugal force of rotation assumes the leveraged load and the static load is transferred to the central axle and or main shaft. When rotation increases so too does the diameter of the sweep area increase as the hub arm 131 and airfoils A60 pivot upward and outward on hub to hub arm axles 137 and axle assembly 145 between hub arm and airfoil. The sweep area increases as the airfoils move out from the central axis, so too does the necessary length of the lateral support cables 139.

Figure 31:
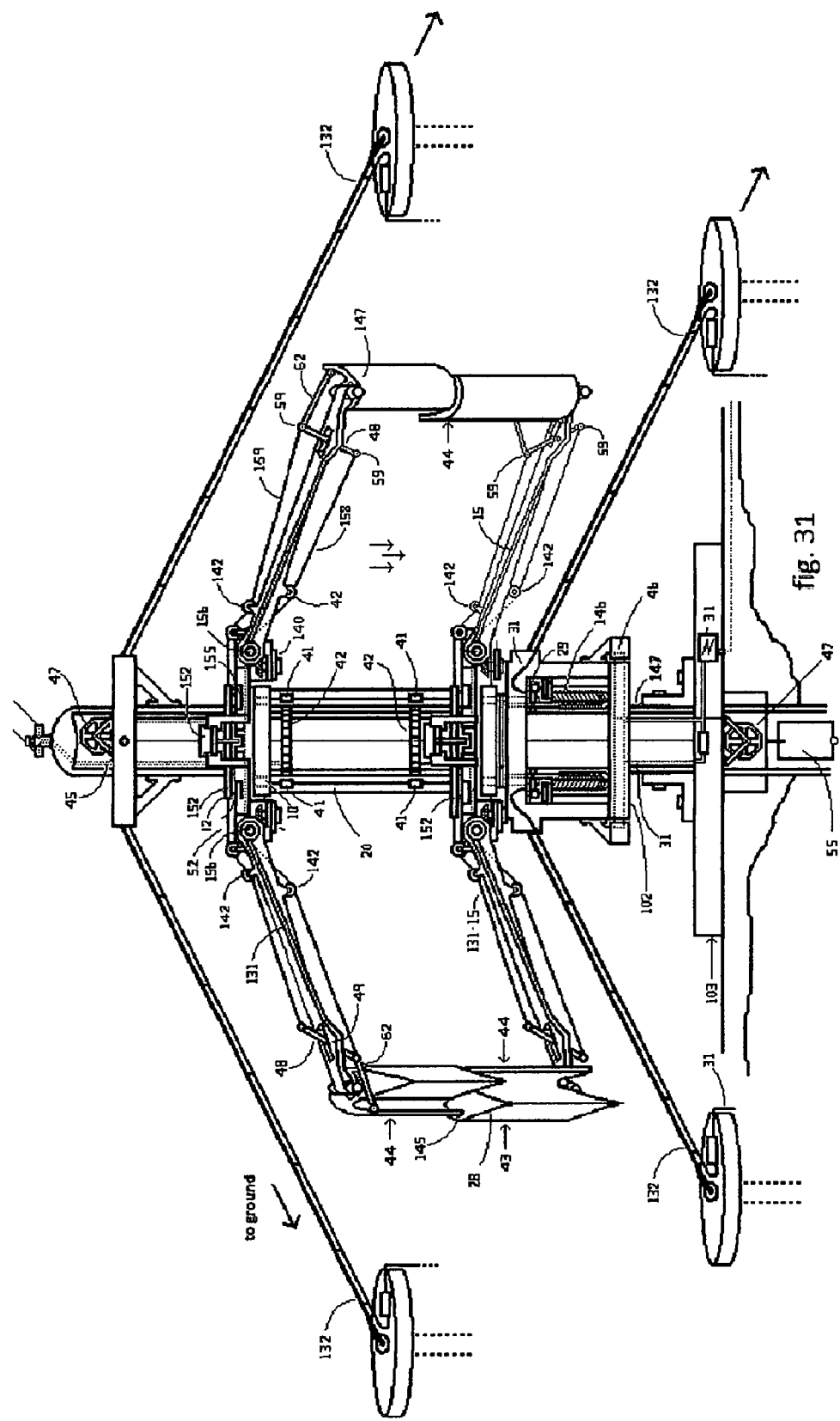
FIG. 31 shows an example of push and pull cable control linkage mechanism.
Figure 32:
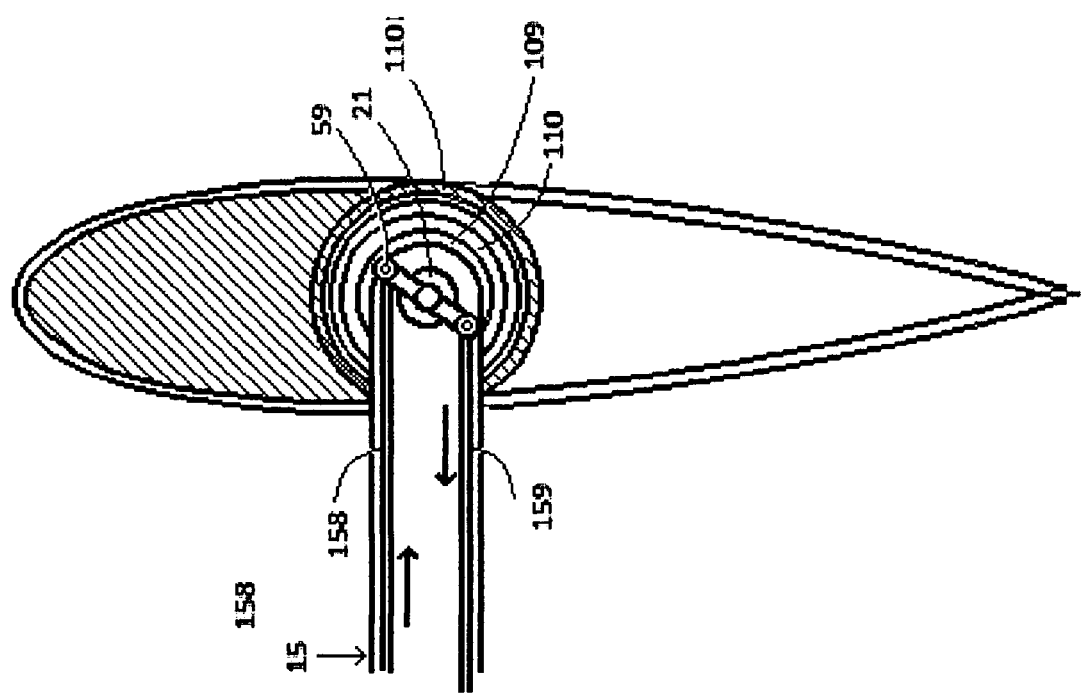
FIG. 32 shows an example of balanced nose and tail sections.

There is a passive and an active cable system presented in this application to compensated for this increase while maintaining constant tension is a passive system Seen in FIG. 31

Basically the passive system involves a cable slack lever 140 that is not geared but is fixed to hub arm 15 or pivot able hub arm 131 with a cable spool 142 at the levers extended end. The lateral support cable is fixed around cable spools at the axis of each adjacent pair of hub to hub arm connection. There are four cables serving the upper hub arms supporting the upper part of the airfoils and four cables serving the lower hub arms supporting the lower half of the four airfoils. Each cable serves and extends around the area between each two horizontally adjacent hub arms. The cable under tension extends out from the spool at the hub over the cable slack lever 140 extending out over the cable spool 142 at the extended end of the hub arm, then extending across around the spool at the extended outer end of the adjacent hub arm, extending back towards the corresponding hub, over that hub arms cable slack lever attaching in a fixed manner around the spool 142, the axis of the hub to hub arm connection. The cable is held out from each of the two hub arm at a particular angle on each side of the spool relative to each hub arm. The length of the cable slack lever and the cable held at these two angle on both hub arm is calibrated to create the same length as the length of cable need to compensate for the increase distance from the extended cable connection to the central axis when the two hub arms are raised all the while maintaining the same cable tension. As a result the cable tension stays the same on the lateral hub cables as the hub arm raises and lowers keeping the airfoils the same distance apart while aiding in supporting the lean turbine assembly.

The following is a description of the parts of the active cable system of FIGS. 27-28. The hub arm 131 is connected at the hub in a pivot able manner on hub to hub arm axle and bearing 137. The axle 137 (seen in FIG. 27) is fixed to the hub's hinge style housing 138. The hub arm pivots on axle 137 on bearing housed in hub arm axle housing 146. Each end of axle of 137 is further secured by bearing means to intermediate block housing 144. Between 138 and 146 rotatable on axle of 137 and fixed to 146 is the first of two pinion gears 141. The first pinion gear 141 meshes in a marriage with the second identical pinion gear 141 that is fixed to cable slack lever 140 and pivot able about the axle of axle, bearing and block housing 144.

Between the first pinion gear 141 and housing block 138 on axle of 137 is the first rotatable cable spool 142

Secured in rotatable fashion at the upper end of lever 140 is the second cable spool 142. At the outer end of 131 is housing and axle ass. 146 serving as the pivot point for airfoil "A". At each end of this axle is the third in the series of cable spools 142.

Each of the turbine four hub arms 131 are identically equipped. The Lateral support cable 139 is joined to the first cable spool 142 on the hub arm 131 serving airfoil "A". Extending up and over the second spool at the end of cable slack lever 140 from which it extends out the length of the hub arm 131 to cable spool 142 supported in rotatable fashion on axle of housing and axle assembly 145.

The lateral support cable 139 extends across to the third spool 142 attached at the end of the hub arm 131 at the right serving foil B and back up that hub arm and over the second spool 142 at the end of cable slack lever 140 and down to the first spool between 141 and 138 where the end of support cable 139 is secured.

In this design, at the intersection of the vertically pivotable hub arm 15 and laterally pivotable airfoil A60 is a Tee shaped axle 108. The Tee shaped axle is pull out by dotted lines at the right side of the figure to illustrate how the upper part of the dual axle serves the vertical pivot of the hub arm and the stem or vertical aspect of the tee shaped axle serves to pivot the airfoil and fixed main shaft 9 laterally.

The above description is the upper half of the cable system between the hub arms 131 serving the upper half of the airfoils "A" and "B". This upper half system is the mirror image of the cable system serving the corresponding lower hub arms that serve the lower have of "A" and "B" This is the quarter system serving airfoils "A" and "B".

As the turbine rotates and the centrifugal force of rotation raises the hub arm and airfoils, the first pinion gears 141 fixed thereto turn the second pinion gear 141 fixed to cable slack lever 140. As the end assembly moves up the rotation of fixed first pinion gears rotates up and causes the second pinion gear fixed to the cable slack lever 140 to rotate the lever downward. The marriage of these two pinion gears moves the cable slack lever down, letting out cable when the hub arm 131 raises, and moves lever 140 up when the hub arm goes down, taking up the slack, when the hub arm 131 raises. Lever 140 is of a length that is calibrated to allow the cable to extend or retract in increments commensurate to the extended or retracted distance from the central axis to the third outer spools as a result of raising and lowering the hub arms 131. The above description describes one fourth of the complete cable system. There is an identical cable arrangement between airfoil "B"+"C", between "C"+"D", and between "D"+"A" In total, they make the lateral cable support system.

Figure 29:
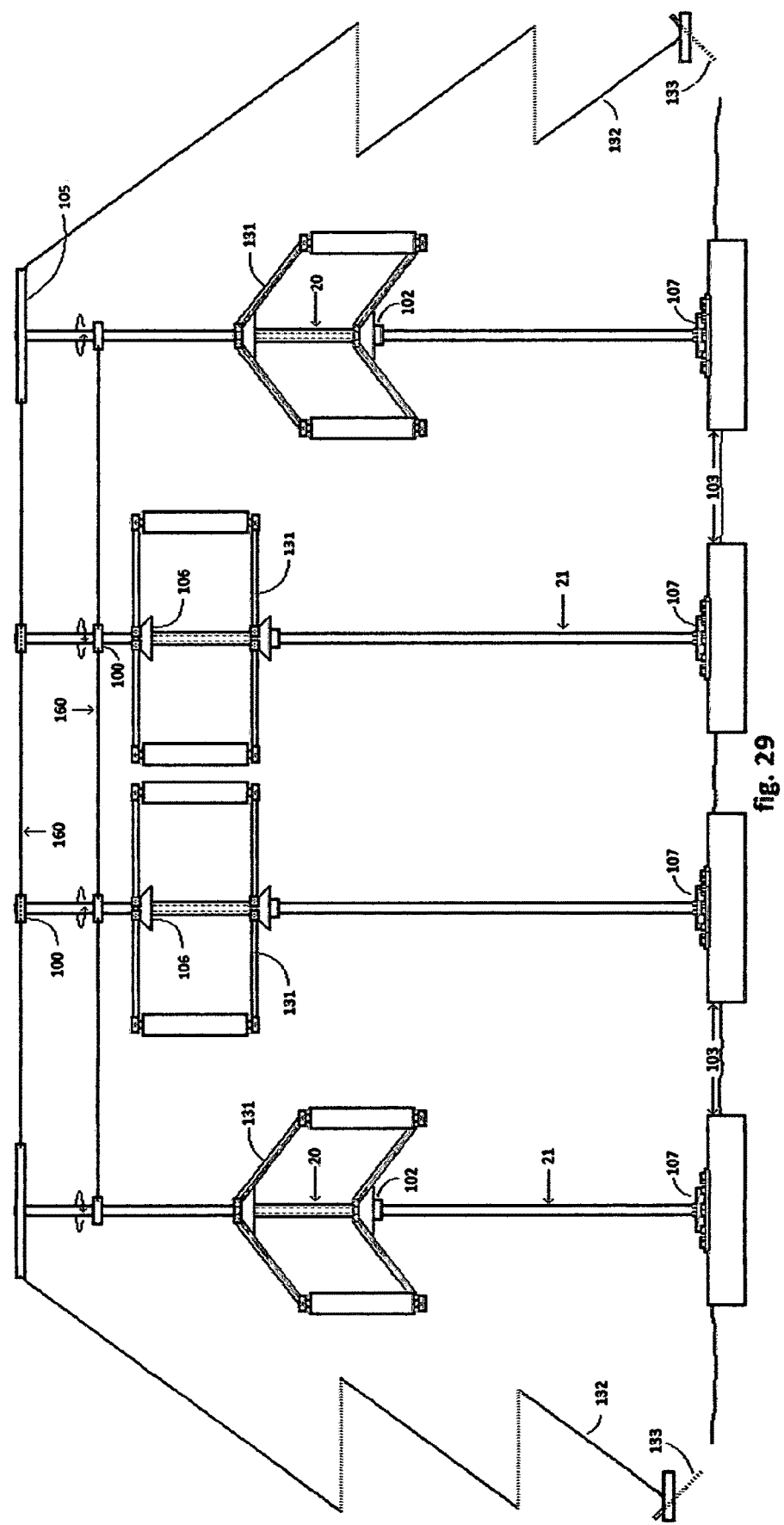
FIG. 29 shows an example of a tethering and ground anchoring system

FIG. 29 shows an array of 4 turbines. The primary focus of this and the next figure are on the support towers and specifically the equal distribution and support of later loads. At and close to the top of each tower in this two dimensional illustration there is a pair of lateral support cables 160. The upper cable of the pair extends between each adjacent axle/tower passing through and fixed thereto each axle's cable flange 100 fixed to each axle and terminating and joined at each end to the turbine's axle's extension arm 105. The extension allow for the ground cable 132 to clear the airfoils of the adjacent turbine. The lower cable 160 extend between each adjacent turbine's axle 21 also extends through and is fixed to each axle's cable flange 100 that is fixed to said axle. In a three dimensional rendering one would see a second pair of upper cables extending perpendicular across to other turbines, if no other turbines are in the array extending as ground support cables 132 to ground anchors 133.

Below the rotating assembly 104 is the lower block assembly 102 described in more detail in FIG. 31.

In this two dimensional rendering on set of opposed airfoils A60 are seen with their upper and lower pivoting hub arms 15 resting on padded rotatable support structures 106 fixed to the main shaft. As the turbine begins to rotate the centrifugal force of rotation raises the airfoils up and off 106 thereby increasing the sweep radius with the low mass light weight turbine assembly 104 supported by the centrifugal force of rotation. In an extended position, hub arms 15 extend at about ninety degrees to the central axis. In a retracted position, hub arms may form a significantly smaller angle with the central axis, for example, 70 degrees, 60 degrees, 45 degrees, thirty degrees, or some other angle that is significantly less than 90 degrees.

The orientation of the leading edge of the turbine's airfoils relative to the incident current determines the clockwise or counterclockwise direction of the turbine's rotation. When each turbine has the opposite orientation to rotate in the opposite direction as the adjacent turbine and there are and even number of turbines in the array, the load forces of each turbine will be counter balanced considerable lowering the stress on the axles and cables. The ultralight and strong rotating assembly in concert with the balanced loads enables the use of relatively light weight towers and rigging. The axles of the tower are secured to the ground on ground platforms 103 that are bolted down thereto by flange foot plates 107.

Figure 30:
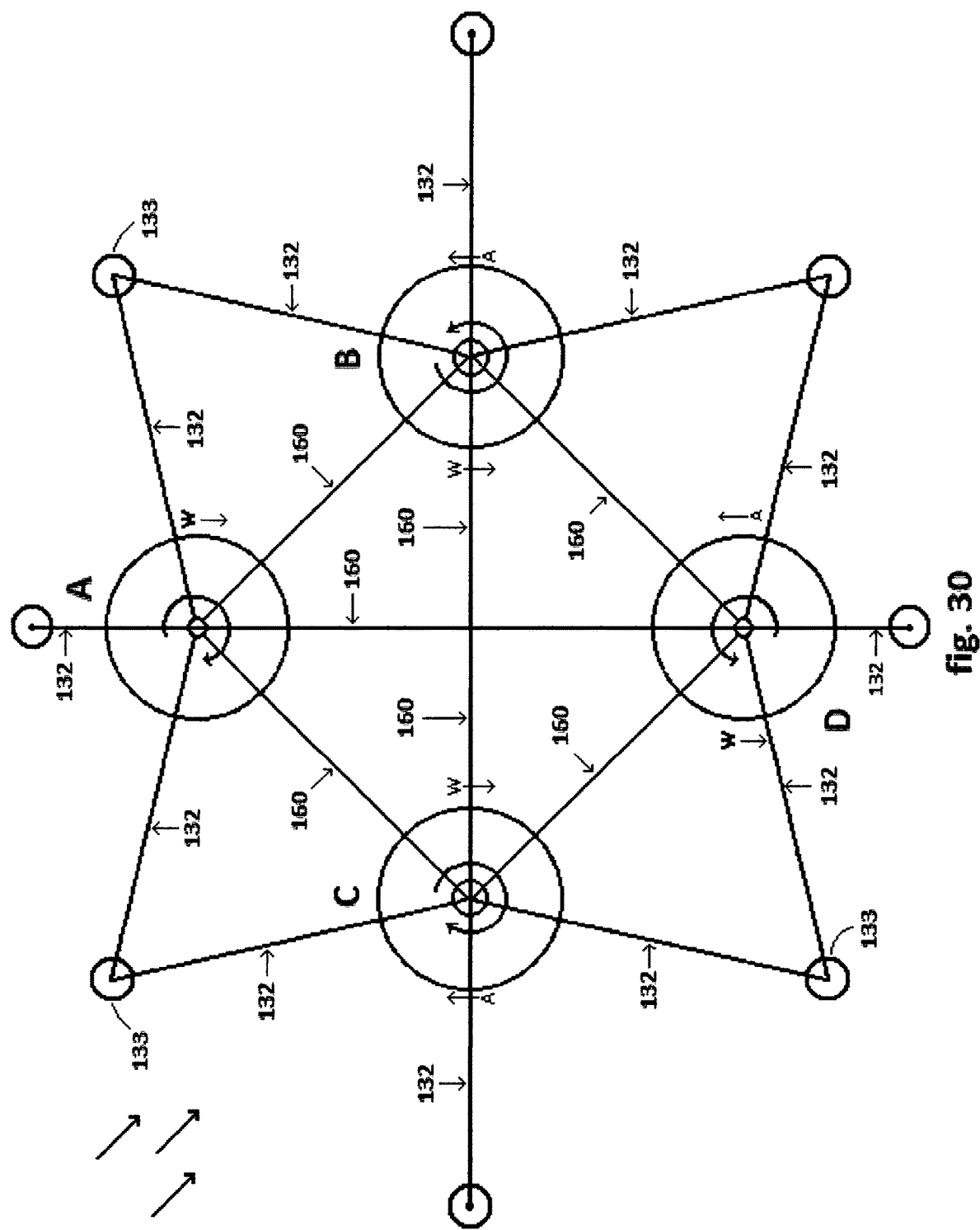
FIG. 30 shows a top view of an array of turbines counterbalancing their lateral loads.

FIG. 30 is a top view showing the cable system and individual rotational orientation of and array of four turbines. The turbine's axle at the top of the figure is Axle "A" the turbine's axle on the right is identified as "B", directly across at the left of the figure is axle "C" and at the bottom of the figure is axle identified as "D"

The three arrows at the left of the figure indicate the wind direction. Each circular arrow above each airfoil show the direction that the airfoil is rotating. Ground support cables 132 extending around the perimeter of the array that are secured to ground anchors 133. Cables 160 are lateral support cables. In this figure we see the perpendicular lateral cables not seen in FIG. 29. The "A" represent that side of the turbine that is rotating against the wind and the "W" represents the side of the turbine is rotating with the wind. This illustrating shows the balanced lateral load and the transfer of those loads to the ground of the combined array. This arrangement also lends itself smaller portable facility like a carnival tent full of turbines that could be erected, dismantled, moved and resurrected.

FIG. 31: One of the notable advantages of these vertical axis designs, in contrast to HAWTs is the low lateral loads at the top of the tower. Because the optimized V AWT in this application are ultralight it is not necessary to tether the turbine deep into earth costing hundreds of thousands of dollars. Instead the tower can be relatively light weight because the lateral loads are distributed and transferred to plurality of ground anchors by triangulated cables. Instead of having massive lateral load at the top of a very robust and expensive tower, the upper cables need only support the upper half of the rotating assembly as the middle and lower half is supported by triangulated cables secured mid-way on the tower directly under the rotating assembly. Not only is the mass load vertically dispersed, it is also balanced about the axis instead of leveraged on one side as are propeller turbines.

As seen in FIG. 31 triangulated Ground Cables 132 can be fixed to axle 21 atop of the tower extending to the ground and fixed to ground anchors 133. Incidentally, ground cables are a convenient structure to fix electrical or generator transmission cables as seen at the far right of the figure.

Another notable feature seen in FIG. 31 is the hoist system that allows the turbine to be raised and lowered for maintenance, repair and relocation. The entire turbine without the central axle and upper cables, can be lowered to the ground, disassembled, and moved if desired to a secondary seasonal location. The lower section of axle 21 has a worm-drive rack gear 149 that works in tandem with a worm drive hoist 148, activated by motor 29. Just below the hoist is a solenoid lock assembly 46 with opposed double locks to assure that the turbine assembly stays fixed in a given position. Included in the lock assembly (not seen) joined as a secondary safety is a lever that engages in a ratchet key way that extends vertically down axle 21 that also serves to assure that the worm drive unit is aligned before it is engaged for lowering. The hoist digital censer are capable of returning the rotating assembly to operating position and same cable tension. In an array of turbines the hoist systems of each turbine can be synchronized like house jacks to raise or lower the entire array in tandem. The hoist and locking assemblies are part of the lower suspension block ass. 102 that supports the rotating turbine on thresh bearings, and lateral main bearing support.

To add ease and minimum energy loss, the turbine can be equipped with an optional counter weight system having double pulleys like a common block and tackle with a heavy counter weight fixed to the end of the cable. The axle can extend into the ground like a well casing sealed at the bottom. The underground section of 21 is not perforated so it can be moisture tight, as seen at the bottom of the figure, allowing the counter weight to drop to the base of the axle or well casing as it were, thereby allowing the turbine assembly to be raised and lowered at ease. The underground casing can be less deep and the turbine assembly can also be partially lowered to a height where a telescopic hoist (cherry picker) can reach the top of the turbine assembly.

The counter balanced weight system is not required to stabilize the turbine. Cable anchors 133 and the central platform 103 of a sufficient size and depth are all that is necessary but it can add to the turbines axles flex and stability.

The illustration of the rotating turbine assembly 104 in FIG. 31 gives a clear perspective of the counter directional counter balanced "G" force load attributes of the light weight mechanical single and dual cam-cable system serving both energy optimizing mechanism A40 and A50.

Note: The cable designed mechanism is this application are *push and pull cable control linkage mechanism of FIG. 31 the *tethering ground anchor system seen in FIGS. 29 and 30 and the *lateral position support mechanical seen in FIG. 28. All three mechanism are akin.

The integrity of these dynamic symmetric support designs results from the opposing force of cables with the vertical and horizontal support of the centrifugal force of rotation. These interrelated mechanisms offer and allow an ultralight rotating assembly that is balanced with equal weight distribution, equal load transfer to the central axis and the ground cable with all moving and changing positions locked between the opposed forces of light opposed cables. Note: the mechanical examples illustrated and explained herein, do not in any way exclude the use of electromagnetic control system or other systems known in the art of mechatronics as a viable alternatives.

Sequence of moving parts, right to left of the "cam push and pull cable linkage mechanism." of FIG. 31 The trailing edge of the abbreviated nose section 147 is joined tie rod 62 by ball joints 59. At the opposite end of 62 is a second ball joint 59 that is connected to the push and pull cable lever 48. The second ball joint is also joined to pull cable 159. Pull cable 159 extend under the first cable spool fixed to hub arm 131 continues upward over the second cable spool where it is aligned and joined to the end of slider connecting plate 152. The slider connecting plate 152 connect each slider with the slider opposite it on the opposite side of the cam. Each slider is connected to a pilot bearing 12 that run in the cam track 153. The eccentric cam track activates the lateral movements of mechanism A40 and A50. Reversing the sequence, the slider 155 of the slider connecting plate 152 is connected to the opposed pull cable 159 that extends over the aligned first cable spool and under the second spool extending out the hub arm and connecting to the ballpoint 59 that in turn is attached to the opposite push pull lever 48 that pivots on axle 49.

On the opposite end of push and pull lever 48 on the other side of axle 49 connected by shared ballpoint is tie rod 62, that in turn is connected via ball joint to the trailing edge abbreviated nose section 137 on the opposed airfoil A60. Connected at the union of 62 and push and pull lever 48 is the pullback line 158. 158 extends back toward the cam under a cable spool over hub to hub arm axle hinge 156, across the cam body over the opposed hub arm axle 156 under a cable spool 142 and reattaching to a ball joint 59 on the lower side of the push and pull lever 48.

The net effect of this cable system is to connect the activating mechanism on both sides of the sweep area with one another so as the mechanism on one side of the sweep area is moved inward toward the central axis the corresponding mechanism/s 180 opposite of the same weight and approx. distance from the axis are move in the opposite direction there by balancing the "G" force effects on said movements.

Instead of the airfoil A60 having a core section 28 the core section has been eliminated in FIG. 23. The foil in this design is constructed with two equal parts of the same weight and mass distribution about the foils central main shaft 109. The forward half section including the nose and leading edge and the second half section is the rear section including the trailing edge and tail section. Both forward and rear sections are connected to a half hinge that is joined to main shaft by bearing means. This forward half section of the airfoil has been delineated with the shading of hatched lines. The other half of equal mass and weight distribution about the main shaft 109 is the foil rear section. It is not shaded and also has a half hinge that extend like the first half longitudinally down the vertical length of the foil and is joined at the opposite end, as it is on the upper seen end joined to the hub arm 15. Each of the half hinges are joined by bearing means to the main shaft 109. Each opposed hub arm has push and pull cables 158 and 159 or push rods 5 that push and pull.

When the airfoil's forward section is going against the wind, 158 extend the upper half of the foil out away from the turbines central axis and pulls the lower counter balanced rear half in creating the greater curvature on the outside of the airfoil. The cam like described before is at the center of the turbine and is making the opposite reciprocation movement of 158 and 159 causing the forward half on the opposite side of the sweep area to pulled in to the inside of the foil with the rear half being pull out creating the greater curvature on the inside of the foil going with the current. With this design there is almost no drag due to centrifugal force of rotation.

Figure 33:
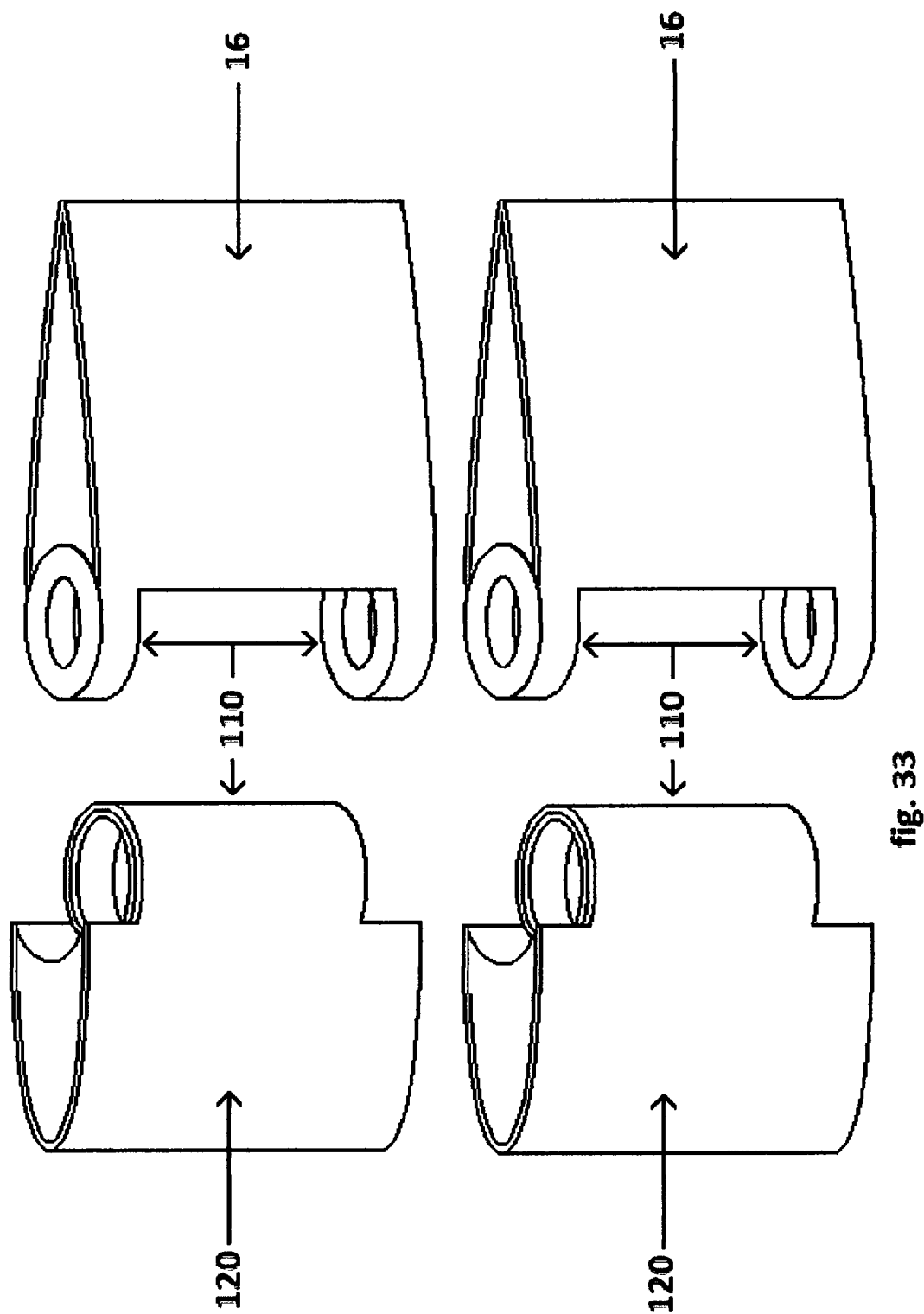
FIG. 33 shows geared airfoil nose and tail sections of equal axis mass distribution

In FIG. 33 is seen the nose and tail sections that operate in tandem, that are equal relative to their mass weight and distribution of mass leverage on each side of their common axis, each with an equality that assures equal centrifugal force to be exerted on each side of the axis as they reciprocally counter pivot throughout each 180 degree cycle of each revolution around the turbine's central axis both moving closer to and further away from the central axis together in tandem.

Figure 34:
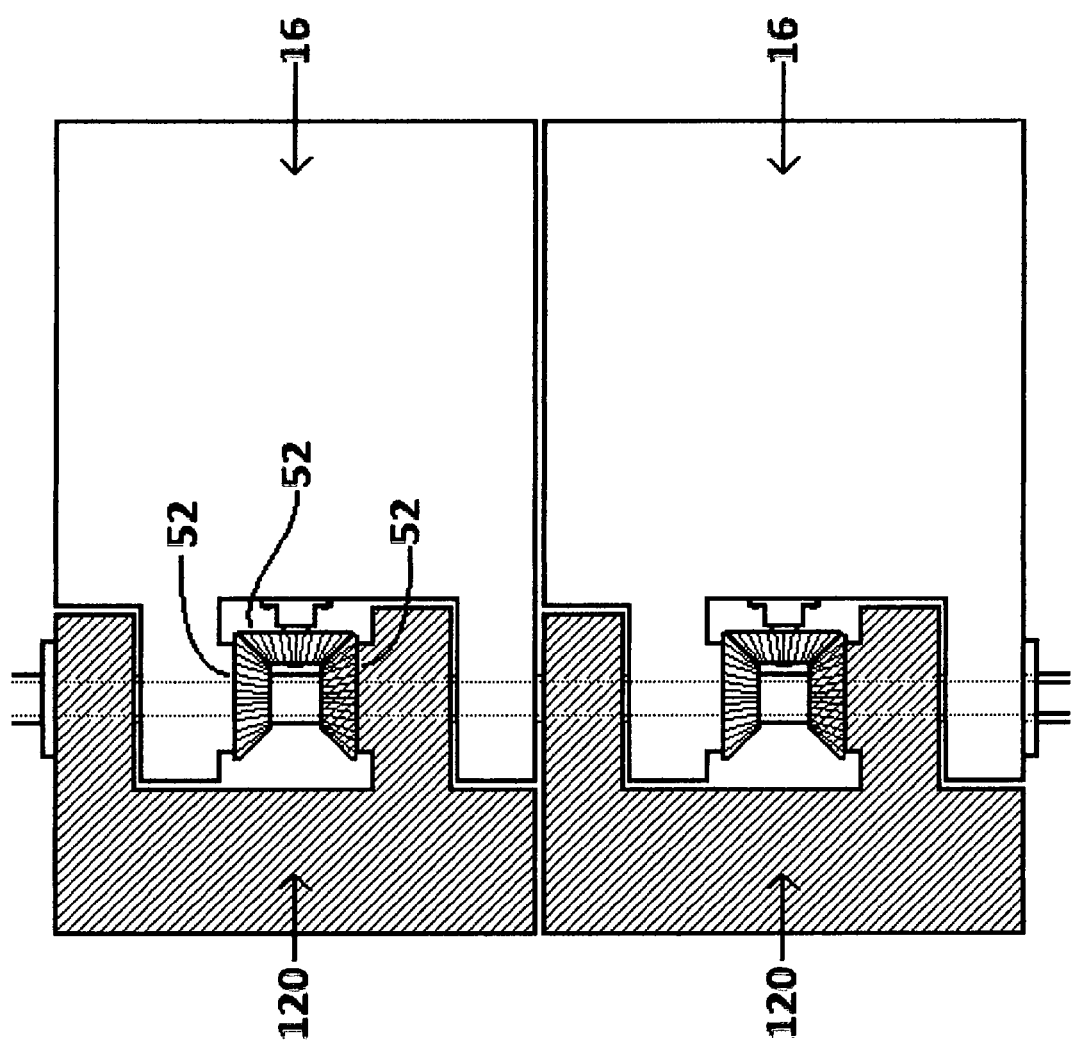
FIG. 34 shows nose and tail section geared together

In FIG. 34 is seen the nose section of FIG. 33 delineated with shading. Each section of the airfoil, the nose and tail sections, are geared to operate in tandem. Each section of the airfoil is equipped with its own gearing mechanism to independently pivot towards or away from the turbines central axis in the same or opposite directions. Each section of the airfoil is fixed to its corresponding beveled gear. The beveled drive gear married between them has identical meshing characteristics. The drive gear can be joined in a rotatable manner by bearing means to either the nose or to the tail section. In our example the drive gear is joined to the tail section.

When the nose of a half section pivot inward toward the turbine's axis the tail section of that half section does likewise, pivoting inward toward the central axis creating the greater curvature on the side furthest from the central axis. And conversely when the nose and tail section is pivoted out outward the greater curvature appears on the inside of the foil closest to the turbine's central axis. In this example push and pull cables described earlier are controlled by a central cam system. In all 180 degree cycles the combined mass of both complete airfoil half sections including the connected two half sections on the opposite sides of the sweep area all together move mass away from the central axis equally to the combined mass that is moved toward the central axis.

Because each section of a complete airfoil section has its own gearing mechanism and its own position regulator and controlling mechanism each complete airfoil section can pivot to reverse positions to that of the other complete airfoil half section. This reverse happens when the turbine is at rest or when there is not sufficient wind to enter into lift mode. This position is called drag mode, a mode that creates rotation from unequal drag resistance on both sides of the sweep. The inter into drag mode by reversing the position a cam disk in this design merely has to be rotate 180 degrees.

Figure 35:
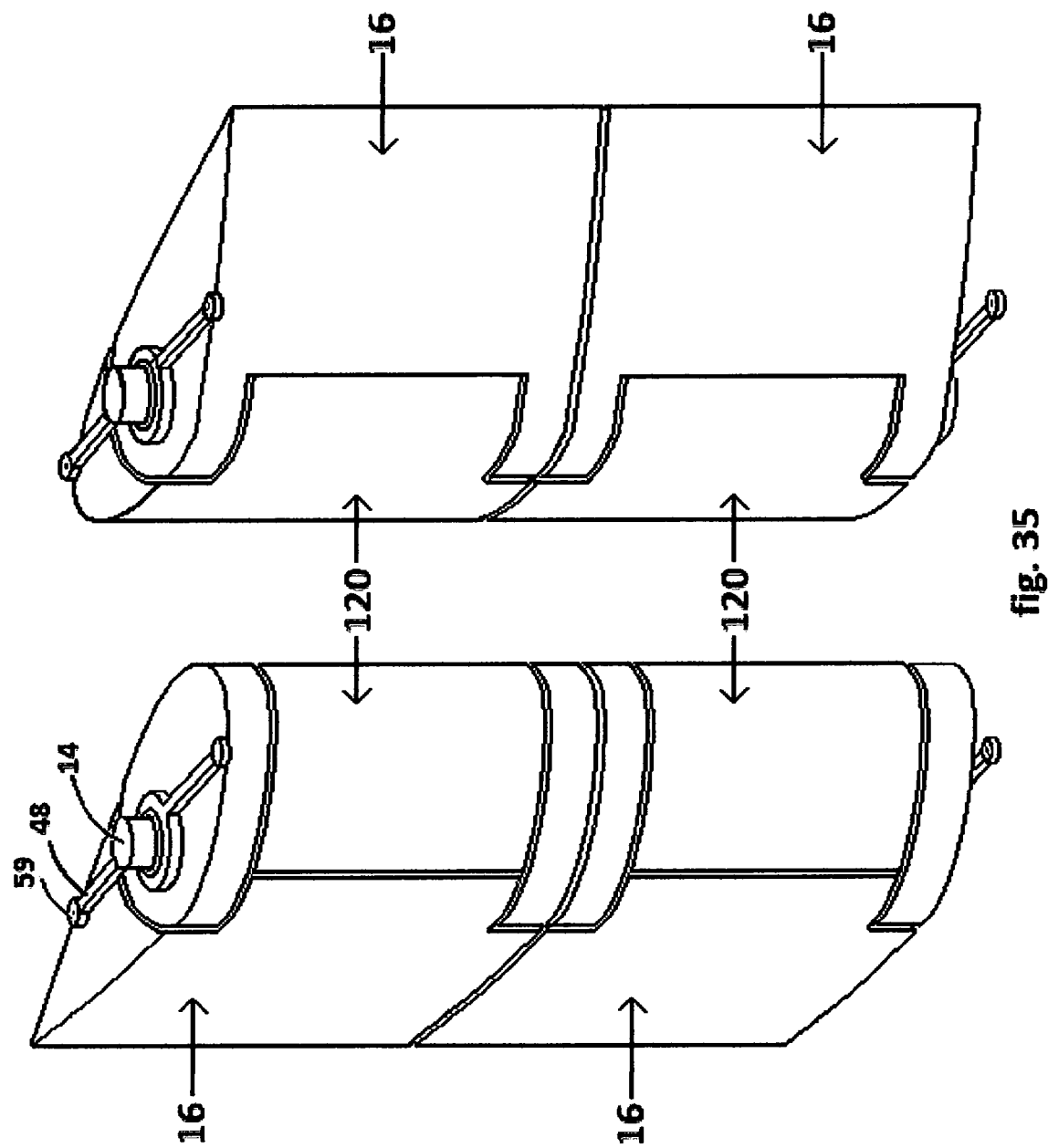
FIG. 35 shows two opposed geared airfoils with greater curvature in opposite cycles

In FIG. 35 the perspective view shows the two opposed airfoils in their opposite cycles. The airfoil on the left with the greater curvature on the outside moving against the wind and the airfoil on the left with the greater curvature on the inside closest to the turbine's main shaft moving with the wind.

In this example the position of the airfoils is controlled by a cam system that uses push and pull cables 158 and 159 to connected to the ball joints 59 fixed in this example to the tail section by the push and pull cables lever 48 that is fixed to foils axle 14. end While it has been assumed by some researchers that the Cp of four turbines is less than for three, this is not always the case for several reasons. The performance advantages of three vs. four relative to shadowing and eddy effects diminish as the diameter of the sweep area increase.

But the major overlooked advantage of four airfoils instead of three is because of the benefits of the opposed configuration. With four airfoils each foil is 90 degrees apart, and more to the point, each foils is opposed at 180 degrees, opposite the other of the pair.

Research indicates that varying the cord angle increases the Cp and so does changing the greater and lesser curvature from one side to the other in each rotation. Furthermore, the highest efficiency position of both modifications involves the movement of mass out away from the axis on the side going with the wind in exact opposition to the movement of mass in towards the axis on the opposite side of the axis going against the wind.

With this in mind, the advantages of both airfoils being exactly opposed in pairs became obvious. As a result the movement of mass i.e. the control mechanism moving part or all of the foil, on one side of the axis being exactly opposite to the movement of the control mechanism plus moving part or all of the foil on the opposite side of the axis made the advantages of these mechanized modification finally viable.

More precisely: (When connected equal mass, that is nearly equal distance from the axis, is in motion and said mass is being moved equally in opposite direction relative to the axis and is moving in the same directions on both sides of the axis, the net effects of centrifugal force from tandem bilateral movement is minimal. Thus the energy loss from engaging both the variable pitch and the profile modification mechanisms is merely the inertia of moving the mechanism irrespective of the centrifugal force of bilateral mass except the very minor loss due to the slight distance difference of each opposed mass to the central axis.)

Parts List: The following is a list of parts referenced in the Figures:

1—Outer membrane
2—Leaf spring
3—Leaf spring fixture
4—Swivel pin and bearing
5—Pushrod
6—Rack gear (and pinion gear FIG. 13)
7—Profile exchange lever
8—Push rod or drive or pivot shaft bearing fixture
9—Cambered foil's main shaft w/ or w/o gear
10—Main bearing
11—Saddle bearing
12—Pilot bearing w/ fixture
13—Eccentric
14—Foil's main axle with bearing
15—Hub arm of end assembly
16—Tail assembly
17—Main spring attachment receptacle 18—Main spring
19—Outer skin
20—Turbine's main shaft
21—Turbine's central axle or axis
22—Cam system 22
23—Cam follower 23??
24—Cam lobe 24
25—Slot in cover 26 for lever
26—Airfoil end cover
27—Support platform
28—Core frame structure
29—Stepper motor
30—Low pressure profile
31—Conduit or transmission line
32—Slip ring
33—Brushes
34—Processor
35—Driver control circuits
36—Solar panel
37—On ground battery storage
38—Wing in drive
39—Wing in glide
40—A40 profile modification mechanism
41—magnet
42—electromagnet
43—high pressure profile
44—low pressure profile
45—
46—solenoid lock
47—cable pulley
48—push pull cable lever
49—pivot axle
50—A50 veritable pitch mechanism
51—drive shaft
52—Beveled (or pinion FIG. 13) gear
53—beveled ring gear
54—drive shaft bearing block
55—weight
56—extension arm
57—inner main spring activation rod
58—pivot axle with bearing/housing (for 56)
59—ball joint
60—cross tie
61—bearing
62—tie rod
63—tie rod bearing structure
64—air foil end assembly
65—eccentric drive
66—smaller container
67—larger container
68 A60's main axle/smaller container axle FIG. 12
69—bearing and bearing housing (for activating mechanism.)
70—tubular main shaft 70 (FIG. 3B)
71—seal and bearing (for 67 and axle 68)
72—keyed attachment flange collar (for 66,68)
73—leaf spring bearing and keeper
74—thresh washers and bearings for 67
75—forward main spring or rib fixture
76—turbine end assembly
77—secondary driver
78—secondary rotator
79—pivot shaft bearing/housing (FIG. 11)
80—primary pivot shaft (fig (FIG. 11)
81—end assembly support fixture
82—end assembly brace (FIG. 11)
83—secondary pivot shaft
84—support and bearing fixture
85—attachment fixture (for 29 and 80)
86—strut
87—rib
88—rigid air foil section
89—spar and/or skin attachment rim
90—support pylon
91—position regulator.
92—keyed split collar
93—regulator and reverser circuits
94—generator.
95—inter-stationary axle FIG. 11 E look at 68
96—inter-stationary axle bearing and housing
97—inner tube
98—slide rails
99—carriage
100 axle cable flange
101 end assembly
102 lower support block assembly-through 110
103 central turbine platform.
104 rotating assembly's
105 axle to cable extension arm
106 padded rotatable support structure for 15
107 bolted down foot flange
108—Tee shaped axle/w bearing
109 main shaft of air foil
110 half hinge
111 inner tube rim
112 bladder/chamber
113 fluid bypass tube
114 eccentric
115 eccentric ring bearing
116 connecting plate from nose of foil end ass. 64 to end turbine end ass. 76
117 position rotator
118 bladder structure
119 greater profile structure.
120 nose assembly
121 end assembly axle/fastener
122 yoke
123 main bearing with roller guide
124 recess for 87 or 122
125 tail assembly's flange
126 nose assembly/yoke, axle and bearing
129 ring gear portion (FIG. 15B)
130 circular transmission cover
131 angled end assembly
132 ground support cable
133 ground anchors
134 lock and release mechanism
135 mine foils
136 Ground cable flange/bearing/housing
137 hub to hub arm axle and bearing
138 hub's axle housing
139 lateral support cable
140 cable slack lever
141 pinion gear
142 cable spool
143 hub
144 intermediate axle, bearing and block housing ass.
145 housing+axle ass. (on 131 adjacent to A60)
146 hub arm's axle housing (for axle of 127)
147 abbreviated nose section
148 worm drive hoist
149 worm drive rack gear
cam parts
150 main bearing split collar 151 upper or lower cover plate
152 slider connecting plate.
153 cam track
154 cam disk
155 cam slider
156 hub axle hinge for 15
157 hub arm support flange
158 cam pull back line
159 cam pull line
160 stationary lateral support cables
Assembly 40 or A40—profile modification mechanism.
Assembly 50 or A50 veritable pitch mechanism.
Assembly 60 or A60 cambered foil Assembly 70 or A70 articulating rib assembly)
Assembly 147 abbreviated nose section ass.

Aspects of the present work include: 1. A turbine assembly for converting fluid flow into rotational movement to do useful work including: a central axis and grounded stationary axle surrounded with a turbine's main shaft rotatable there about by bearing means; A pair of central hubs, with each hub fixed to the turbine's main shaft and opposed to the other hub, with one hub longitudinally fixed above the other and spaced a distance apart. Each hub preferable supporting four hub arms with each opposed hub and plurality of hub arms vertically aligned and each extending transversely from said turbine's main shaft.

Also including each hub, joined to each of the four hub arms, by a hinged pivot axle assembly, with half of the hinge of the axle assembly fixed to the hub and the other half hinge fixed to hub arm and pivot able around said axle. With the upper hub and each extended end of each of its plurality of hub arms joined to a hinged pivot axle assembly with a dual tee shaped axle, with the stem of the tee shaped axle and half hinge with bearings fixed thereto serving the lateral pivots of the airfoil and half hinge/w bearing main shaft fixed thereto and the top of the tee shaped axle and half hinge with bearing fixed thereto serving the vertical pivots of the hub arm by the half hinge fixed w/ bearing thereto.

With the upper hub rotatable about the turbine's main shaft and its appendages thereby becoming the upper rotatable hub assembly. And including the lower hub and its appendages being a mirror image of the upper rotatable hub assembly and becoming the lower rotatable hub assembly. And so too, the upper and lower rotatable hub assembly become the rotating turbine assembly supporting in a pivot able manner each of the four airfoils there between each of its rotatable hub assemblies while maintaining the airfoil vertical orientation.

2. The rotating turbine assembly of 1 above wherein said rotating turbine assembly's plurality of hub-arms, each being vertically pivot able at an axis between the assembly's hub and bub-arm and between its extended hub-arm to airfoil connections, thereby causing at sufficient rpm, an increased sweep area as the extended rotating assembly is raise up and outward by the centrifugal force of rotation. Because the centrifugal force of rotation supports the mass of the rotating assembly said assembly can be less massive and lighter creating less inertia than it otherwise would be if it depended only on a rigid structure for its support.

3. The turbine assembly of 2 above further including a constant cable tension mechanism that maintains constant cable tension while increasing the "effective" length of the lateral cables maintaining equal distance between each two airfoils as rpm increases and the centrifugal force of rotation raising the rotating turbine assembly that increasing the "effective" cable length commiserate to the increased radius of the sweep area, and the circumference of the rotating assembly and conversely maintaining constant cable tension in the reverse sequence commiserate to the decrease in effective cable length when the rpm decreases and the lessening rpm and centrifugal force lowers the rotating assembly and the radius of the sweep area and circumference of the rotating assembly decrease.

CONCLUSION

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

I claim:
1. A vertical axis wind turbine comprising:
   a central axis that extends in a substantially vertical direction;
   a plurality of configurable airfoils disposed about the central axis, the plurality of configurable airfoils physically coupled to rotate together about the central axis;
   each configurable airfoil of the plurality of configurable airfoils being rotatable about a vertical shaft such that an angle between the configurable airfoil and an arm that extends horizontally from the central axis to the configurable airfoil changes as a function of rotational position of the configurable airfoil about the central axis as the configurable airfoil rotates about the central axis;
   a profile of each configurable airfoil in cross section perpendicular to the vertical shaft is configured to change as a function of rotational position of the configurable airfoil about the central axis as the configurable airfoil rotates about the central axis; and
   wherein each configurable airfoil includes a first rigid cambered foil section and a second rigid cambered foil section separated by a flexible center section that is configurable to take a spiral configuration.

2. The vertical axis wind turbine of claim 1 wherein the plurality of configurable airfoils consists of an even number of configurable airfoils arranged in axial symmetry about the central axis such that each configurable airfoil is balanced with an opposing configurable airfoil located on the opposite side of the central axis.

3. The vertical axis wind turbine of claim 2 wherein a pair of opposing configurable airfoils on opposing sides of the central axis are configured for combined operation such that adjustments of a first configurable airfoil of the pair is opposite to adjustments of a second configurable airfoil of the pair that is on an opposite side of the central axis.

4. The vertical axis wind turbine of claim 1 further comprising a plurality of cables connected between the vertical axis wind turbine and at least one adjacent vertical axis wind turbine.

5. The vertical axis wind turbine of claim 1 wherein the flexible central section is configurable in a cambered configuration or a symmetrical configuration.

6. The vertical axis wind turbine of claim 1 wherein the configurable airfoil includes an inflated nose section and an inflated tail section.

7. The apparatus of claim 1 wherein the profile of each configurable airfoil in cross section perpendicular to the vertical shaft is configured to have a concave surface facing radially outward from the central vertical axis when the configurable airfoil is at a first rotational position and have a concave surface facing radially inward toward the central vertical axis when the configurable airfoil is at a second rotational position.

8. A method of operating a vertical axis wind turbine that includes a plurality of configurable airfoils rotating about a central vertical axis comprising, for each of the plurality of configurable airfoils:
   adjusting an angle formed between a configurable airfoil and a radius that extends from the central vertical axis to the configurable airfoil as the configurable airfoil rotates about the central axis;
   adjusting a profile of the configurable airfoil as the configurable airfoil rotates about the central axis including adjusting the profile to be cambered with a concave surface facing radially outward from the central vertical axis when the configurable airfoil is at a first rotational position and adjusting the profile to be cambered with a concave surface facing radially inward toward the central vertical axis when the configurable airfoil is at a second rotational position; and
   configuring a flexible center section of the configurable airfoil to take a spiral configuration.

9. The method of claim 8 wherein the angle between the configurable airfoil and the radius is adjusted as a function of angular position of the configurable airfoil about the central vertical axis such that the angle cycles through a full cycle for each rotation of the configurable airfoil about the central vertical axis.

10. The method of claim 9 wherein the angle at a given angular position of the configurable airfoil is determined from the wind direction such that the configurable airfoil maintains an efficient angle with respect to the wind during rotation about the central axis.

11. The method of claim 10 wherein the angle is varied within a range from about eighty seven degrees)(87°) to about ninety three degrees (93°).

12. The method of claim 8 wherein the profile of the configurable airfoil is adjusted as a function of angular position of the airfoil about the central vertical axis such that the profile cycles through a full cycle for each rotation of the configurable airfoil about the central vertical axis.

13. The method of claim 12 wherein the profile at a given angular position of the configurable airfoil is determined from the wind direction so that the configurable airfoil maintains an efficient profile with respect to the wind during rotation about the central axis.

14. An apparatus comprising:
   a plurality of vertical axis wind turbines in a geometric arrangement, with neighboring vertical axis wind turbines rotating in opposite directions, each of the plurality of vertical axis wind turbines comprising:
      a central axis that extends in a substantially vertical direction;
      a plurality of configurable airfoils disposed about the central axis, the plurality of configurable airfoils physically coupled to rotate together about the central axis;
   each configurable airfoil of the plurality of configurable airfoils being rotatable about a vertical shaft such that an angle between the configurable airfoil and an arm that extends horizontally from the central axis to the configurable airfoil changes as a function of rotational position of the configurable airfoil about the central axis as the configurable airfoil rotates about the central axis; and
      a profile of each configurable airfoil in cross section along a horizontal plane is configured to change as a function of rotational position of the airfoil about the central axis as the configurable airfoil rotates about the central axis such that a concave surface faces radially outward from the central vertical axis when the configurable airfoil is at a first rotational position and a concave surface faces radially inward toward the central vertical axis when the configurable airfoil is at a second rotational position.

15. The apparatus of claim 14 further comprising cables between the plurality of vertical axis wind turbines.

16. The apparatus of claim 15 further comprising ground cables between the plurality of vertical axis wind turbines and ground.

17. The apparatus of claim 14 wherein each configurable airfoil includes a first rigid cambered foil section and a second rigid cambered foil section separated by a flexible center section.

* * * * *